(12) United States Patent
Snyder

(10) Patent No.: US 11,964,681 B2
(45) Date of Patent: Apr. 23, 2024

(54) MOBILE RAILWAY ASSET MONITORING APPARATUS AND METHODS

(71) Applicant: Amsted Rail Company, Inc., Chicago, IL (US)

(72) Inventor: Todd Snyder, Newtown Square, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 502 days.

(21) Appl. No.: 17/206,899

(22) Filed: Mar. 19, 2021

(65) Prior Publication Data

US 2021/0291882 A1    Sep. 23, 2021

Related U.S. Application Data

(60) Provisional application No. 63/161,964, filed on Mar. 16, 2021, provisional application No. 62/992,363, filed on Mar. 20, 2020.

(51) Int. Cl.
*B61K 9/12* (2006.01)
*B61L 1/02* (2006.01)
(Continued)

(52) U.S. Cl.
CPC .............. *B61L 25/021* (2013.01); *B61K 9/12* (2013.01); *B61L 1/02* (2013.01); *G01B 5/10* (2013.01); *G01M 17/10* (2013.01)

(58) Field of Classification Search
CPC ... B61L 25/021; B61L 3/008; B60G 2401/12; B60G 2400/20–204; B61K 9/00;
(Continued)

(56) References Cited

U.S. PATENT DOCUMENTS 4,268,968 A    5/1981    Przybylinski
4,701,866 A    10/1987   Harrison
(Continued)

FOREIGN PATENT DOCUMENTS

CA    2744287       5/2010
DE    102007058193  6/2009
(Continued)

OTHER PUBLICATIONS

International Search Report and Written Opinion from corresponding International Application No. PCT/US2021/023249 dated Jul. 27, 2021; 20 pages.
(Continued)

*Primary Examiner* — Spencer D Patton
(74) *Attorney, Agent, or Firm* — Fitch, Even, Tabin & Flannery LLP

(57) ABSTRACT

In one aspect, a mobile railway asset monitoring apparatus is provided that includes a sensor configured to produce a signal indicative of a rotation of a wheelset of a mobile railway asset. The apparatus further includes a processor to receive data corresponding to a ground speed of the mobile railway asset. The processor is operably coupled to the sensor, the processor configured to estimate a running dimension of the wheelset based at least in part on the rotation of the wheelset and the ground speed of the mobile railway asset. The processor is configured to determine at least one parameter of the mobile railway asset based at least in part on the running dimension of the wheelset.

95 Claims, 19 Drawing Sheets

(51) Int. Cl.
  *B61L 25/02* (2006.01)
  *G01B 5/10* (2006.01)
  *G01M 17/10* (2006.01)

(58) Field of Classification Search
  CPC ...... B61K 9/12; G01M 17/013; G01M 17/02; G01M 17/08; G01M 17/10; G07C 5/0808–12; G01B 5/08; G01B 5/10
  See application file for complete search history.

(56) References Cited

U.S. PATENT DOCUMENTS

| | | | |
|---|---|---|---|
| 4,843,885 A | 7/1989 | Bambara | |
| 5,433,111 A * | 7/1995 | Hershey | B61L 23/042 246/169 R |
| 6,909,514 B2 | 6/2005 | Nayebi | |
| 7,135,976 B2 | 11/2006 | Neff | |
| 7,287,334 B2 | 10/2007 | Moffett | |
| 7,685,884 B2 | 3/2010 | Degutis | |
| 7,688,218 B2 | 3/2010 | Lefebvre | |
| 7,698,962 B2 | 4/2010 | Lefebvre | |
| 7,825,803 B2 | 11/2010 | Neff | |
| 8,212,685 B2 | 7/2012 | Lefebvre | |
| 8,305,567 B2 | 11/2012 | Hesser | |
| 8,823,537 B2 | 9/2014 | Lefebvre | |
| 8,969,745 B2 | 3/2015 | Slifkin | |
| 9,026,281 B2 | 5/2015 | Murphy | |
| 9,365,223 B2 | 6/2016 | Martin | |
| 9,511,783 B2 | 12/2016 | Shimokawa | |
| 9,663,092 B2 | 5/2017 | Martin | |
| 9,663,124 B2 | 5/2017 | Lefebvre | |
| 9,981,673 B2 | 5/2018 | Martin | |
| 10,137,915 B2 | 11/2018 | Lefebvre | |
| 10,259,477 B2 | 4/2019 | Lefebvre | |
| 10,628,787 B2 | 4/2020 | Benedict | |
| 10,710,619 B2 | 7/2020 | Lefebvre | |
| 10,850,755 B2 | 12/2020 | Lefebvre | |
| 10,943,318 B2 | 3/2021 | Benedict | |
| 11,030,568 B2 | 6/2021 | Benedict | |
| 11,180,170 B2 | 11/2021 | Lidgett | |
| 11,312,350 B2 | 4/2022 | Martin | |
| 11,325,625 B2 | 5/2022 | Weiner | |
| 11,385,137 B2 | 7/2022 | Samadani | |
| 11,410,116 B2 | 8/2022 | Benedict | |
| 2003/0183697 A1 | 10/2003 | Porter | |
| 2004/0181320 A1 * | 9/2004 | Kane | B61L 25/026 701/19 |
| 2006/0110086 A1 * | 5/2006 | Morita | F16C 33/723 384/448 |
| 2006/0261218 A1 | 11/2006 | Mace | |
| 2010/0288157 A1 | 11/2010 | Lefebvre | |
| 2011/0185823 A1 | 8/2011 | Nishikawa | |
| 2013/0066517 A1 * | 3/2013 | Nishikawa | B60B 27/0005 29/898 |
| 2014/0060979 A1 | 3/2014 | Martin | |
| 2014/0081813 A1 | 3/2014 | Breed | |
| 2014/0111356 A1 | 4/2014 | Lefebvre | |
| 2014/0200827 A1 | 7/2014 | Bhattacharjya | |
| 2015/0219487 A1 | 8/2015 | Maraini | |
| 2016/0249119 A1 | 8/2016 | Mori | |
| 2016/0325767 A1 | 11/2016 | Lefebvre | |
| 2017/0144682 A1 | 5/2017 | Kamei | |
| 2018/0273066 A1 | 9/2018 | Mulligan | |
| 2019/0225248 A1 | 7/2019 | Lidgett | |
| 2019/0236859 A1 * | 8/2019 | Bradley | G01P 3/48 |
| 2019/0250069 A1 | 8/2019 | Samadani | |
| 2019/0319835 A1 | 10/2019 | Mansfield | |
| 2020/0023868 A1 * | 1/2020 | Falta | H02K 21/26 |
| 2020/0023870 A1 | 1/2020 | Mansfield | |
| 2020/0023871 A1 | 1/2020 | Snyder | |
| 2020/0079343 A1 | 3/2020 | Martin | |
| 2020/0317212 A1 | 10/2020 | Rogness | |
| 2020/0353961 A1 | 11/2020 | Bonnes | |
| 2021/0042693 A1 | 2/2021 | Benedict | |
| 2021/0053548 A1 | 2/2021 | Michel | |
| 2022/0041194 A1 | 2/2022 | Lidgett | |

FOREIGN PATENT DOCUMENTS

| | | |
|---|---|---|
| DE | 202017002469 | 6/2017 |
| WO | 9530886 A1 | 11/1995 |
| WO | 2010093895 | 8/2010 |
| WO | 2013092956 A2 | 6/2013 |
| WO | 2017121579 | 7/2017 |
| WO | 2021001219 A1 | 1/2021 |

OTHER PUBLICATIONS

Invitation to Pay Additional Fees from corresponding International Application No. PCT/US2021/023249 dated May 19, 2021; 2 pages.
U.S. Appl. No. 17/362,174, filed Jun. 29, 2021; 79 pages.
U.S. Appl. No. 63/108,717, filed Nov. 2, 2020; 97 pages.
U.S. Appl. No. 63/153,652, filed Feb. 25, 2021; 63 pages.
Specification: Strain/Displacement Sensor (WSN-415); brochure from Amsted Digitial Solutions, Inc.; publicly available before Mar. 20, 2020; 2 pages.
U.S. Appl. No. 17/685,822, filed Mar. 3, 2022; 101 pages.
U.S. Appl. No. 17/837,677, filed Jun. 10, 2022; 76 pages.
U.S. Appl. No. 17/945,052, filed Sep. 14, 2022; 149 pages.
Images of CargoSense system; Publicly available at least as early as Jul. 16, 2021; 1 page.
Extended European Search Report from related European Patent Application No. 21770763.7 dated Mar. 14, 2024; 10 pages.

* cited by examiner

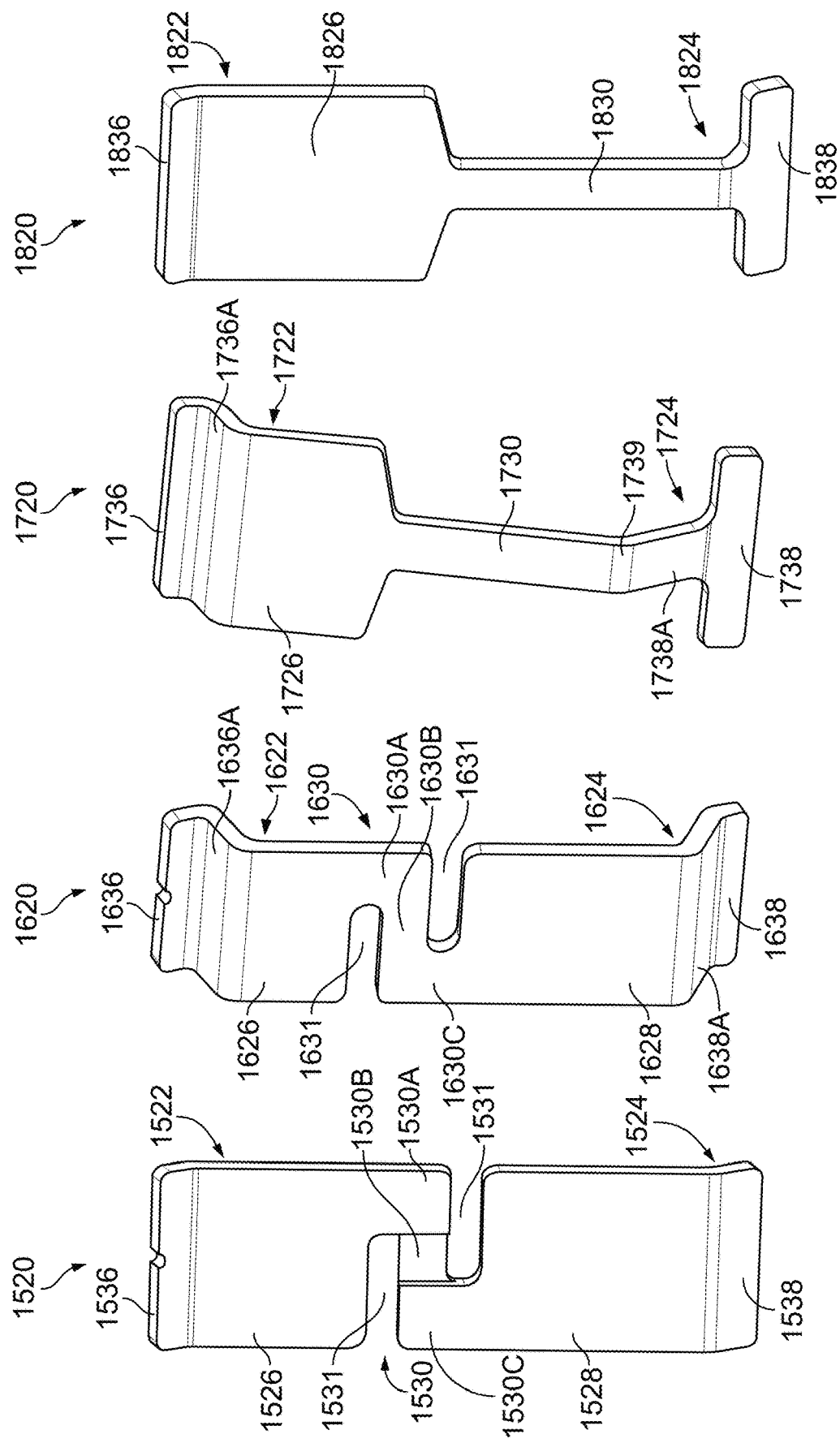

MOBILE RAILWAY ASSET MONITORING APPARATUS AND METHODS

CROSS-REFERENCE TO RELATED APPLICATIONS

This application claims the benefit of U.S. Provisional Patent Application No. 62/992,363, filed Mar. 20, 2020, and U.S. Provisional Patent Application No. 63/161,964, filed Mar. 16, 2021, which are both hereby incorporated herein by reference in their entireties.

FIELD

This disclosure relates generally to monitoring mobile railroad assets and, more particularly, to a mobile railway asset-mounted apparatus that senses physical phenomena such as vibration, strain, and temperature associated with the mobile railway asset.

BACKGROUND

Existing systems for monitoring the status of mobile railway assets include, for example, stationary monitoring systems and mobile monitoring systems (railcar-based or train-based). Mobile railway assets may include, for example, locomotives, railcars, containers, and/or rail maintenance equipment. Examples of mobile monitoring systems include instrumented bearing adapters that provide the interface between a wheelset's bearings to the side frames of a bogie (also known as a truck). A typical wheelset is an assembly comprising an axle, two wheels rigidly connected to the axle, and two bearings. The terms bogie and truck can be used interchangeably however bogie will be used throughout this specification. In North America, bogies typically include two side frames and a bolster and may be called a standard 3-piece truck. Each end of the bolster rests on a spring pack that connects the bolster to the side frames. In Europe, the bogie typically includes a single piece frame with four independent spring suspensions connecting the side frames of the single piece frame to each bearing assembly. Another example of a mobile monitoring device is a strain gauge that is mounted to the bolster or side frame of a bogie. The strain gauge permits a determination of whether the railcar is empty or loaded based on the detected strain changes.

An example of stationary monitoring systems include wayside systems located at fixed locations along a rail. These systems may measure various parameters, such as vibration, rail strain, and temperature of components of a railcar as the railcar travels along the rail. The parameters measured by wayside systems are used to monitor wheelset and bogie health along with various operational and environmental attributes such as weight and speed.

One issue with instrumented bearing adapter systems is that with two wheelsets per bogie, and two bogies per railcar, a typical installation might involve eight instrumented bearing adapters per railcar. The reliability, maintainability, and cost of eight instrumented bearing adapters and labor involved in installing or servicing the bearing adapters may not be acceptable for some applications.

Wayside systems have the limitation that they can only measure at a single point in time and location along the rail as a train consist travels past the wayside system and therefore cannot fully assess the behavior of the mobile railway assets across all situations. Nor can wayside systems perform continuous monitoring of a train consist for safety purposes.

SUMMARY

In one aspect of the present disclosure, a mobile railway asset monitoring apparatus is provided that includes a sensor configured to produce a signal indicative of a rotation of a wheelset of a mobile railway asset. The apparatus further includes a processor to receive data corresponding to a ground speed of the mobile railway asset. The processor is operably coupled to the sensor, the processor is configured to calculate a running dimension of the wheelset based at least in part on the rotation of the wheelset and the ground speed of the mobile railway asset. The running dimension of the wheelset may include, for example, a running diameter, a running radius, and/or a running circumference of the wheelset. Each wheel is manufactured with a tapered running surface and the running dimension of the wheelset varies during operation of the mobile railway asset, such as when the mobile railway asset travels around a curve in a track, and varies according to the condition of components of the mobile railway asset. For example, a bogie having defective side bearings that do not effectively dampen the motion of the associated rail car body may cause the bogie to oscillate side to side laterally, called "truck hunting," while the associated mobile railway asset travels along a straight track. The hunting of the bogie occurs in concert with lateral wheelset motion causes a running dimension of the wheelset to vary in a periodic manner as the wheelset shifts laterally back and forth on the track. The wheelset shifting may also happen slowly, simply as a function of steering. Thus, the sensor and processor are operable to accurately determine the changing running dimension of the wheelset as the mobile railway asset travels along the track in various situations.

The processor is further configured to determine at least one parameter of the mobile railway asset based at least in part on the running dimension of the wheelset. By permitting accurate calculation of the running dimension of the wheelset, the apparatus facilitates accurate determination of the at least one parameter of the mobile railway asset. The at least one parameter may include, for example, a performance parameter, a failure indication, and/or a predicted future parameter for a bogie, a side frame, a bearing, an axle, and/or a wheel of the mobile railway asset. The apparatus may determine the at least one parameter using a holistic approach that considers the running dimension of the wheelset in conjunction with the behavior of the interrelated mechanical systems of the mobile railway asset. As further examples, the apparatus facilitates near real-time monitoring of bearing, wheel, axle, and braking failures as well as facilitating development of heuristics to identify good and bad actor bogies, side bearings, springs, and/or friction wedges. In some embodiments, the at least one parameter includes a weight of the mobile railway asset which further facilitates precise characterization of performance of the mobile railway asset.

In one embodiment, the apparatus is provided as a bogie monitoring device configured to be mounted to a bogie of the mobile railway asset. The bogie monitoring device includes the sensor and the processor. In another embodiment, the apparatus is provided as a bogie monitoring device including the sensor and a railway asset node including the processor. The bogie monitoring device and the railway asset node are configured to be placed in communication with one another, such as via a wireless railcar-based network or a train-based network. In yet another embodiment, the apparatus is provided as a railway asset node including the sensor and a remote device such as a server computer including the processor. The railway asset node is operable to communicate with the server computer, such as via a communication management unit of the mobile railway asset, a powered wireless gateway of an associated locomotive, or a wide-area wireless network such as a cellular network, and the internet.

The present disclosure also provides a method of monitoring a mobile railway asset. The method incudes receiving data from a sensor of the mobile railway asset indicating a rotation of a wheelset of the mobile railway asset and receiving data corresponding to a ground speed of the mobile railway asset. The method includes calculating a running dimension of the wheelset based at least in part on the rotation of the wheelset and the ground speed of the mobile railway asset. The method further includes determining at least one parameter of the mobile railway asset based at least in part on the running dimension of the wheelset. The running dimension of the wheelset of the mobile railway asset may be used as a basis for determining the performance of components of the mobile railway asset, predicting possible failure conditions, setting maintenance schedules, as well as detecting changes to the wheelset during maintenance.

A mobile railway asset monitoring apparatus is provided that includes a sensor to gather data associated with vibration of a mobile railway asset. The sensor may include, for example, an accelerometer, a strain sensor, a microphone, and/or an optical sensor operable to gather data associated with the vibration of the mobile railway asset such as acceleration, displacement, strain, sound, and/or image data. The apparatus further includes a processor operably coupled to the sensor, the processor configured to calculate a position of at least a portion of the mobile railway asset relative to the sensor based at least in part on the data. The processor is configured to determine at least one parameter of the mobile railway asset based at least in part on the data from the sensor. In this manner, the processor may identify, for example, which bearing assembly of a wheelset is producing excessive vibrations based on the position of the bearing assembly relative to the sensor. The identity of the bearing assembly may be provided to a maintenance provider for replacement of the bearing assembly. The identification of the relative position of the bearing assembly may save maintenance resources since the maintenance provider knows which bearing assembly requires service.

As one example, the mobile railway asset is a railcar and the sensor is operable to detect a change in the application of a hand brake of the railcar. The at least a portion of the mobile railway asset includes the hand brake of the railcar and the processor is configured to determine the relative position of the hand brake relative to the sensor. Further, the at least one parameter of the mobile railway asset determined by the processor includes the orientation of the railcar with respect to a track, such as whether the A-end or B-end of the railcar is leading as the railcar travels along a track.

In one aspect, a method is provided for monitoring a railway apparatus. The method includes gathering, via a sensor, data associated with a vibration of a mobile railway asset. The method includes calculating a position of at least a portion of the mobile railway asset relative to the sensor based at least in part on the sensor data. Further, the method includes determining at least one parameter of the mobile railway asset based at least in part on the data from the sensor. By calculating the position of the at least a portion of the mobile railway asset and determining the at least one parameter of the mobile railway asset, the method facilitates a high accuracy understanding of the current operation of, and predicted future condition of, one or more components of the mobile railway asset.

The present disclosure also provides a mobile railway asset monitoring apparatus to be mounted at an opening of an end of a bolster of a bogie of a mobile railway asset intermediate upper and lower portions of the bolster end. The upper and lower portions of the bolster end are movable relative to each other with loading and unloading of the bolster. The upper and lower portions of the bolster both flex independently of one another as the bolster is loaded and unloaded. The mobile railway monitoring apparatus includes a sensor configured to detect relative movement of the upper and lower portions of the bolster end. The bolster end is typically exposed and readily accessed without having to disassemble the bogie which makes installation of the mobile railway asset monitoring apparatus straightforward for a technician. Further, the mobile railway asset monitoring apparatus may be attached to the bolster end without the apparatus interfering with the behavior of the bolster due to the size and rigidity of the bolster relative to the apparatus.

The mobile railway monitoring apparatus further includes communication circuitry and a processor operably coupled to the sensor and the communication circuitry. The processor is configured to determine at least one parameter of the mobile railway asset based at least in part on the relative movement of the upper and lower portions of the bolster end. In some forms, the processor is configured to detect the relative movement of the upper or lower portions with respect to another component or the railcar or the relative historical movement of the upper portion (e.g. the flexing curvature of the upper portion when empty compared to the flexing curvature of the upper portion when loaded) or the lower portion. The processor is further configured to cause the communication circuitry to communicate the at least one parameter to a remote device such as by using wired or wireless protocols.

The present disclosure also provides a method of monitoring a mobile railway asset. The method includes detecting strain or relative movement of upper and lower portions of an end of a bolster of a bogie of the mobile railway asset. The method includes determining at least one parameter of the mobile railway asset based at least in part on the relative movement of the upper and lower portions of the bolster end. The method further includes communicating the at least one parameter to a remote device.

In one aspect, the present disclosure also provides a mobile railway asset monitoring apparatus including a bogie monitoring device configured to be mounted to a bogie of a mobile railway asset. The apparatus includes global navigation satellite system (GNSS) circuitry of the bogie monitoring device configured to receive GNSS data from a GNSS and a processor operably coupled to the GNSS circuitry. The processor is configured to receive baseline GNSS data from a device at another position on the mobile railway asset than the GNSS circuitry. The device at the other position may be obstructed similarly to the apparatus but may be able to receive GNSS data from different satellites. For example, the apparatus may be mounted to a bolster on one side of a railcar and the other device may be mounted to another bolster of the railcar on an opposite side of the railcar. The processor is configured to calculate a position of the GNSS circuitry relative to at least a portion of the mobile railway asset based at least in part on the GNSS data and the baseline GNSS data.

In one embodiment, the bogie monitoring device is configured to be mounted to a bolster end of the bogie. Due to the relatively low position of the bolster end, the body of the mobile railway asset above the bogie may block the GNSS circuitry from receiving GNSS data from all satellites currently visible in the sky. The orientation of the mobile railway asset relative to the satellites may be determined by the processor based on the visible and obstructed satellites. The device at the other position may be mounted to a top or on the other side of the mobile railway asset and may receive GNSS data from some different satellites and some similar satellites currently visible in the sky. The orientation of the mobile railway asset may be improved with this additional information from this second device, especially when the information from both devices are captured and stored with the same or similar timestamps. As another example, the processor may determine which side of the mobile railway asset the bogie monitoring device is located on based on the different satellites visible to the GNSS circuitry at the bolster end and the satellites visible to the device on the other side of the mobile railway asset that may be on another bogie on the other end of the car. In this manner, the mobile railway asset monitoring apparatus may autonomously determine an orientation of the GNSS circuitry relative to at least a portion of the mobile railway asset.

In one embodiment, a mobile railway asset monitoring apparatus is provided that facilitates determination of mobile railway asset orientation relative to, for example, a hand brake, a track, and/or a train movement direction. The mobile railway asset monitoring apparatus includes one or more sensors and the apparatus further facilitates determination of an orientation of the one or more sensors relative to the mobile railway asset. The one or more sensors include, for example, a microphone and/or an accelerometer that detect vibrations (e.g., from track imperfections) and the apparatus facilitates determination of ground speed based on detected vibrations, GNSS data, and/or rotational speed of wheels of the mobile railway asset. The mobile railway asset monitoring apparatus facilitates determination of the load state and/or the actual weight of the mobile railway asset such as via one or more sensors configured to detect displacement, strain, or vibration of component(s) of the mobile railway asset. The mobile railway asset monitoring apparatus provides two approaches to measure each of ground speed, weight, and orientation parameters which in turn enables autonomous calibration of the apparatus. The two-approach ability to calculate these parameters also provides high confidence for agreeing, independent measurements and facilitates high accuracy calculations of parameters of the mobile railway asset.

BRIEF DESCRIPTION OF THE DRAWINGS

FIG. 15 is a side perspective view of a strain bracket;

FIG. 16 is a side perspective view of a strain bracket;

FIG. 17 is a side perspective view of a strain bracket;

FIG. 18 is a side perspective view of a strain bracket;

DETAILED DESCRIPTION

In aspect of the present disclosure, a railcar telematics monitoring IoT device is provided with an array of sensors. The IoT device may automatically determine the precise orientations of the monitoring device, wheels, and/or bearings with respect to the hand brake. The self-configuring capability IoT device supports a straightforward installation while enabling high accuracy speed measurement and precise wheel diameter measurements. One IoT device on each bogie (truck) of the freight car may facilitate full performance diagnostic of anomalous wheels, brakes, bearings, and other bogie components, while also detecting the weight of the commodity load, providing enhanced AEI functionality, and recognizing effects from track geometry and rail defects.

Figure 1:
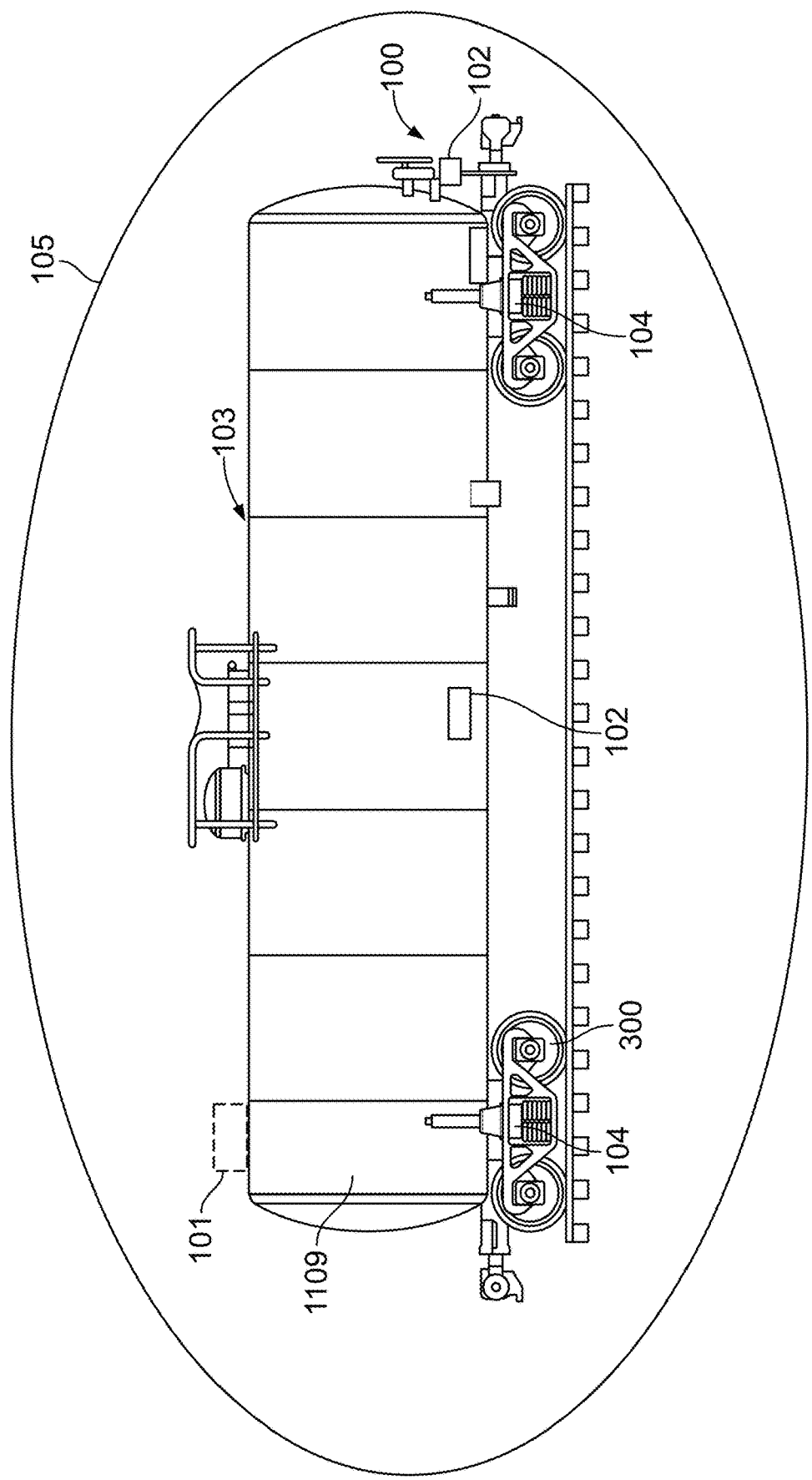
FIG. 1 is a side elevational view of a railcar having bogie monitoring devices mounted on bolsters of bogies of the railcar.
Figure 2:
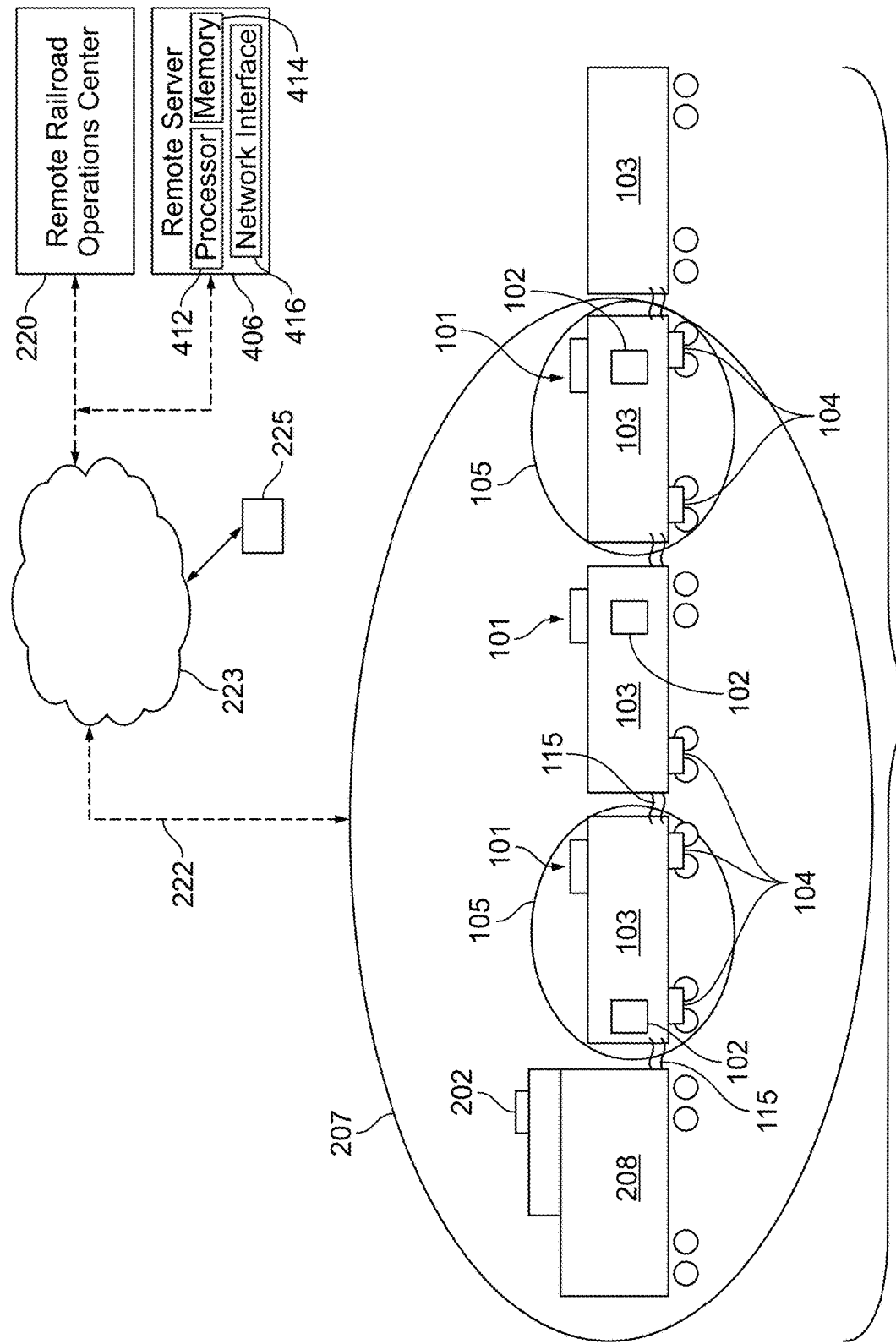
FIG. 2 is a schematic view of a train consist including the railcar of FIG. 1 showing a train-based network as well as individual railcar-based networks.

Regarding FIGS. 1 and 2, a train consist 209 is shown that includes a connected group of railcars 103 and one or more locomotives 208. The railcar 103 is shown with the hand brake on the B-end of the railcar 103, and toward the right side of FIG. 1. A railway asset node ("RAN") 100 is provided herein for a mobile railway asset such as a component of the train consist 209. For example, individual railcars 103 include one or more RANs 100 such as a bogie monitoring device ("BMD") 104. The BMD 104 is a part of, or may facilitate the provision of, a railcar-based network 105, such as a wireless network, that includes the BMD 104 and one or more other RANs 100 such as one or more communication management units ("CMUs") 101 and/or one or more sensor nodes ("SNs") 102. The SNs 102 may communicate via wired or wireless approaches with the BMD 104. Wireless sensor nodes 102 may be referred to as "WSNs". In one embodiment, the BMD 104 is mounted to the bolster 316 (see FIG. 3) of each bogie 300 of the railcar 103 and communicates with one or more wired sensor nodes 102 and/or one or more wireless sensor nodes 102 associated with the respective bogie 300. In some embodiments, individual ones of the railcars 103 may be provided with an onboard monitoring system including one or more RANs 100 such as a BMD 104 on each bogie 300 of the railcar 103 and one or more SNs 102 distributed on the railcar 103. The one or more SNs 102 may include one or more wireless SNs 102, such as a tank fill sensor, and/or one or more wired SNs 102, such as SNs 102 that are components of bearing adapters and connected via wire(s) to a respective BMD 104.

The BMD 104 or other railway asset nodes may include a physical input interface 703 (see FIG. 7), such as a global navigation satellite system ("GNSS") circuitry 781 and/or one or more sensors 701, configured to detect one or more parameters of the railcar 103. The BMD 104 and other RANs 100 may communicate to or through each other and at least one of the RANs 100 include communication circuitry that may communicate outside of the individual railcar-based network 105 to an external device such as component(s) of another railcar-based network 105, component(s) of the train-based/locomotive-based network 207, and/or to some other computing device via an external path. The communication between the BMD 104 or RANs 100 and the external computing device facilitates comparing or combining conditions of the other associated mobile railway assets with historical data and/or with other components of the train consist to make assessments of one or more parameters or conditions of the railcar 103. Further, the BMD 104 or other RANs 100 may perform on-board processing including lower-level processing, such as initial processing of raw data, as well as higher-level processing such as assessing parameters or conditions and/or drawing conclusions using heuristics. Each of the BMDs 104 or other RANs 100 may process data gathered from on-board sensors 701 and/or associated sensor nodes 102. Alternatively or additionally, individual ones of the BMDs 104 or other RANs 100 may process data from other BMDs 104 or other RANs 100 and/or data from sensor nodes 102 associated with other BMDs 104 or other RANs 100.

The one or more sensors 701 of the BMD 104 may include, for example, one or more of a photodiode or photovoltaic cell, accelerometer, strain gauge, pressure sensor, thermocouple, microphone, reed switch, gyroscope, laser interferometer, photointerrupter, resonant inductive sensor, capacitive sensor, fiber-Bragg grating based sensor or other optical sensor, an imaging sensor, and/or time-of-flight devices such as ultrasonic, sonar, or lidar sensors. Other phenomena such as sound, light, motion, or radio sources internal or external to the BMD 104 may also be used as input to the sensors for the purpose of calibration or relative comparative measurements. The other phenomena may originate from one or more RANs 100.

The one or more parameters detected by the BMD 104 may include one or more physical phenomena detected at the bolster 316, such vibration, sound, temperature, strain, orientation, location or relative location determined from processing of the sensor data, or using location and orientation determined by using GNSS circuitry. The term orientation may be used to refer to the orientation of a mobile railway asset with respect to the earth, to the track (e.g. which end, the A-end or the B-end, of the mobile railway asset is facing the direction of increasing milepost number), and/or to the direction of motion. A railcar end with a hand brake will be referred to the B-end of the railcar and the opposite end will be called the A-end. It is standard practice to name the sides of the railcar 103 using the convention where the right side of the railcar 103 is to one's right side as they stand facing the hand brake. By this convention, a railcar moving along a track with the A-end leading will have the right side of the railcar on the right side of the train while facing the direction of travel.

The term orientation may also be used to refer to the BMD 104 or other RANs 100 and their respective orientation in three-dimensional space, with respect to each other, with respect to the mobile railway asset, and so on. The BMD 104 or other RANs 100 may communicate between each other and analyze these one or more physical phenomena to determine one or more properties of one or more components of the mobile railway asset. Because the BMD 104 is on the bolster 316, the BMD 104 is able to detect the one or more parameters at a bogie-level and determine the one or more properties of the one or more components rather than utilizing a separate monitoring device at or near each component of the mobile railway asset being monitored.

Figure 12:
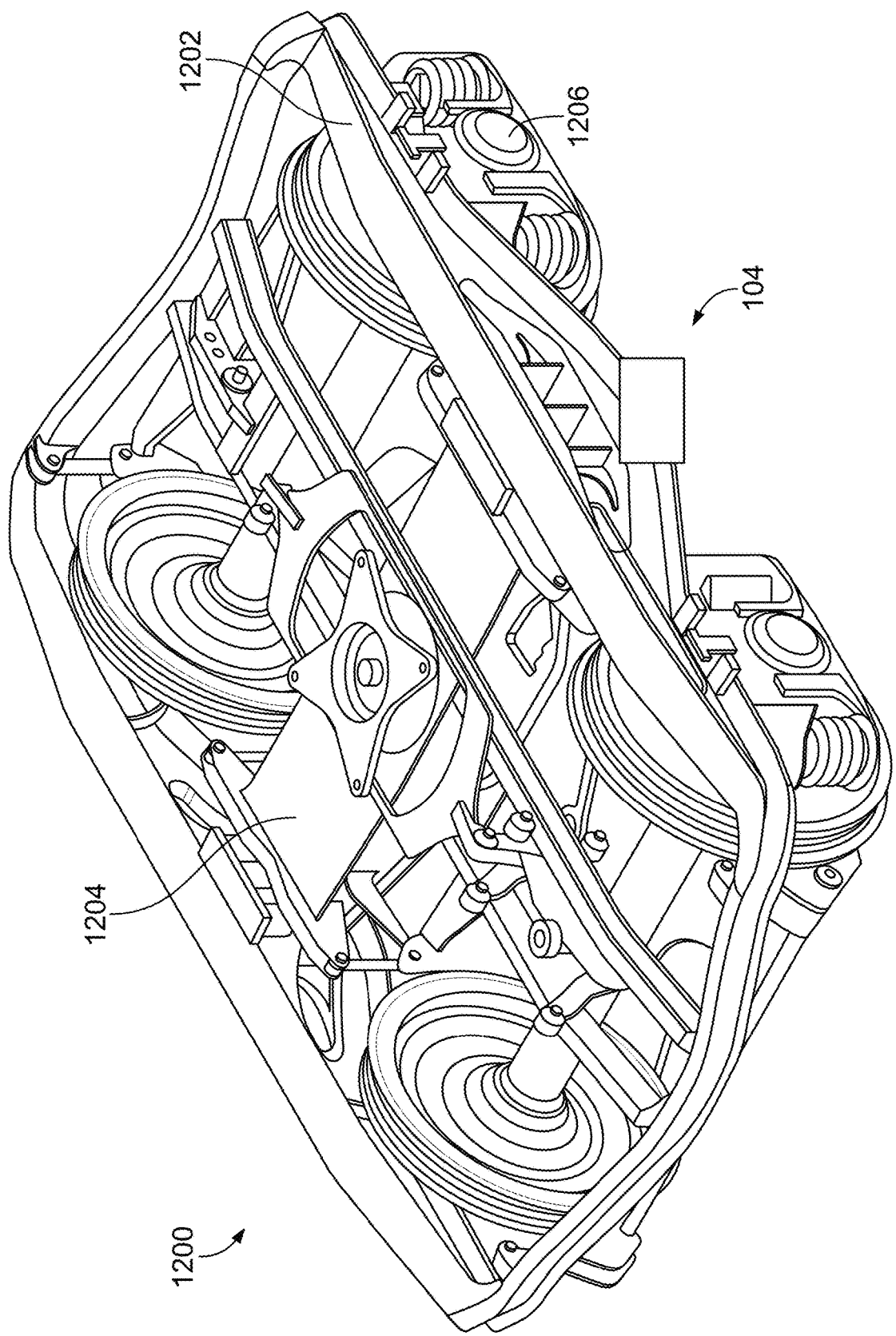
FIG. 12 is a perspective view of a typical European-style bogie showing a solidly connected bolster and side frame with independent suspension components on each bearing box.

In one embodiment, the BMD 104 performs initial processing on data from the one or more sensors of the BMD 104 and/or from other RANs 100 containing sensors. The BMD 104 communicates the data, initial results, other triggers, alerts, and/or requests to the other RANs 100 to gather more/relevant/needed data. The BMD 104 and/or other RANs 100 communicate with a remote server 406 and/or to the train-based network 207 (see FIG. 2) to facilitate determination of one or more parameters and/or conditions of one or more components of the railcar 103. The determination of the one or more parameters and/or conditions of the railcar 103 may include an analysis of historical data and/or data from other railcars 103. The one or more parameters of the one or more components of the railcar 103 may include, for example, wheel diameter, railcar speed, location, railcar orientation, wheel wear rates, surface conditions of wheels, bearings, and rails, tangent and curving wheelset/bogie performance, slipping and/or sliding of the wheels, the weight of the railcar 103 or the railcar load status (empty or loaded), and whether or not a brake shoe is engaged. The BMD 104 may monitor or facilitate monitoring of mass/weight and load status that may be used for logistics and for understanding performance variations that are affected by mass and subsequent inertial moment variation. Additional properties of the components of the railcar 103 that may be determined using the BMD 104 are discussed below. It should be noted that the BMD 104 can be mounted on other portions of the bogie such as a side frame of the bogie. For example and with reference to FIG. 12, the BMD 104 may be mounted on a side frame 1202 of a bogie 1200. The bogie 1200 has a solidly connected bolster 1204 and side frame 1202 with independent suspension components on each bearing box 1206. The mounting location of the BMD 104 may be dependent upon the design of the bogie which may vary, especially between countries according to regulatory standards and according to performance requirements, such as for mobile railway assets that need to move more fragile lading or accommodate different track designs.

As discussed in greater detail below with reference to FIG. 7, in some embodiments, the BMD 104 includes a processor 760, a power source 790 (e.g., a battery, solar cell or internal energy-harvesting capability), the GNSS circuitry 781 such as a global positioning system ("GPS") receiver, the one or more sensors 701, and communication circuitry 780 such as Wi-Fi, Bluetooth, LoRa, satellite, and/or cellular (e.g., 2G, 3G, 4G, 4G-LTE, 5G, NB-IoT, Cat M1), and other transceivers for long or short range communications that require higher and lower power for higher or lower data size transfers.

The output of the BMD 104 may be used to perform onboard monitoring of the performance of the bogie 300 including monitoring for impending failures of the bogie and other components of the mobile railway asset including, for example, the bearings, wheels, and axles. The BMD 104 may permit an operator to potentially extend the life of the bogies 300 and the wheelsets 321 (which may include axle 320, wheel 323, and bearing 331) thereof, reduce maintenance costs, and lower operating costs for a railcar 103 and or train consist 209 (e.g. lower fuel costs due to repair of bad actor bogie or wheel components) and a railway (e.g., reducing track maintenance costs by keeping bogies in good operating condition). Further, the BMD 104 may communicate an alert when a monitored component requires service. The BMD 104 may also infer, based on historical data for a component or comparative data for similar components, that maintenance is not required because although a detected parameter for the component (e.g. noise dB or acceleration magnitude) is beyond a threshold, the component is historically or comparatively near the threshold (e.g., about as noisy as or vibrates with a similar amplitude) of similar components in similar situations (e.g. the rough rail surface is causing significant vibration of all wheels in this area).

The BMD 104 may calculate or facilitate calculation of the wheel diameter of one or more of the wheels of the wheelset 321 as part of monitoring the performance of the bogie 300. The BMD 104 may calculate the wheel diameter using, for example, wheel turn frequency or rotations per second of the wheelset 321 and the ground speed of the railcar 103 determined using the GNSS circuitry 781. The rotations per second of the wheelset 321 may be calculated using vibration data that the BMD 104 detects from the wheelset 321. Multiple sensors (accelerometers, microphones, and/or strain gauges) may be used to separate the convoluted data (deconvolution) so that multiple wheelsets of a bogie or wheelsets in close proximity, such as those of another bogie of the mobile railway asset or an adjoining mobile railway asset, can be individually tracked.

Once the wheel diameter for the wheels 323 of a wheelset 321 have been calculated, the BMD 104 may calculate or facilitate calculation of the speed of the railcar 103 by multiplying the wheel diameter, pi, and the rotations per second of the wheelset 321. Likewise, the BMD 104 may utilize the wheel diameter to calculate or facilitate the calculation of a distance that the railcar 103 has traveled by monitoring the rotational speed of the wheelset 321 over time. The BMD 104 may thereby calculate the speed of the railcar 103 or distance traveled using ultra-low power accelerometer(s) and/or microphone(s) rather than GNSS circuitry 781 which may reduce battery consumption and may extend the useful life of a BMD 104.

The diameter of the wheels 323 on a wheelset 321 are not uniform along the axis of the axle 320 but generally have a tapered, sloped, or cupped surface. This means that the rotational velocity of the wheelset 321 is dependent upon where the rails are contacting the wheels 323. For example, if the rails in a particular stretch of track are wider or farther apart than another portion of track and the wheels 323 have a conical shape that tapers down to a smaller diameter at the corresponding contact locations of the wheels 323, then the wheelset 321 will rotate faster on this stretch of track even as the ground speed remains constant. Accordingly, the term wheel diameter as used herein refers to the running diameter of the wheelset 321. At a constant ground speed, the running diameter can vary significantly with time (over a period of milliseconds or seconds) as the wheelset 321 continually moves laterally (perpendicular to the rail) to balance the forces that act upon it, especially when the track gauge (i.e., the width between rails), curvature, cross-level, or alignment are varying significantly. Due to the variation in the running diameter, the rotational speed of a wheelset 321 may vary relative to the other wheelsets 321 of the train consist 209, usually by small amounts, but sometimes by large amounts if slippage occurs when frictional forces and dynamic rotary forces are insufficient to control the rotation according to generally well behaved and well understood wheel-to-rail contact physics. The running circumference may also change as the wheelset slips or moves in reaction to other common forces such as those experienced when a mobile railway asset, such as a railcar, enters or exits a curve. A defect in the wheel surface (called the wheel tread) such as a fatigue shell or a spall (where a portion of the surface becomes dislodged and falls off the wheel) or such as a flat spot (where the wheel was perhaps slid along the rail) may also cause changes in the running circumference and affect how the wheel rolls. It is therefore clear just how important it is to be able to measure the running circumference in all conditions and to assess the variations that are seen in the running circumference over time and in different environment and under different conditions of, for instance, weight and speed.

The BMD 104 includes communication circuitry 780 configured to communicate data from the BMD 104 to a remote device such as another BMD 104, a powered wireless gateway ("PWG") 202 (see FIG. 2), a user device 225, and/or a remote server 406. The data communicated between these devices may include values, thresholds, set points, algorithms, schedules, alerts, and/or historical data as some examples. The data communicated between the BMD 104 and the remote device(s) may also include the more common device needs of software/firmware updates and basic underlying network protocol data. In one approach, the remote server 406 maintains records of operating data from the BMD 104 that may be reviewed to determine when a failure occurred. For example, if a wheel surface condition on the bogie 300 was in good operating condition before the railcar 103 arrived at a location and was in poor operating condition after leaving said location, the owner of the railcar 103 may use the operational history from the BMD 104 to support a conclusion that the wheel surface condition was damaged at said location. The aforementioned records for comparison may also be stored locally on the BMD 104, another RAN 100, and/or on the PWG 202. Locally storing the records may be desired, for instance, if doing so facilitated a safety-related conclusion that may be desirable to have communicated directly to the remote server 406 or remote railroad operations center 220 or persons operating the train consist 209 for safety purposes.

The BMD 104 may determine or facilitate determination of a deviation in performance of a component from historical data which indicates a failure of the component. As an example in this regard, the BMD 103 may detect a 130-150 dB vibration noise from a bearing 331 when the typical vibration of said bearing 331 is near 80 dB for a known frequency range such that the BMD 103 determines a bearing failure condition.

Other examples may involve interaction between the RANs 100 and the historical data such as a process whereby the standard deviation of the running circumference of a wheelset 321 of a railcar 103 is tracked over time for loaded and empty states of the railcar 103. The loaded and empty states of the railcar 103 may be determined by a strain sensor and validated by a natural frequency measured by a microphone that utilizes a transform algorithm. The process may also include determinations of position using GNSS data during said prior data acquisitions to ensure that there are a number of sequential locations verified to lie in a straight line at a known ground speed to further corroborate the assessed behavior. The process may also involve a calculation of the railcar's 103 orientation relative to the track using GNSS data to perceive the differences between the signals from the GNSS when the railcar is oriented in one way or the other.

Train-Based Network and Railcar-Based Network

Regarding FIG. 2, a train-based network 207 is overlaid on a train consist 209 and includes the PWG 202 installed on a host or control point such as a locomotive 208, or on another mobile railway asset with access to a power source, and one or more RANs 100, each belonging to the train-based network 207 and to their respective railcar-based networks 105. As noted above, the BMDs 104 are examples of RANs 100 and may include the functionality discussed herein. In one embodiment, one or more BMDs 104 may be utilized on a railcar 103 with one or more other RANs 100. The BMDs 104 are configured communicate to a network 223 directly (such as using a cellular connection), indirectly via the PWG 202, or using both paths to provide a higher level of reliability. In one embodiment, one or more BMDs 104 and one or more other RANs 100 may be utilized on a railcar 103 and the BMDs 104 may communicate with a RAN 100 that relays communications to the PWG 202 directly or through other RANs 100 and/or BMDs 104 on other railcars 103.

The railcar-based network 105 is continually monitored by one or more of the RANs 100 and is optimized for the ever-changing wireless environment that a moving railcar 103 experiences. The train-based network 207 uses an overlay network that encompasses the railcar-based network 105 to support low-power bi-directional communication throughout train consist 209 and with a PWG 202 installed on locomotive 208. The overlaid train-based network 207 is coordinated at least in part by wireless transceivers embedded in the one or more RANs 100 on each railcar 103. Each RAN 100 can initiate a message on the train-based network 207 or relay a message from or to another RAN 100 and/or to an external device such as a remote server. The overlaid train-based network 207 is created independently of and operates independently of the railcar-based networks 105 created by each railcar 103 in the train consist 209.

The bi-directional PWG 202 manages the train-based network 207 and communicates alerts from the RANs 100 installed on individual railcars 103 to the host or control point, such as the locomotive 208, wherein the alerts may be acted upon with the lowest possible latency or quickly facilitate human intervention. Locomotive 208 may include a user interface for receiving and displaying alert messages generated by train-based network 207 or any of the individual railcar-based networks 105. Bi-directional PWG 202 is capable of receiving multiple alerts, events or raw data from RANs 100 (e.g., BMDs 104) on individual railcars 103 and can draw inferences about specific aspects of the performance of train consist 209.

The bi-directional PWG 202 is capable of exchanging information with an external remote railroad operations center 220, data system or other train management system. The remote server 406 may be a part of, or separate from, the remote railroad operations center 220 such a cloud computing server farm. The remote server 406 may include a processor 412, memory 414, and a network interface 416. The processor 412 may communicate via the network 223 via the network interface 416. The processor 412 may receive data from one or more railcars 103 via the network interface 416 and determine one or more parameters and/or conditions of one or more components of the one or more railcars 103. The processor 412 may store the data received and determinations in memory 414. The communication path 222 between the power wireless gateway 202 and/or the BMDs 104 and the network 223 may include cellular, LAN, Wi-Fi, Bluetooth, satellite, and/or other means of communications. The communication path 222 can be used to send alerts off-train or off-railcar regardless of whether the train consist 209 is in operation.

The RANs 100 such as the BMDs 104 may include a processor, a power source (e.g., a battery, solar cell or internal power-harvesting capability), a GNSS device such as a global positioning system ("GPS") receiver, Wi-Fi, satellite, and/or cellular capability, a wireless communications capability for maintaining the railcar-based network 105 and, optionally, one or more sensors, including, but not limited to, an accelerometer, a microphone, reed switch or temperature sensor. Those skilled in the art will appreciate that GPS is just one form of a GNSS. Other types of GNSS include GLONASS, Galileo and BeiDou, etc. with others in development. Accordingly, although GPS is used in the embodiments described herein, any type of GNSS or devices may be used. The RANs 100 may support a network configuration using proprietary or open standard protocols, such as the IEEE 2.4 GHz 802.15.4 radio standard. Additionally, the RANs 100 can also be a member of a train-based network 207, which consists of the RANs 100 from all enabled railcars 103 in the train consist 209, controlled by a powered wireless gateway 202, typically located on a locomotive 208.

In some embodiments, the RANs 100 may each provide one or more of the following four functions: 1) to manage a railcar-based network 105 of a railcar 103; 2) to consolidate data from one or more RANs 100 in the railcar-based network 105 and to apply logic to the data gathered to generate warning alerts; 3) to support built-in sensors, such as an accelerometer, within the RANs 100 to monitor specific attributes of the railcar 103 such as location, speed, accelerations and more; and 4) to support bi-directional communication upstream to the host or control point, such as the powered wireless gateway 202 if the RAN 100 is part of a train-based network 207 and/or an off-train or off-railcar monitoring and remote railroad operations center 220. RANs 100 may communicate wirelessly to the PWG 202 or may be configured to communicate through a wired connection, for example, through the electronically controlled pneumatic ("ECP") brake system.

In some embodiments, the RANs 100 are capable of receiving data and/or alarms from one or more RANs 100 and are capable of drawing inferences from this data and generating alarms regarding the performance of railcar 103, and of transmitting data and alarm information to an external device such as a remote server. A RAN 100 may be a single unit that serves as a communications link to other devices and has the capability of processing the data received. The other devices may include, but are not limited to, for example, a mobile base station, a powered wireless gateway 202 in the locomotive 208 or a land-based base station. The RANs 100 may also communicate with, control and monitor other RANs 100 in the railcar-based network 105. It should be noted that any RAN 100 in a train-based network may assume the role, and function as any other RAN 100, if so intended.

The PWG 202 may be located either on a locomotive 208 or deployed as part of a rail yard based network. For example, the PWG 202 may take the form of a stationary gateway at a rail facility. The PWG 202 may include a processor, a GNSS receiver, a satellite and/or cellular communication system, local wireless transceiver (e.g., WiFi), an Ethernet port, a low power, wide area ("LPWA") network manager and other means of communication. The PWG 202 will have power supplied by the locomotive 208, if located on a powered mobile railway asset, such as a locomotive 208, or will derive its power from another source, for example, from a solar power generator or from a high-capacity battery.

The components and configuration of the PWG 202 are similar to that of the RANs 100, with the PWG 202 drawing power from an external source or being self-powered, while the RANs 100 are typically self-powered. Additionally, the PWG 202 collects data and draws inferences regarding the performance of the train consist 209, and train-based network 207, as opposed to RANs 100, which draw inferences primarily regarding the performance of individual railcars 103 and railcar-based network 105.

A train-based network, shown in the drawings as reference number 207, may consist of a powered PWG 202 on a locomotive 208, which is part of and manages a train-based network 207 of a plurality of RANs 100, each of which may be deployed on a railcar 103. The locomotive 208 and plurality of railcars 103 form a train consist 209. A train-based network 207 is identified by a unique identifier.

The discussion in this application focuses on the context of a railcar 103; however, it will be understood by one of skill in the art that the apparatuses and methods disclosed herein are applicable to any mobile railway asset, such as locomotives and track repair vehicles. For example, a RAN 100 may be located on various types of mobile railway assets, such as a locomotive, a railcar, and/or a service vehicle. Further, while the railcar 103 of FIG. 1 is shown with two bogies 300 each having two wheelsets 321, the disclosures of this application are applicable to any configuration with more or fewer bogies 300 or wheelsets 321 as parts of a bogie 300.

Referring to FIG. 1, a RAN 100 such as the BMD 104 may be affixed directly to the railcar 103 through any suitable approach, for example, using self-tapping mounting screws or other metal mounting screws. An additional method of attaching a RAN 100 to railcar 103 is to weld a mounting bracket to the railcar 103 and connect the RAN 100 to the mounting bracket with adhesive, by welding, and/or by fasteners such as screws, or magnets. In other embodiments, the RAN 100 is integral with the railcar 103. For example, the BMD 104 is an integral part of the bolster 316 of the railcar 103 and formed with the bolster 316 during assembly.

In one embodiment, the RAN 100 is able to be configured by one or a more RANs 100 to transmit, listen, or sleep at precise planned times, as a group to minimize power consumption. The one or more RANs 101 on each railcar 103 may include GNSS circuitry to determine location, direction, and/or speed of railcar 103. Additionally, RANs 101 on each railcar 103 can independently use built-in sensors or the sensors may be managed by the railcar-based network 105 based on the ability or need of the railcar-based network 105 to generate messages for being sent to a host or control point, such as a locomotive 208.

Referring now to FIG. 2, RANs 100 installed on railcar 103 may collect data regarding the operation of the railcar 103 from one or more RANs 100 installed on railcar 103. The RANs 100 transmit data to other RANs 100, and vice versa. RANs 100 connect with train-based network 207 overlaid on train consist 209 to transmit data to a powered wireless gateway 202 installed on locomotive 208, to a remote operations center 220 and/or remote server 406.

When communicating locally with other RANs 100, the RANs 100 may use a networking protocol designed to lower power consumption, and have an integrated radio transceiver and antenna that is certified for operation in the license-free band. Each RAN 100 may be equipped with an ultra-low power microcontroller that allows sampling and extensive on-board computations, including fast Fourier transforms (FFTs), digital filtering, and trending or predictive analysis. The RANs 100 may be powered by primary batteries, rechargeable batteries, and/or by capacitive means. In some embodiments, a solar, movement, and/or temperature energy harvesting device may be used. The circuitry of the RANs 100 includes power conditioning and management functionality and may include a feature to conserve battery life, which keeps the RANs 100 in a standby state and periodically or asynchronously wakes the RAN 100 to deliver readings from on-board sensors.

In some embodiments, one or more of the RAN 100 of a railcar 103 may also act as a router that is capable of communicating with any other RANs 100 within communication range and assigned to the railcar-based network 105, thereby creating redundant communication paths within the railcar-based network 105. In other embodiments, the RANs 100 may communicate directly off-railcar with locomotive 208, the remote server 406, or a remote railroad operations center 220.

The RANs 100 may be configured for a particular parameter or condition to be monitored, for example, the temperature of a tank, and can be placed on railcar 103 in a location chosen for such monitoring. Each RAN 100 may have one or multiple sensing devices sensing multiple operational parameters.

To communicate collected data, each RAN 100 may be in two-way communication with another RAN 100. The RAN 100 may collect data from one or more RANs 100. The RANs 100 connected to the same railcar 103 may form a local area ad hoc railcar-based network 105 to facilitate communications therebetween. Message packet exchanges are synchronized so that no packets collide on the railcar-based network 105, and every packet may be scheduled and synchronized for energy efficiency.

Communication traffic on railcar-based network 105 may be protected by end-to-end 128-bit (or higher) AES based encryption, message integrity checking, and device authentication. The RANs 100 may be capable of performing advanced data analysis, using data collected from multiple RANs 100 and may apply heuristics to draw conclusions based on the analysis.

Data Processing Platform

The data processing platform is responsible for implementing the intelligence used to process data collected from RANs 100 and/or PWGs 202. The data processing platform may be configured to analyze data collected from the RANs 100 and/or PWGs 202 to determine parameters, conditions, and/or apply heuristics to draw conclusions regarding one or more of the railcars 103 and/or the train consist 209 as a whole. The data processing platform may be distributed among one or more of the RANs 100 on a railcar, PWG 202 on the locomotive 208, PWG 202 installed in a rail yard, and/or utilizing a cloud-based computing infrastructure. The cloud-based computing infrastructure may be optimized to work closely with railcar-based networks 105, train-based networks 207, and rail yard-based networks, in conjunction with a variety of data streams from third-party providers or external sources.

The data processing platform preferably has an extensible architecture using a distributed complex event processing ("DCEP") engine, which can be scaled to support millions of individual pieces of data from train-based networks 207 and from railroad data sources (e.g., a source providing waybill data) across a global network. DCEP distributes decision making to the lowest possible level to avoid the excessive power consumption and bandwidth utilization that would otherwise be required to move large amounts of data from a train-based or railcar-based network to a remote server(s) and/or cloud-based data processing system.

When DCEP is used in conjunction with a RAN 100 that has DCEP embedded software deployed, the platform has the capacity to filter and execute millions of events per second in real time. Specific software to detect an event in real time, based on collected data readings may be embedded in each RAN 100.

The DCEP engine aggregates data streams, such as events and metadata, through data stream adapters from varied sources to include customer data, environmental data, as well as data from the RANs 100. The DCEP comprises data stream adapters, a temporal analysis module, a spatial analysis module, a rules engine and a publisher module.

A temporal analysis module processes data to determine changes in values over time. For example, a RAN 100 is measuring the temperature of a tank. The RAN 100 may determine the change in temperature readings over a specific time period allowing further analysis to be done such as determining likelihood of a loading or a theft event.

A rules engine is an application module where detailed operating parameters are stored such that when data from the temporal and spatial modules is sent to said module it will compare the data to the detailed operating parameters. Based on this comparison, only the data determined to be critical is transmitted to a publisher (where the information is destined for another system or user). The rules engine drives filters and logic to the source, which could be a RAN 100 and/or a PWG 202, where the source reviews many data points, coalescing the data into practical events such as alerts, reports, and dashboards.

Data is processed through the temporal and spatial analysis modules followed by a set of rules engine filters which determine critical from non-critical information based on the specific ruleset defined. Information may be pushed to a third-party integration platform where operational decisions, enterprise resource planning ("ERP") transactions, dashboards, and alerts can be actioned.

For example, a BMD 104, which is an example of a RAN 100, is installed on a railcar 103 along with another RAN 100 on a hand brake of the railcar 103 to determine when the hand brake is applied. The BMD 104 sends data measured from the BMD 104 and from the RAN 100 monitoring the hand brake to an integration endpoint system (i.e., a cloud-based or on-premise server). This data also can be referred to as a data stream from a mobile railway asset or fleet of mobile railway assets. At the same time, a data stream from a source providing railcar 103 waybill data is collected by the integration endpoint system where the data is aggregated with the asset data stream then processed through specific rules and event filters. The data generated after processing by the filters can be converted into an informational message and as the same time pushed to an end user ERP system or to a web-based interface. The ERP system further may process data and push results to sources such as a maintenance department of a railroad for further action.

Bogie Monitoring System

Figure 3:
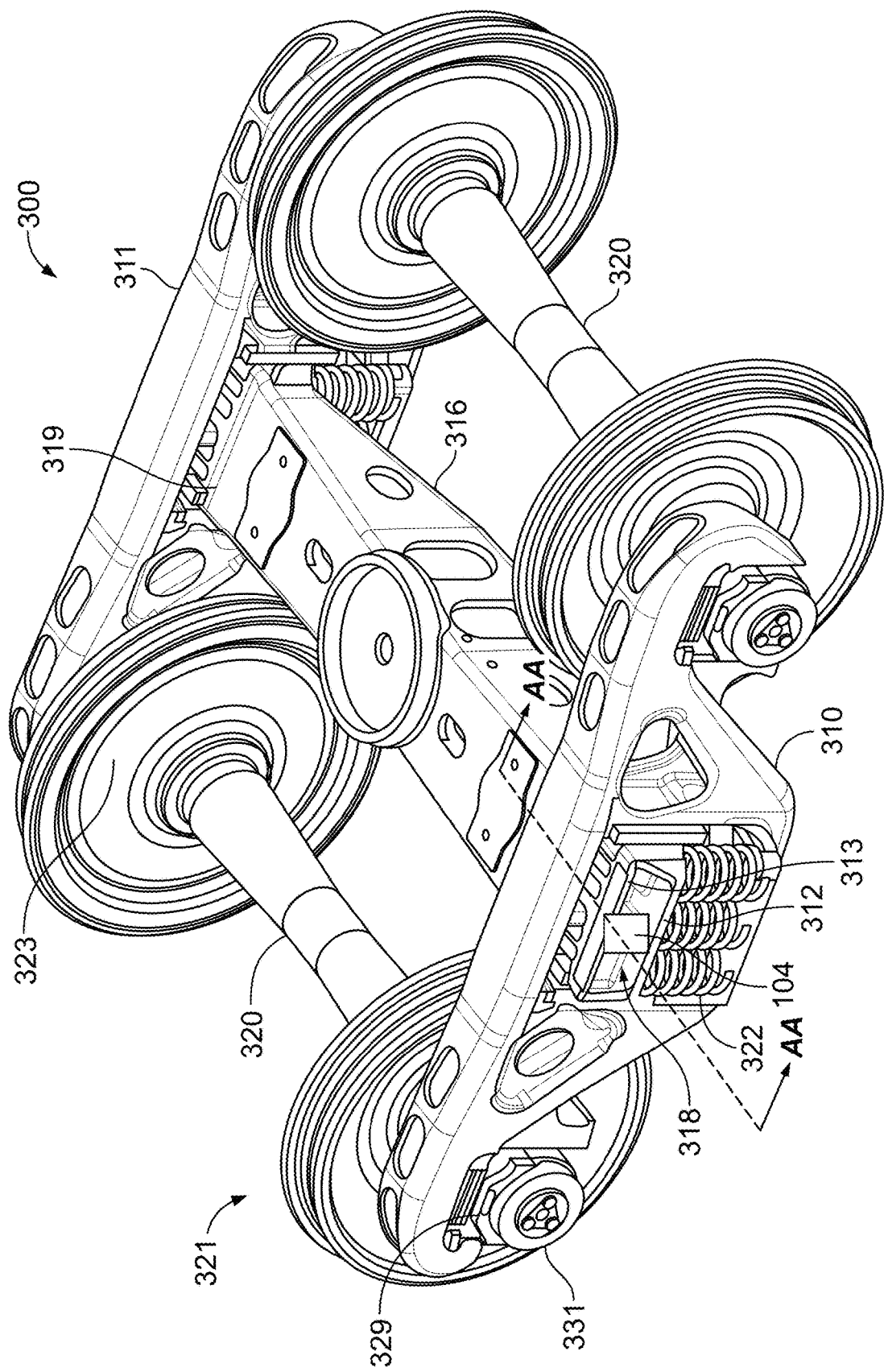
FIG. 3 is a perspective view of one of the bogies of FIG. 1 showing a bolster supported on springs of the bogie.

Regarding FIG. 3, one of the bogies 300 of the railcar 103 is shown with side frames 310 and 311. The railcar bogie 300 has a bolster 316 connected between the side frames 310 and 311. The bolster 316 has an end portion 318 received in a side frame 310 and an opposite end portion 319 received in the side frame 311. Regarding FIG. 4, the end portion 318 of the bolster 316 includes an upper portion 313 such as a lip, a lower portion 312 such as a lip, side portions 403, 405 extending between the upper and lower portions 313, 312, and an opening such as a pocket 409. The bogie 300 includes resilient members, such as springs 322, that apply an upward force on the lower portion 312 at bolster end portions 318, 319 and support the bolster 316 in recesses 407 of the side frames 310, 311. The bogie 300 includes wheelsets 302 that each include an axle 321, two bearings 331, and two wheels 323 fixed to the axle. The bogie 300 further includes bearing adapters 329 providing the interface between the bearings 331 and the side frames 310, 311.

Figure 4:
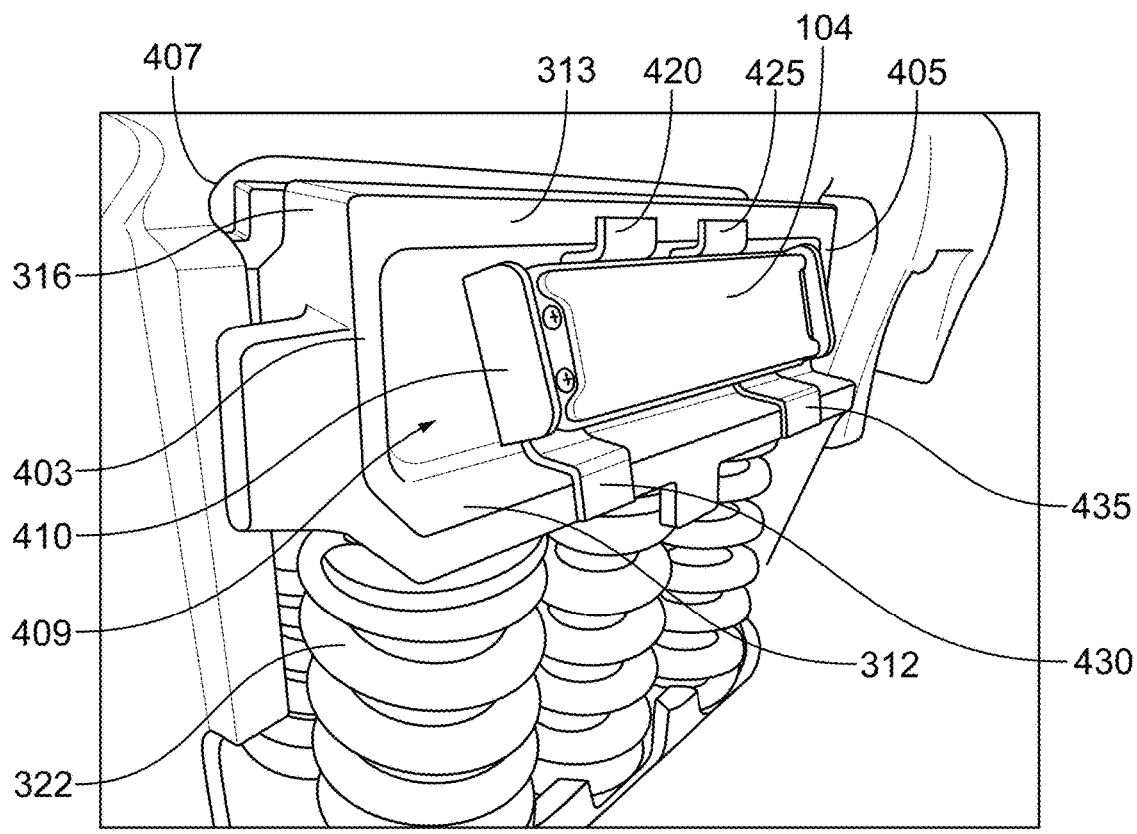
FIG. 4 is a perspective view of one end portion of the bolster of the bogie of FIG. 3 showing a bogie monitoring device on a bracket mounted to an end portion of the bolster.
Figure 5:
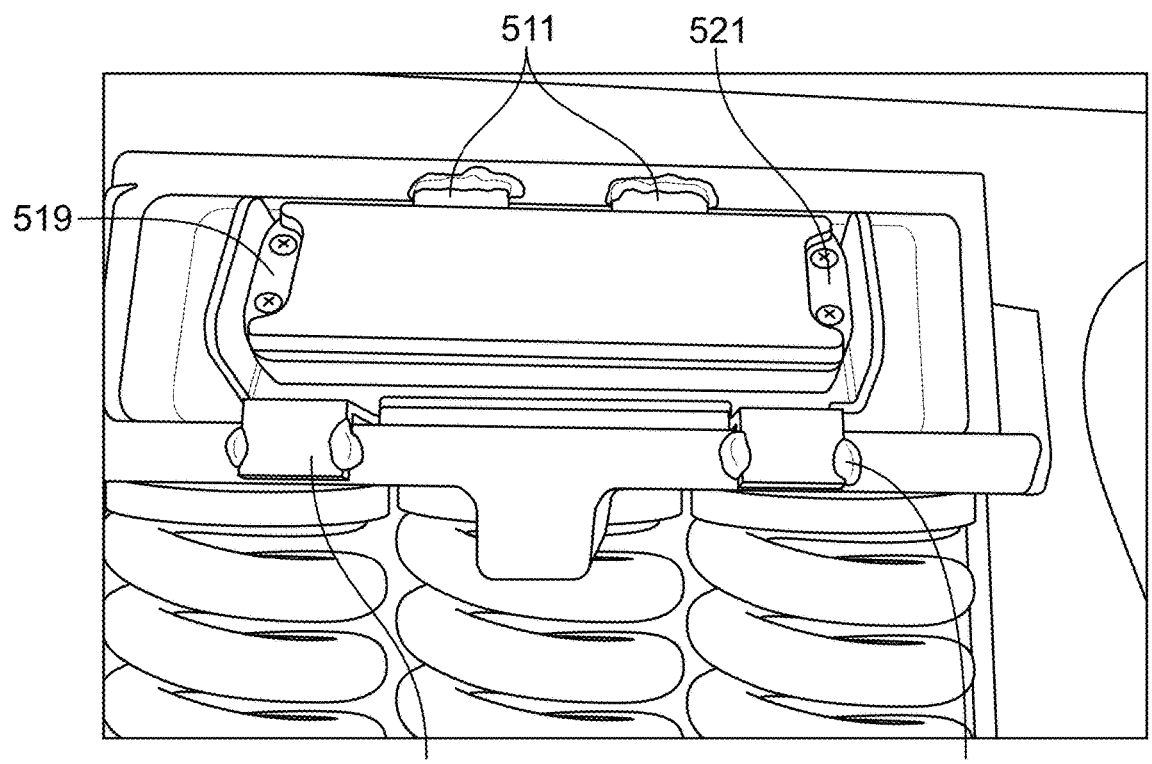
FIG. 5 is a side elevational view of the end portion of the bolster of FIG. 4 showing tabs of the bracket secured to upper and lower portions of the end portion of the bolster.

Regarding FIG. 4, in one embodiment, the BMD 104 is mounted in the pocket 409 of the bolster 316 via a mount, such as a bracket 410, that bridges that upper and lower portions 313, 312 of the bolster 316. The railcar 103 may have a single BMD 104 per bolster 316, or may have two, as some examples. As discussed below, the bracket 410 may mechanically amplify the strain experienced by the bolster 316 which facilitates measurement of the strain using a strain sensor of the BMD 104. The bracket 410 may thereby operate as a strain member. FIGS. 4 and 5 illustrate the bracket 410 has an upper portion 511 that may be secured to the upper portion 313 of the bolster 316 and a lower portion 513 that may be secured to the lower portion 312. The upper and lower portions 511, 513 may be secured to the bolster 316 using, for example, welds 515.

In one embodiment, the bracket 410 has upper tabs 420 and 425 and lower tabs 430 and 435 that are welded to the upper and lower portions 313, 312 of the bolster 316. The upper tabs 420, 425 and the lower tabs 430, 435 generally conform to the upper and lower portions 313, 312 of the bolster end portion 318 or 319. Regarding FIGS. 6A and 6B, the upper tabs 420, 425 and lower tabs 430, 435 are connected by a plate 610 of the bracket 410.

The BMD 104 has a body 411 that includes the bracket 410 and a housing 408. The housing 408 that is mounted to the bracket 410, such as by fasteners (e.g., self-tapping screws), and has one or more strain sensors 611 mounted to the plate 610 to detect strain in the plate 610. FIGS. 4 and 5 illustrate the BMD 104 installed in the end of a bolster using the bracket 410. The bracket 410 has a portion thereof that experiences a greater deformation, e.g., change in bending or change in orientation, than the upper and lower portions 313, 312 of the bolster 316 so that the bracket 410 amplifies the deformation of the bolster 316. By amplifying the deformation of the bolster 316, the strain sensor of the BMD 104 may detect the strain of the portion of the bracket 410 more easily than detecting the strain of the bolster 316 directly. In other embodiments, such as if the BMD 104 is integral with the bolster 316, the strain sensor of the BMD 104 may directly measure the strain of the bolster 316.

Figure 6A:
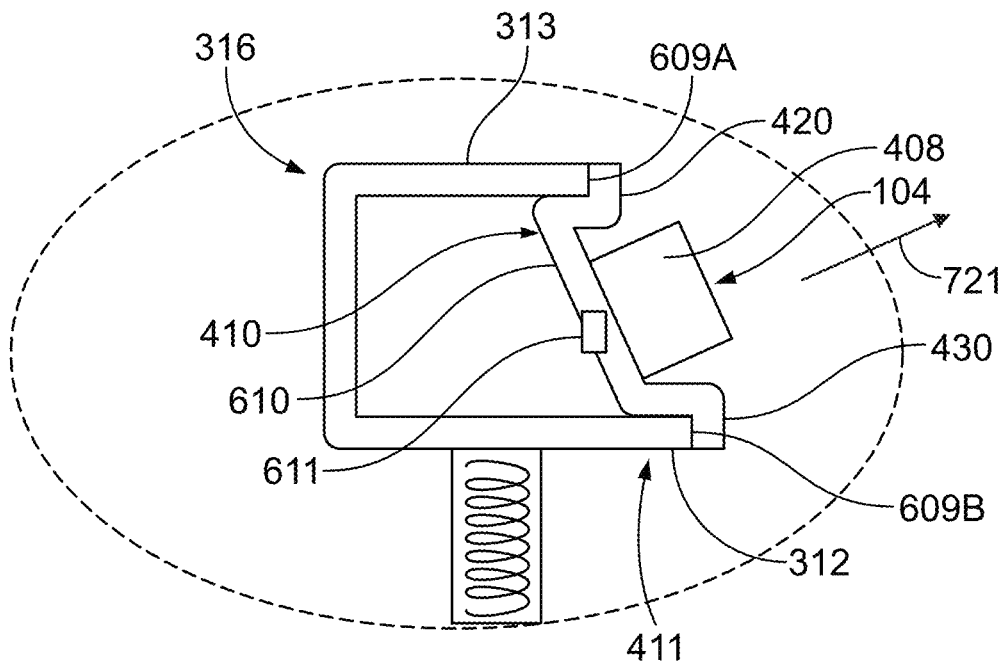
FIG. 6A is a schematic representation of a cross-section taken across line AA-AA in FIG. 3 showing the bolster in an unloaded configuration.
Figure 6B:
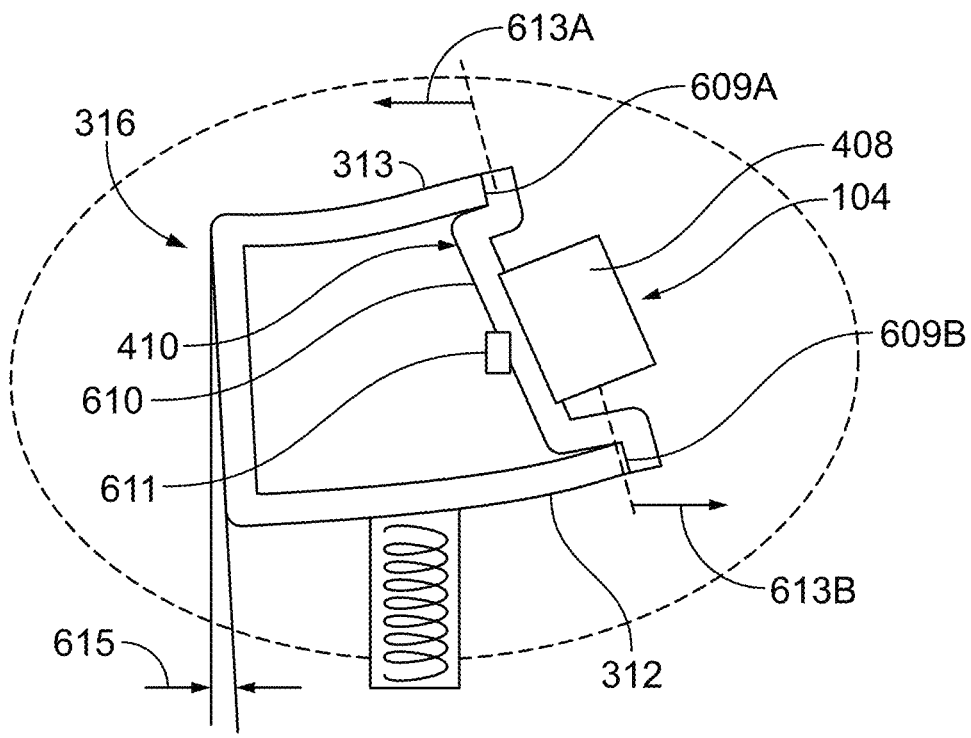
FIG. 6B is a schematic view similar to FIG. 6A showing the bolster in a loaded configuration which shifts the ends of the upper and lower portions of the bolster relative to each other and produces strain in the bracket that is detected by a strain sensor(s) of the bogie monitoring device.

The bolster 316 of a railcar bogie 300 deforms based at least in part on the weight of the load contained within the railcar 103. Regarding FIGS. 6A and 6B, a schematic representation of a cross section taken along line A-A in FIG. 3 of one of the bolster end portions 318, 319 illustrating the deformation of the bolster 316. FIG. 6A is an example of the bolster 316 in an initial, unloaded state such as when the railcar 103 is empty. There, the upper portion 313 and the lower portion 312 have ends 609A, 609B that are parallel to one another and, as a result, little or no strain is created in the plate 610. FIG. 6B is an example of the bolster 316 in a loaded state. There, the bolster 316 has deformed downward toward the earth (e.g. bowed) because the railcar has been loaded. As a result of the bowing, the ends 609A, 609B of the upper portion 313 and the lower portion 312 shift in and out, respectively, in directions 613A, 613B generally orthogonal to the side frames 310, 311. For example, the end 609A may shift in direction 613A a distance of 0.001 inch and the end 609B may shift in direction 613B a distance of 0.001 inch. The ends 609A, 609B may also experience relative angular 615 movement as the bolster 316 bends.

The bracket 410 resists the angular motion and shifting of the ends 609A, 609B apart from one another which creates a significant strain in the plate 610. The strain created by the load is measured by the strain sensor(s) 611 attached to the plate 610. The strain sensor(s) 611 may be attached to the plate 610 such as at locations that neutralize the effects of twist or thermal effects to produce a signal that varies mainly due to changes in vertical load.

The BMD 104 may thereby utilize the relative shifting of ends 609A, 609B of the bolster 316 to produce an amplified or magnified strain in the plate 610 that may be measured by the strain sensors(s) 611 of the BMD 104. Further, the bracket 410 may be welded to the ends 609A, 609B of the bolster 316 without specialized training for the installer. In other embodiments, the bracket 410 may be attached by other means such as self-tapping screws or magnets. Once the bracket 410 is welded to the bolster 316, the BMD 104 may not materially affect the behavior of the bolster 316 due to the size and rigidity of the bracket 410 in comparison to the bolster 316. This makes the BMD 104 easy to install on a mobile railway asset in the field without having to disassemble the bogie 300.

In one embodiment, the BMD 104 may be installed on a bolster 316 whether the bolster is in a loaded or an unloaded configuration. In FIG. 7, the processor 760 determines a baseline for the strain detected by the strain sensor(s) 611 when the BMD 104 is initialized. The processor 760 may infer that a subsequent decrease in the strain is due to unloading of the railcar 103 and therefore the installation was performed in the loaded condition. Alternatively, the processor 760 may infer that a subsequent increase in the strain is due to loading of the railcar 103 and therefore the installation was performed in the unloaded condition.

Further, the BMD 104 may include a temperature sensor 710 (see FIG. 7) that permits the processor 760 to compensate for changes in strain detected by the strain sensor(s) 611 that may be caused by temperature changes. Inferences may be made to compensate for these variations instead of or in addition to utilizing various physical design modifications of the bracket or the configurations of the strain sensors.

The processor 760 of the BMD 104 (or another device) may calculate the load in the railcar 103 more precisely by using the strain measured in the plate 610 and by correlating this to known weight conditions such as those provided by waybills, by weigh scale readings, by wayside weigh-in-motion detectors, or by a database that includes the tare weight and the maximum allowable weight in the railcar 103. Further or alternate improvements in precision and/or confidence of the calculated weight may be achieved by additional correlations to other weight-dependent measurements such as the natural vibrational frequency of various components that may be detected using a microphone or an accelerometer. Examples of these components include the side frame 311 and bolster 316 and wheel 323, whose natural frequencies increase under load like a strained guitar string. Additionally, the response of the railcar to a vertical input, such as a bump in the track that is sometimes present at a highway road crossing, will also be affected by a weight which causes an inverse relationship to the decay of the bouncing motion (i.e., a heavier weight of the railcar 103 produces a slower bounce decay).

The BMD 104 may monitor the strain data from strain sensor(s) 611 to provide static monitoring of the weight of the railcar 103 and send an alert to the remote railroad operations center 220 if the weight changes, such as occurs from a leak in a tank railcar 103. The BMD 104 may also monitor the strain data from strain sensor 611 as the railcar 103 travels along a track to provide dynamic monitoring of the weight of the railcar 103 to assess, for example, the performance of the vertical dampeners (e.g. friction wedge assemblies).

In some applications, the placement of a BMD 104 on the bolster 316 of the bogie 300 allows for improved data collection for the components of the bogie 300 and, as a result, the number of sensors installed on the railcar 103 can be drastically reduced for some applications. For example, mounting of the BMD 104 on the bolster 316 allows accurate measurement of weight and wheelset running diameter and subsequent speed and mileage when the GNSS system is inoperative such as in a tunnel or deactivated to conserve energy. Weight and wheelset running diameter are used for calculating a multitude of parameters of the railcar 103 and determining inferences regarding one or more characteristics of the railcar 103 based on the parameters. As an example in this regard, the railcar 103 has a body 1109 (see FIG. 1) such as a tank for carrying a liquid. The body 1109 behaves like a mass in a mass-spring-damper system and the springs 322 operate as the spring. When the tank is filled with liquid, the body 1109 has a high mass, and the body 1109 will bounce slowly on the springs 322 and the bouncing will generally decay slowly. When the tank is empty, the body has a low mass, the body will bounce faster, and the bouncing may decay very quickly. The strain sensor(s) 611, an accelerometer 720, and/or a microphone 740 may detect the vibrations of the body 1109 and the frequency of the vibrations of the body 1109 may be analyzed to determine whether the body 1109 is loaded or unloaded and to estimate the weight of the load of the railcar 103. The gyroscope 714 may also be used to detect bouncing and rocking motions as well as vibrations of the railcar 103 that may be analyzed to determine whether the railcar 103 is loaded or unloaded and to estimate the weight of the load of the railcar 103.

As another example, the railcar 103 may take the form of a gondola railcar having panels. The BMD 104 may include a microphone 740 that detects a rattle of panels of the gondola railcar in the 500 Hz to 1 k Hz range when the gondola railcar is empty. When the gondola railcar is full, the panels may not rattle such that the microphone 740 does not detect a corresponding sound and the processor 760 of the BMD 104 may infer that the railcar 103 is loaded.

Figure 7:
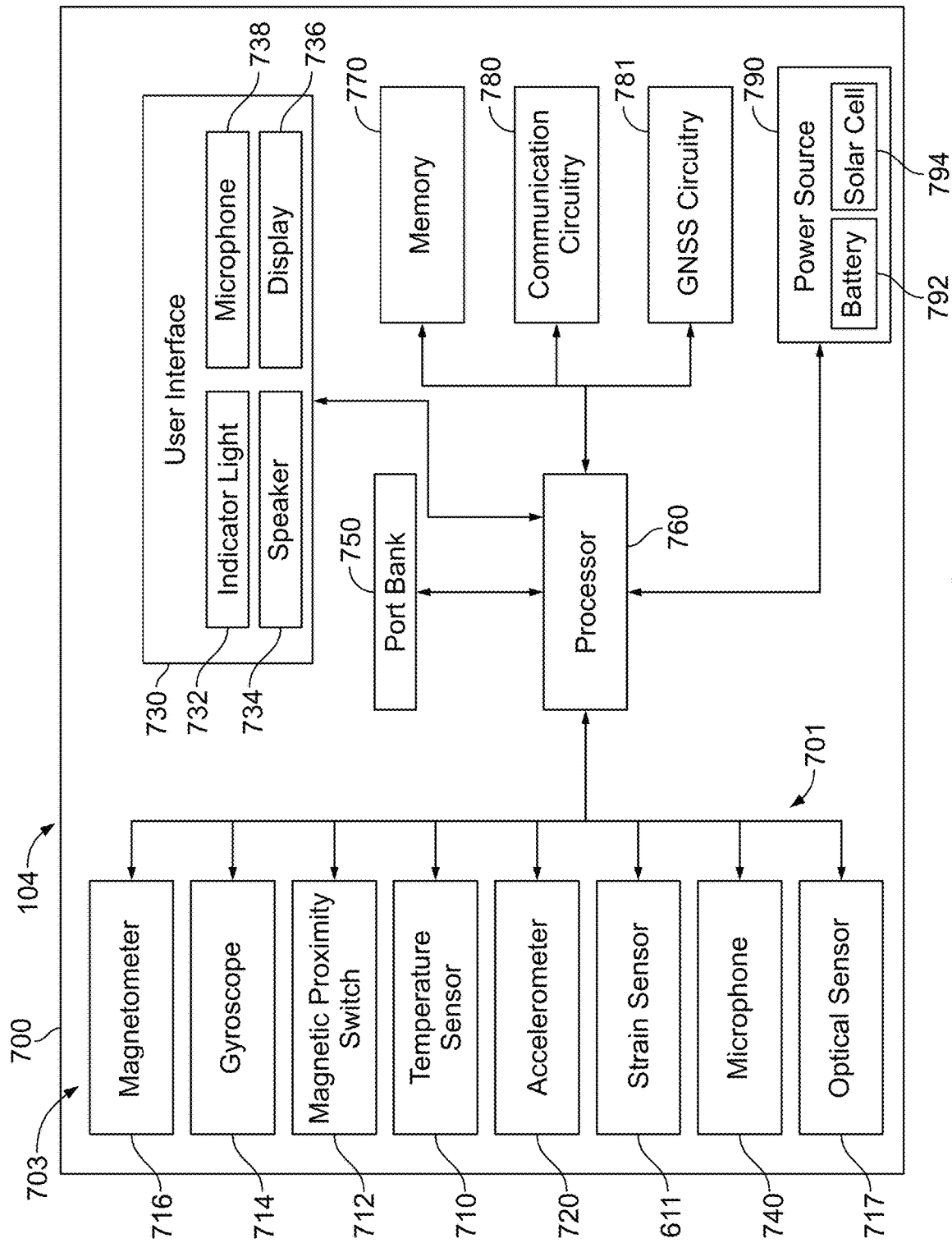
FIG. 7 is a block diagram of the bogie monitoring device of FIG. 4.

Regarding FIG. 7, the BMD 104 may include a housing 700 and the one or more sensors 701 of the BMD 104. The sensors 701 may be in the housing 700 or outside of the housing 700 and be operatively coupled to the processor 760 of the BMD 104, such as via a wired or wireless link. The one or more sensors 701 may include, but is not limited to, one or more temperature sensors 710, one or more accelerometers 720, one or more strain sensors 611, one or more microphones 740, one or more magnetic proximity switches 712, one or more gyroscopes 714, and/or one or more magnetometers 716. The strain sensor 611 may be an extensometer or a capacitive, an inductive, and/or an optical sensor 717. Examples of optical sensors includes sensors that use light transmission and/or reflection to measure displacement. For example, the strain sensor 611 may include a strain gauge having resistance that changes with stretching and contracting of the strain gauge.

The BMD 104 further includes the processor 760 that processes data generated by the sensors 701. The processing may be, for example, any of the techniques discussed with respect the BMD 104 or any other RAN 100, above. The BMD 104 has a power source 790, such as a battery or an energy harvesting device based, for example, on solar energy, movement, or temperature differential. The BMD 104 includes a port bank 750 including ports for receiving power and data. For example, one or more external sensors may have a wired connection to the BMD 104 via port bank 750 and communicate sensor data.

The BMD 104 may include a user interface 730 through which data or information may be communicated between a user and the BMD 104. The user interface 730 may include one or more indicator lights 732 (e.g., LEDs), one or more audio transducers such as a speaker 734 and a microphone 738, and a display 736 to alert, notify, or provide information to a user at the BMD 104. As one example, the indicator lights 732 may indicate the charge level of a battery 792 of the power source 790 of the BMD 104. The indicator lights 732 may be multi-colored LEDs and configured to emit, for example, green light for a high charge level, yellow light for a medium charge level, and red light for a low charge level. As another example, the indicator lights 732 may illuminate to provide a visual indication that the BMD 104 has connected wirelessly to another device, such as a connection to a wireless network or a direct wireless connection to a device such as a Bluetooth® connection with a user device. As another example, a user device connected to the BMD 104 via Bluetooth® may be used for interfacing with the BMD 104. As another example, the indicator lights 732 may illuminate to indicate the BMD 104 has determined a component of the railcar 103 needs to be serviced. The BMD 104 may also include a display 736 (e.g., a touchscreen or LCD screen) for displaying information detected by the BMD 104 to the user, e.g., the charge level of the battery 792 or whether a problem has been identified. Where the display 736 is a touchscreen display, the user may input data or selections into the BMD 104 via the touchscreen display. In other forms, the BMD 104 may include one or more buttons enabling the user to input data or make selections. The speaker 734 may similarly be used to provide an audible alert or notification of a problem or condition identified by the BMD 104. The user interface 730 may further include the microphone 738 permitting the user to speak voice commands to change one or more settings of the BMD 104. In one form, a user may communicate with another user via the microphone 738 and speaker 734 of the user interface 730. For example, a technician servicing the BMD 104 or the railcar 103 may place or receive a call (e.g., a VoIP call) using the user interface 730 and communication circuitry 780 of the BMD 104.

The processor 760 is further connected to memory 770 and communication circuitry 780. The memory 770 may comprise one or more dynamic or permanent memories such a DRAM memory and NAND flash memory. The memory 770 is an example of a non-transitory computer readable medium. The memory 770 may include instructions stored thereon that, when executed by the processor 760, cause the processor 760 to perform operations as discussed herein.

The communication circuitry 780 may comprise one or more interfaces for enabling wired or wireless communications with other external devices such as sensor nodes 102, PWG 202, the remote railroad operations center 220, remote server 406, and/or a user device 225 such as a PC, tablet computer, smartphone, or smartwatch. For example, the communication circuitry 780 may be capable of communicating using Bluetooth®, WiFi, and any number of cellular communications technologies. The processor 760 is further connected to the GNSS circuitry 781 receive GNSS data and determine the position of the BMD 104 on earth.

The processor 760 may determine or facilitate determination of the running dimension of the wheelset 321, such as wheelset running diameter, circumference, and/or radius. For example, the wheelset running diameter may be calculated from the ground speed (e.g. 32.00 mph) (determined by the GPS circuitry) divided by the rotational velocity (e.g. 5 revolutions per second) (determined using an accelerometer) and converted to inches as shown by the equation below.

running circumference ((inches/revolution)) = 32 miles / hour × second / 5 revolutions × 1 hour / 3600 seconds × 5280 feet / 1 mile × 12 inches / 1 feet The resultant running circumference is 112.64 inches (2.861 m) and the running diameter is the running circumference divided by pi. The resultant running diameter is therefore 35.854 inches (910.7 mm).

The ground speed in the above example might be accomplished by acquiring a GNSS fix and capturing several speeds across a five second length of time where, for instance, the speed was unwavering and was exactly 32.00 mph (this speed is chosen for this example to simplify the explanation). The rotational velocity in the above example may be calculated by the following: In exactly the same time frame as above, across a five second length, data may have been captured from an arrangement of accelerometers and microphones. By using various digital filters, deconvolution algorithms, and autocorrelation (serial correlation or time series) algorithms, the rotational velocity of the wheelset 321 may be determined (in this example, exactly 5.000 revolutions per second). The above works because of the repeating nature of the wheelset vibration data due to imperfections or non-uniformities in the wheels or axle or bearings. Non-uniformity may come from defects such as flat spots on the wheel tread or slight imbalance of the wheelset as some examples.

Figure 8:
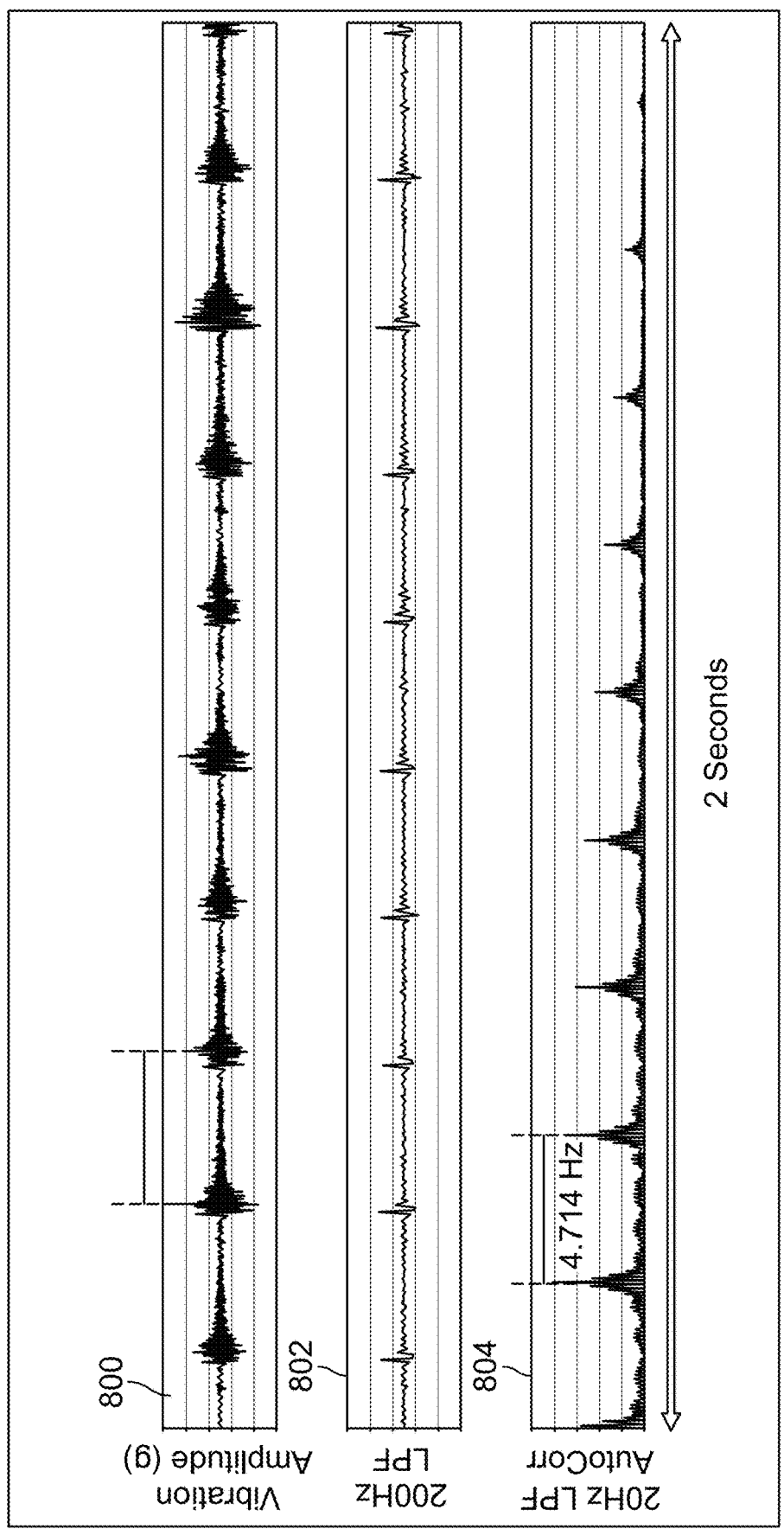
FIG. 8 contains a graph of vibration data from a rolling wheelset of a bogie, a graph of a filtered vibration data, and a graph of vibration data that was processed to reveal repeating patterns of the vibration data.

With regard to FIG. 8, a graph 800 is provided of a detected vibration signatures from wheelsets 321 of a bogie 300 over a two second time period. Graph 802 is a graph of the detected vibration signatures passed through a 200 Hz low pass filter. Because the bogie 300 has two wheelsets 321 that have slightly different running diameters, the acceleration signatures of the wheelsets are misaligned such that the peaks of the vibration signatures repeat but are not in sync with one another. For instance, one wheelset may have a vibration signature of 5 Hz while the other has a vibration signature of 4.8 Hz. The acceleration signature may align from time-to-time, but due to the difference in the frequency of the vibration signatures, the wheelsets 321 move out of phase with one another. This enables the vibration signatures associated with each wheelset to be determined and monitored. Deconvolution or other methods may be used to compensate for this time misalignment. Graph 804 is the result of an autocorrelation calculation applied to the data shown in graph 802. In graph 804, the frequency or the rotations per second of a wheelset 321 is calculated as 4.714 Hz (or 4.714 revolutions per second). Other signal processing or various sensor designs may be used to address situations that are present from crosstalk and convolution and other impediments.

Figure 9:
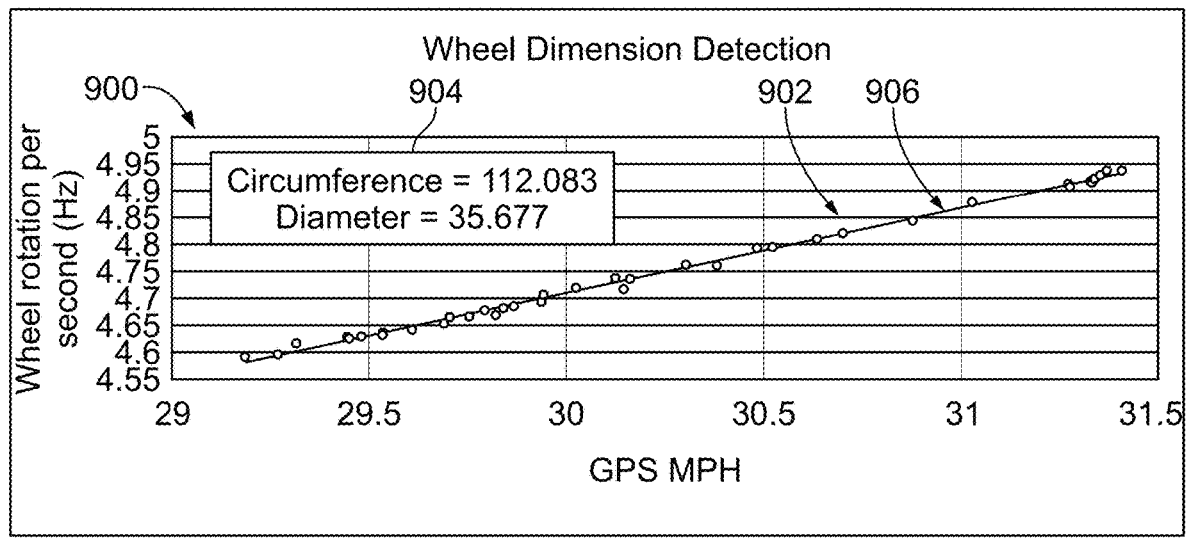
FIG. 9 is a scatterplot of calculations of wheel diameter for a well-behaved bogie and wheelset thereof based on varying ground speeds of a railcar on straight track measured by GPS and associated wheel rotational velocities determined using repeating patterns of the vibration data.

Regarding FIG. 9, a graph 900 is provided showing data 902 of many determinations of rotational velocity (y axis) plotted along with the corresponding GPS determined ground speed (x axis) for a particular wheelset 321 for varying speeds of the railcar 103 along many tangent lengths of track (track that is straight and without curves). The graph 900 includes an inset 904 indicating the average calculated running diameter and circumference. A line 906 is fit to the illustrate the linear nature of the wheel rotations per second versus the ground speed of the railcar 103.

The wheelset running diameter may be periodically calculated during movement of the railcar 103 and/or calculated in response to a mobile railway asset event (e.g., the railcar 103 entering a curved section of track, the railcar 103 entering or exiting a railyard, a change in a condition of the railcar 103 or another railcar 103) to obtain an indication of the variability of the running diameter of the wheelset 321. Other examples of mobile railway asset events where the wheelset running diameter is calculated include the passage of a period of time since the wheelset running diameter was determined (e.g., a timer), proximity to a particular location (e.g., a curved section of track or a railyard), when the railcar 103 is travelling at or above a certain speed, when another sensor indicates a threshold has been exceeded or a condition is present (e.g., accelerometer indicates wheelset 321 is hunting on the tracks), and when a remote device such as a server computer requests or indicates to calculate the wheelset running diameter. One or more of these mobile railway asset events may be used to trigger calculation of the wheelset running diameter.

Upon calculating the wheelset running diameter of the wheelset 321 in response to a mobile railway asset event, this data may be processed to determine whether a condition exists that warrants capturing data from one or more other sensors that may be used to corroborate whether the condition exists or collect additional data to determine whether other conditions are present. Monitoring the variability and changes over time allows conclusions to be drawn from the data such as the performance of bogies, side bearings, springs, friction wedges, wheel wear, and damage. As an example, the BMD 104 may wake up and operate the GNSS circuitry 781 to receive location data and use the location data to determine the location of the railcar 103 relative to a large curve in the track. The BMD 104 may continue to operate the GNSS circuitry 781 through the curve, repeatedly calculating the wheelset 321 running diameter, calculating the curvature of the track, and calculating the weight of the load in the railcar 103. The ground speed, wheelset running diameter, load, and track curvature may be used to obtain a complete assessment of the performance of the bogie 300 associated with the BMD 104. Further, the BMD 104 may calculate or facilitate calculation of the friction of the rails the bogie 300 is traveling along.

As an example, a calculated standard deviation of wheelset running diameter that is beyond a first threshold as the railcar 103 travels on a straight track may be used to infer that the wheelset 321 is hunting laterally. The BMD 104 or a remote device (such as PWG 202 and/or the remote server 406) may infer that one of the side-bearings of the bogie 300 requires replacement if another threshold is exceeded only when the speed is above 40 mph when the car is in an unloaded condition.

The BMD 104 may detect various parameters of the railcar 103 by measuring vibrations and noises emanating from the various components of the railcar 103 such as the roller bearings 331. Because the BMD 104 is mounted on the bolster 316 between the wheelsets 321, the BMD 104 may determine, directly or indirectly, the direction of the vibrations and noises to determine the location of the component making the vibrations and/or sound received by the sensor(s) of the BMD 104. In the case of safety related conditions, such as a broken wheel producing excessive vibration, the proximity to the BMD 104 may be all that is necessary to determine a location (e.g., broken wheel on the B-end bogie). However, the precise location of any component (e.g., wheel on the B-end bogie on the left side of the railcar on the second wheelset from the hand brake) is desirable for tracking changes in component health over time.

For example, the BMD 140 includes a pair of microphones 740 that are at generally opposite sides 519, 521 (see FIG. 5) of the BMD 104, capturing directionally dependent vibrations that are different due to their position or the inherent directionality of the microphones 740. As such, each one of the microphones 740 is closer to a particular wheelset 321 and designed to be directionally sensitive. The decibel level of the sound received at each microphone 740 is higher for the wheelset 321 adjacent the microphone 740. The BMD 104 may use the higher decibel level to determine the location of the sound source relative to the BMD 104. As an example, if the BMD 104 detects bearing noise that exceeds a threshold amplitude of a particular frequency (indicating a potential failure of the bearing), the BMD 104 may determine whether the bearing is on the wheelset toward the A-end of the railcar or toward the B-end of the railcar by comparing the left or right side 519, 521 (see e.g., FIG. 5) of the BMD 104 and by identifying which microphone detects the louder sound from the bearing. Due to the speed of sound in air or through steel and changes in sound pressure with respect to distance, the directionality of the various signals may also be determined using time of flight techniques and/or amplitude differences. A determination of the location of the vibration producing component may also be based on the variation of sound signatures with speed and frequency due to constructive and destructive interference caused by echoes of the sound (e.g., echoes off of components of the railcar 103). In certain situations, the Doppler effect may be used to determine the location of the vibration relative to the sensor when the railcar is moving or when a sound reflector is moving relative to the railcar. Accelerometers 720 or strain sensors 611 may also be mounted at varied locations of the BMD 104, or particularly, on opposite sides 519, 521 of the BMD 104 and measure vibration magnitude and directionality in a manner similar to the microphones 740.

Figure 10:
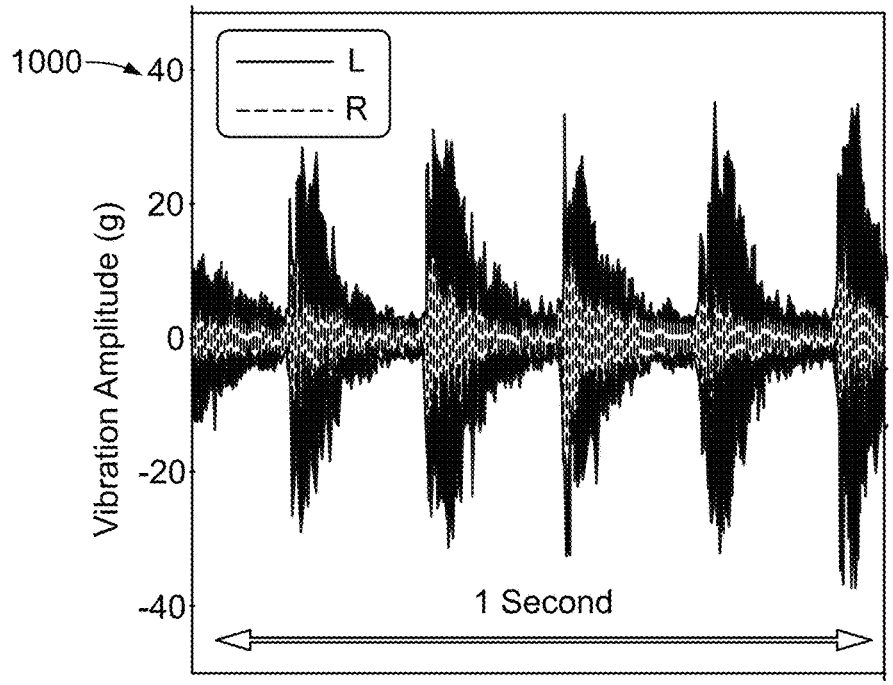
FIG. 10 is a graph of vibration data from two wheels on a wheelset showing that one wheel has a larger vibration amplitude than the other wheel.

Regarding FIG. 10, is a graph 1000 is provided of vibration data from two wheels on a wheelset showing that one wheel has a larger vibration amplitude than the other wheel. The determination of which side of the railcar 103 each wheel is located on with respect to the BMD 104 may be accomplished, for example, by configuring the BMD 104 to capture synchronous data from the strain sensor 611 that produces data indicative of varying side-to-side loads and the accelerometers 720 producing wheelset vibration data. When the amplitude of a wheel and/or bearing vibration is higher and the load in the railcar 103 is shifted to one side, the processor may determine that that wheel and/or bearing is on the side of the railcar 103 to which the load has shifted toward. A similar approach may be used for determining the location, for example, of bearings, side bearings, friction wedges, and springs.

The accelerometers 720 may include different accelerometers configured to measure high and low frequency vibrations. High frequency vibrations may be greater than 10 kHz, 20 kHz, or 30 kHz, to capture resonant frequencies of components such as a bearing or bearing adapter. Lower frequencies may be in the range of 0.5 Hz-1 kHz, such as for sensing and describing motion of the railcar 103 or cyclic vibrations from a rotating wheelset 320. As an example in this regard, the accelerometers 720 may include an accelerometer having a solid connection to the housing 700 for high frequency measurements and a second accelerometer that is mechanically damped relative to the housing 700 for low frequency measurements.

The accelerometers 720 and the microphones 740 and the strain sensor 611 may be used to assess the frequency and/or amplitude of various vibrations and sounds generated by the components of the railcar 103 including the side frames, wheels, bolster, bearings, bearing adapters, applied or stuck brakes with an engaged brake shoe, released or inoperative brakes with a disengaged brake shoe, side bearings, friction wedges, etc. For example, the accelerometers and microphones may be used to detect vibrations and sounds generated by the braking system (e.g., the brake shoes engaging the wheels) which may be processed to determine when the brakes of the railcar 103 are applied or released. Using the vibration and sound data generated by the accelerometers 720 and microphones 740 and the load status data generated by the strain sensor 611, an assessment of the health of the components of the railcar 103 may be made. For instance, the vibrations and sounds generated by a bearing may be monitored over time. A change in the vibration and/or sound data associated with the bearing in the loaded condition may indicate a change in the health of the bearing.

The aforementioned vibrations are significantly dependent upon the orientation of the railcar 103 with respect to the track and the travel direction (A-end leading or B-end leading). For example, a railcar with the A-end leading may have a wheel spall that produces a relatively low vibration but produces a much higher vibration when the railcar is travelling with the B-end leading at the same speed. This determination of railcar orientation with respect to the track is commonly accomplished with manual documentation or with the use of a wayside detector, but forward and reverse movement of trains and railcars through railyards and other facilities are a common occurrence that make it difficult for any entity to determine and maintain this orientation knowledge at all times. Thus, being able to determine whether the leading end of the railcar 103 includes the hand brake is valuable.

Determining the railcar 103 orientation with respect to the track and travel direction may be accomplished, for example, by analyzing sound patterns created by the wheels passing over a track anomaly and assessing the order of wheels 323, wheelsets 321, and/or bogies 300 that cause the sound. The sound pattern created by the wheelsets 321 passing over a track anomaly may include additional noises or vibrations caused by passing over the track anomaly or may result in the absence of a noise or vibration as the wheel 323 passes over the track anomaly (e.g., the rail dips down and a bearing or a wheel momentarily ceases to generate a noise/vibration or the amplitude is significantly reduced). This method, combined with the knowledge of the position of the BMD 104 with respect to the A-end or B-end of the railcar may be used to directly infer the travel direction (A-end leading or B-end leading). Such sounds may be analyzed in time to also determine railcar 103 ground speed after having initially determined the wheelset and bogie spacing, for example, with the use of the GPS measurements or as provided by another data source.

One example approach for determining the BMD 104 position on a railcar with respect to the hand brake is to instruct an installer to install two BMD 104's on every railcar and to document their positional information ensuring that one BMD 104 is placed on the left side of the B-end of the railcar and one BMD 104 on the right side of the A-end of the railcar. Another approach includes using automated methods of determining and/or verifying where on the railcar 103 the BMD 104 is mounted to reduce the possibility of and/or correct human error. An automatic determination of the end and side of the railcar 103 to which a BMD 104 has been installed may be accomplished by using data from GNSS receivers that are indicative of the side and the end (leading or trailing end) of a moving railcar 103 to determine the orientation of the BMD 104 with respect to the direction of travel. As an another example, the accelerometers 720 from a pair of BMDs 104 on opposite ends of a railcar 103 may be used to determine the side and end of the moving railcar 103 to which the BMDs 104 are installed. This may be accomplished where there is a surface anomaly on one of the rails, for instance on the right-side rail facing the direction of movement. The amplitude of the signal produced by the accelerometers 720 on the right side of the railcar 103 is generally higher than the amplitude produced by accelerometers on the left side of the railcar 103. The same is true for surface anomalies on the left rail, generating similar signals of higher amplitude for accelerometers 720 of the BMD 104 on the same side as the surface anomaly. Using the predetermined distances between the wheelsets, an algorithm may be utilized to capture the pattern of amplitude measurements from right side rail and left side rail anomalies to produce a result indicative of whether both BMDs 104 are on the right side or the left side of the railcar 103 or whether the BMDs 104 are on opposite sides of the railcar 103.

In another approach, the data from one or more sensors of the BMD 104, such as the accelerometers 720 and/or microphones 740, may be used to determine which end of the railcar 103 is the A-end and which end is the B-end. For example, the sound and/or vibrations generated by the hand brake being set or released may be detected by the accelerometers 720 and/or microphones 740. The amplitude of this data may be processed to determine whether the amplitude of the sound or vibrations indicates the BMD 104 is close to the hand brake and thus on the B-end or whether the BMD 104 is far from the B-end of the railcar 103 and thus on the A-end.

In another approach, the aforementioned data may collected from two BMDs 104 mounted to the railcar 103. This data be processed to determine the time when a portion of the vibration signature was measured on each BMD 104 with respect to a common clock, such as that synchronized to a reference signal from a GNSS. For example, the vibration signature may be a detection of the sound or vibration caused by the application or release of the hand brake. The BMD 104 detecting the vibration caused by the hand brake with the earlier time is determined to be closest to the hand brake and is thus on the B-end and the BMD 104 detecting the vibration caused by the hand brake with the later time is farthest the hand brake and thus is on the A-end of the railcar 103.

The BMD 104 may further be configured to autonomously verify that the BMD 104 was installed properly. For example, the BMD 104 may determine whether the BMD 104 was installed upside down. With reference to FIG. 6A, in one embodiment, a 3-axis accelerometer may be used to verify that a Z-axis 721 of the accelerometer 720 is approximately 20 degrees from vertical as the BMD 104 of this embodiment was intended to be installed. In order to fully determine the orientation of the BMD 104 with respect to the railcar 103, the 3-axis accelerometer 720 may be used to determine the direction of gravity with respect to the BMD 104. To determine the orientation of the BMD 104 with respect to the direction of the track, the forces on the railcar 103 may be monitored during travel. When an event occurs, such as railcar coupling or run-in or run-out events, for example, an impulse is generated along a Y axis in the direction of motion due to an abrupt acceleration or deceleration. The BMD 104 or an associated processor may detect the direction of travel of the railcar 103 along the track based on these events and the direction of travel generated by the 3-axis accelerometer during this abrupt acceleration or deceleration. In another approach, where the direction of railcar 103 is known (e.g., heading east), the BMD 104 may determine which direction is north using data from the magnetometer 716 (e.g., a 3-axis magnetometer). The BMD 104 may then determine its orientation with respect to the railcar 103 based on the direction of travel of the railcar 103 and the direction determined to be north.

In another approach, to determine the orientation of the BMD 104 relative to the railcar 103, where the BMD 104 includes a first microphone 740 at a first side of the BMD 104 and a second microphone 740 at a second side of the BMD 104, the sound detected by the first microphone 740 of the BMD 104 may be compared to the sound detected by the second microphone 740 to determine which end is closer to the hand brake, and thus the B-end. For example, the amplitude of the sound detected by the microphones 740 at the sides of the BMD 104 may be compared to determine which side of the BMD 104 is closer to the hand brake. Stated differently, the microphone 740 that detects the louder sound of the hand brake being set will be on the side of the BMD 104 that is closer to the hand brake (and thus the B-end). As another example, the determination of which end of the railcar 103 is the B-end or the location of the hand brake relative to the BMD 104 may include comparing the exact time that microphones 740 on opposite sides of the BMD 104 detect the sound caused by the hand brake. The microphone 740 that detects the sound first in time may be determined to be on the side of the BMD 104 closer to the hand brake.

In some embodiments, at least two BMDs 104 are mounted on a railcar 103 with one BMD 104 mounted on the bolster 316 near the A-end and the other BMD 104 mounted on the bolster 316 on the B-end. The system utilizing the at least two BMDs 104 on a railcar 103 may determine the sequence of BMDs 104 along the railcar 103 by, for example, determining a first time value of a first event (e.g. a first wheelset encountering a track anomaly) and a second time value of a second event (e.g. a second wheelset encountering a track anomaly) from data gathered by one or more sensors of the BMD 104. In this way, all BMDs 104 on a railcar 103 may produce data, overlaid on a common time reference, to determine their relative positions along the railcar 103.

Once the BMD 104 that is closer to the B-end of the railcar 103 is determined, the processor 760 of the "B-end" BMD 104 may store information to that effect in the memory 770 and cause the communication circuitry 780 to inform the other BMD 104 of the railcar 103 that the other BMD 104 is the "A-end" of the railcar 103. If more BMDs 104 are on the railcar, each may be informed as to their calculated position with respect to the hand brake. Alternatively or additionally, the identity (such as an identifier number) of the "B-end" BMD 104 may be stored in a memory of the remote server 406.

Figure 11:
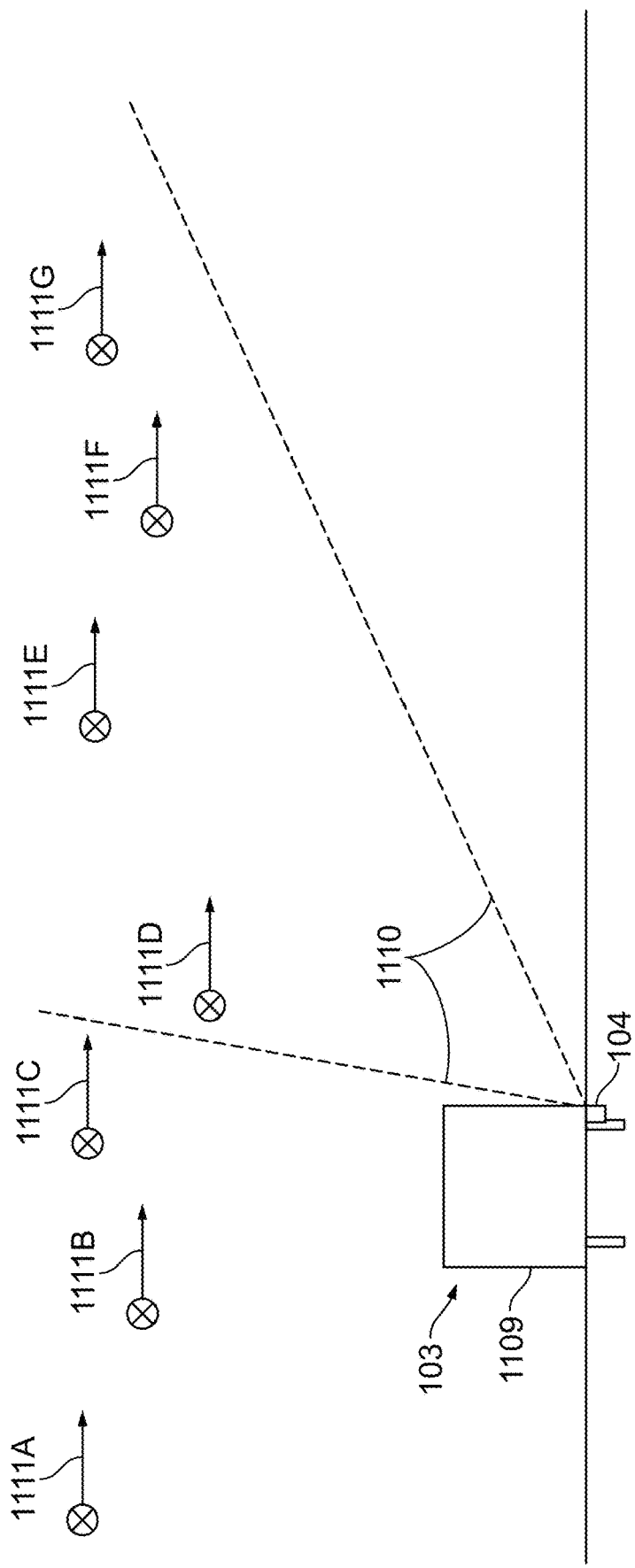
FIG. 11 is a schematic view of a body of the railcar of FIG. 1 inhibiting the GNSS circuitry of the bogie monitoring device from directly receiving GNSS data from all of the GNSS satellites in view of the railcar.

The GNSS data from GNSS circuitry 781 of the BMD 104 may also be utilized directly to determine the orientation of a railcar 103 with respect to the earth, and with that knowledge, to determine the orientation of the railcar with respect to the travel direction using the heading of the GNSS output. Because the BMD 104 is mounted on the bogie 300 of the railcar 103, as opposed to the top of the railcar 103, the body of the railcar 103 obstructs the GNSS circuitry 781 from receiving GNSS data from all of the satellites directly. The satellites that are indicated to be in the direct line of sight may therefore be used to assess the railcar's current relative alignment to the earth's rotational axis because the positions of the GNSS space vehicles (satellites) are known and provided as a component of the GNSS system. Regarding FIG. 11, the railcar 103 has a body 1109 that obstructs the view of some GNSS satellites and may provide a direct line of sight 1110 to others. The line of sight 1110 permits the GNSS circuitry 781 to receive GNSS data from GNSS satellites 1111D-1111G; however, the GPS satellites 1111A-1111C are blocked by the body 1109 of the railcar 103. Knowledge of the local track layout may also be used to determine orientation relative to the track for use when the railcar starts moving or afterward.

The processor 760 (or another device such as the PWG 202 or remote server 406) compares GNSS satellites providing data that are received by the GNSS circuitry 781 to baseline satellite data, such as the GNSS satellites that would be visible to the GNSS circuitry 781 if the BMD 104 were mounted to the top of the railcar 103. The satellites that would be visible to the GNSS circuitry 781 if the BMD 104 were mounted to the top of the railcar 103 may be determined by identifying the GNSS satellites providing GNSS data to a device not obstructed by the railcar 103, such as the PWG 202 or a stationary gateway in a rail facility. The GNSS circuitry 781 may not receive GNSS data from a satellite due to the body 1109 of the railcar 103 or the GNSS data may be received later (due to multi-path or reflection) than the GNSS data should have been received if the body 1109 was not in the line of the sight of the GNSS circuitry 781.

In another form, processor 760 receives GNSS data from GNSS circuitry 781 mounted at different positions of the railcar 103. For example, a BMD 104 including GNSS circuitry 781 may be mounted on the right side of the railcar 103 and a second device including GNSS circuitry (such as a second BMD 104) may be mounted on the left side of the railcar 103. The processor 760 (or another device such as the PWG 202 or remote server 406) receives the GNSS data from both devices and determines which satellites are visible to both the right-side and left-side GNSS circuitry, only the right-side GNSS circuitry, and only the left-side GNSS circuitry. The accuracy of the determination of the orientation of the BMD 104 relative to the mobile railway asset may be improved with this additional information from the second device, especially when the information from both devices is captured and stored with the same or similar timestamps. As another example, the processor may determine which side of the mobile railway asset the BMD 104 is located on based on the different satellites visible to the GNSS circuitry 781 at the bolster end and the satellites visible to the device on the other side of the mobile railway asset. In this manner, the processor may autonomously determine an orientation of the GNSS circuitry 781 relative to at least a portion of the mobile railway asset.

Having determined the BMD 104 location nearest the B-end of the railcar 103 using the vibration data from the hand brake application and release, and having determined the sequential location of other BMDs 104 on the same railcar 103, and having determined each BMDs 104 relative location to the side of the railcar 103 (e.g., when moving past rail anomalies), the location of all BMDs 104 of a railcar 103 with respect the railcar 103 ends and sides may be determined automatically. These automated determinations may be corroborated by using automated GNSS-based determinations to provide a robust basis for all railcar 103 monitoring assessments.

In some embodiments, the BMD 104 may process the data of a single sensor (such as microphone 740 or accelerometer 720) to monitor the conditions of multiple components of the railcar 103. For example, the processor 760 may monitor the data from a microphone 740 for the sound of the wheelset 321 traveling over joints in the rails. The processor 760 may use deconvolution to determine a subset of the data that corresponds to each wheel 323 of the wheelset 321. The processor 760 may further determine a condition for each wheel 323 of a wheelset 321 using the corresponding data subset. In addition, the processor 760 may also determine which wheelset 321 belongs to each data subset by determining the presence of a track anomaly within each subset. The relative time of the track anomaly in each subset will correspond to the relative position of the wheelsets 321. In another embodiment, the BMD 104 has microphones 740 on opposite sides of the BMD 104 and the processor 760 monitors data from the microphones for the sound of the wheelset 321 traveling over joints in the rails. The processor 760 may infer that the microphone 740 that receives the sound of the first wheelset 321 traveling over the joint in the rails is on the leading side of the bogie 300. The wheelset 321 adjacent the microphone 740 that receives the sound first is likewise inferred as being toward the leading end of the railcar 103.

In another embodiment, multiple BMDs 104 have microphones 740 and/or accelerometers 720 on each bogie on opposite ends of the railcar and on opposite sides of the railcar 103 and the processor 760 monitors the sensor data for the vibration of the wheelset 321 traveling over anomalies such as joints in the rails. The processor 760 may infer that the sensor that receives the sound of the first wheelsets 321 from the first bogie traveling over the joint in the rails is on the leading end of the railcar. The processor 760 may also infer that the joint is on the left or right rail based on the differences in amplitude between the sensors that are measuring the noise because the vibration may be louder on the side with the wheel 323 that crosses the joint compared to the noise measured by a sensor that is on the opposite side of the railcar and thus damped due to being a farther distance away, for example. Such an assessment can also work for any vibration such as the sound of a passing locomotive with a blowing horn or simply a running engine, or vibrations or sounds caused by other track anomalies. Other track anomalies may include: rail surface defects, switch points and turn-outs, rail frogs, guard rails, insulated joints, bridge abutments, road crossings at grade, mud holes, engine burns, rail corrugations, rail misalignments, curve spirals, crossovers, track modulus change, cross-tie condition, rail neutral temperature (rail tension or compression state), and anything else that causes the wheels 323 running on the rails to change vertical, lateral, or longitudinal velocity or causes a vibration characteristic.

Where the distance between wheelsets 321 is known, the microphone 740 and accelerometer 720 data of multiple BMDs 104 may further be used to determine the ground speed of the railcar 103. For instance, the BMD 104 may determine the amount of time that passes between the first wheel, first wheelset, or first bogie traveling over an anomaly in the rails, such as a track joint, until the next wheel, wheelset(s), or bogie(s) pass over the same anomaly in the rails. Knowing the physical distance between the wheelsets 321 and the time for a subsequent bogie 300 to travel to the same point, the ground speed of the railcar 103 can be determined.

Using the vibration data to monitor the health of the various components of the railcar 103 along with location data enables tracking of the location where a component was replaced or damaged. For instance, a wheel 323 may be determined to have a flat spot or some other defect due to a repeating vibration characteristics or signatures in the vibration data. When the railcar 103 is stationary for a period of time, and then subsequent vibration data does not have the repeating vibration characteristics or signatures indicative of the flat spot of other defect, the processor 760 may infer that the wheel 323 was replaced or repaired at the location where the railcar 103 was stationary. Similarly, if the railcar 103 is stationary for a period of time, and then subsequent vibration data indicates a new repeating vibration characteristic (e.g., the wheel 323 now has a flat spot), the processor 760 may infer that the wheel 323 was damaged at the location where the railcar 103 was stationary. For example, the railcar 103 may have been slid while parked without releasing the hand brake resulting in the flat spot on the wheel 323. The processor 760 may be configured to send a notification or alert indicating the location where the railcar 103 was damaged for further investigation.

The weight of the load of the railcar 103 or the weight of the load on the bolster 316 may be calculated using vibration data of the railcar 103. As described above, the railcar 103 may bounce with a low frequency when the railcar 103 is loaded and bounce with an increasingly higher frequency as the load on the railcar 103 decreases. While the strain sensor 611 may be used to determine the weight of the load of the railcar 103 based on the static strain on the bracket 410 (e.g., the strain on the bracket 410 even when the railcar 103 is not moving), the variation in strain data (vibration) generated by the strain sensors 611 over time may be analyzed to determine whether the railcar 103 is loaded or unloaded and to estimate the weight of the load. For instance, a higher degree of variation in the strain data (e.g., strain amplitude) caused by the load of the railcar 103 over time may indicate a heavier load. As another example, a higher frequency of the variation in the strain data over time may indicate a lighter load. The data may be processed (e.g., by processor 760) to infer or calculate the weight of the load based on the variation in strain data.

The accelerometer 720, gyroscope 714, and/or microphone 740 data may be used to determine whether the railcar 103 is in a loaded or unloaded state and to calculate the weight of the load. As one example, the lower frequency vibrations determined to be associated with the body 1109 of the railcar 103 bouncing or rocking may be analyzed to determine whether the railcar 103 is loaded or unloaded. As another example, the high frequency vibrations determined to be associated with the components supporting the load of the railcar 103 may be analyzed to determine whether the railcar 103 is loaded or unloaded. For example, the frequency of the vibrations or noises produced by the side frame 311, bolster 316, and/or wheel 323 may increase under an increased load. The weight of the load of the railcar 103 may be calculated or inferred based on the frequency and amplitude of the vibration data associated with the railcar 103.

The accelerometers 720 may be used to wake the BMD 104 to an active state upon detecting motion. The railcar 103 may be stationary for a long period of time and be in an inactive state where little or no data is collected. This may conserve power and/or allow the batteries of the power source 790 to be recharged. In some forms, the accelerometers 720 are ultra-low power accelerometers and collect data continuously. When the accelerometers 720 detect vibration indicating the railcar 103 is being loaded, moved, coupled to another railcar 103, tampered with, etc., the BMD 104 may switch to an active state and collect data via additional sensors of the BMD 104.

The BMD 104 may be set to collect and send varying amounts of data based on the charge level of the batteries or the location of the railcar 103. If the BMD 104 is fully charged or above a certain threshold (e.g., 80%) the BMD 104 may be configured to collect additional data via the sensors and determine the location of the BMD 104 regularly using the GNSS circuitry 781. Similarly, the BMD 104 may transmit or communicate a greater portion of its detected data via the communication circuitry 780 for processing or storage at another location.

Where the power source charge level of the BMD 104 is low, the BMD 104 may not collect location data using the GNSS circuitry 781 (or at a reduced rate) and may reduce the number of sensors used to collect data or reduce the sampling rate of data processed and/or stored. The BMD 104 may be configured to only monitor or collect data for certain aspects of the railcar 103 that are deemed to be critical or important to conserve power when the power source charge level is low.

In some forms, the BMD 104 may be set to an active state or to collect or send data based on the determined location of the railcar 103 or a detected condition of the railcar 103. The BMD 104 may be configured to collect and/or send data collected by one or more sensors regardless of the charge level of the battery 792. As one example, where the railcar 103 is determined to be in a loading yard, the BMD 104 may be set to collect data via the strain sensors 611 to detect the increase or decrease in the load of the railcar 103. As another example, upon determining that the railcar 103 is being loaded or unloaded (e.g., via the strain sensor 611 data) the BMD 104 may be configured to collect location data via the GNSS circuitry 781 to determine the location where the railcar 103 is being loaded or unloaded. As another example, where the data collected is determined to indicate a new condition is present or otherwise important determination (e.g., the health of a component has deteriorated beyond a certain level), the BMD 104 may communicate the data, condition, or determination to a remote device via the communication circuitry 780.

The accelerometers 720 and gyroscope 714 may further be used to determine the orientation of the railcar 103 with respect to ground, for example, whether the railcar 103 is rocking back and forth, travelling around a curve, or leaning. The processor 760 may determine based on the accelerometer 720 and/or gyroscope 714 data the angle that the railcar 103 is leaning with respect to vertical and may infer that the railcar 103 has derailed or tipped over. The processor 760 may further be configured to identify conditions where the railcar 103 has tipped, but the wheel 323 has hooked the rail preventing the railcar 103 from tipping all the way over. The processor 760 may send an alert indicating this potentially hazardous condition of the railcar 103 has been detected. The processor 760 may also sound an audible alarm via the speaker 734 to audibly alert those in proximity to the railcar 103 of the potentially hazardous condition.

The magnetic proximity switch 712 may be used to provide an on/off switch for shipping. As another example, the magnetic proximity switch 712 may be used as a sensor to detect the distance from another magnet that may indicate a height that corresponds to a railcar 103 weight. For instance, the magnetic proximity switch 712 is positioned to interact with a magnet with the determined distance between the magnetic proximity switch 712 and the magnet correlating to a weight of the railcar 103 or a load of the railcar 103.

The magnetometer 716 may be used as a compass to sense the orientation of the BMD 104 and the railcar 103 relative to the earth. The magnetometer 716 may be used to determine the proximity of the BMD 104 or railcar 103 to iron-based objects, for example, to sense when the railcar 103 is being tampered with. As another example, the magnetometer 716 may further be used to detect the precise location of objects in an area known to affect the magnetometer 716 in a particular way when the car is in a particular position. For example, when the BMD 104 determines that the railcar 103 is at a location where the railcar 103 may be loaded or unloaded, the magnetometer 716 may be used to sense when the railcar 103 is proximal equipment that facilitates loading or unloading of the railcar 103.

Figure 13A:
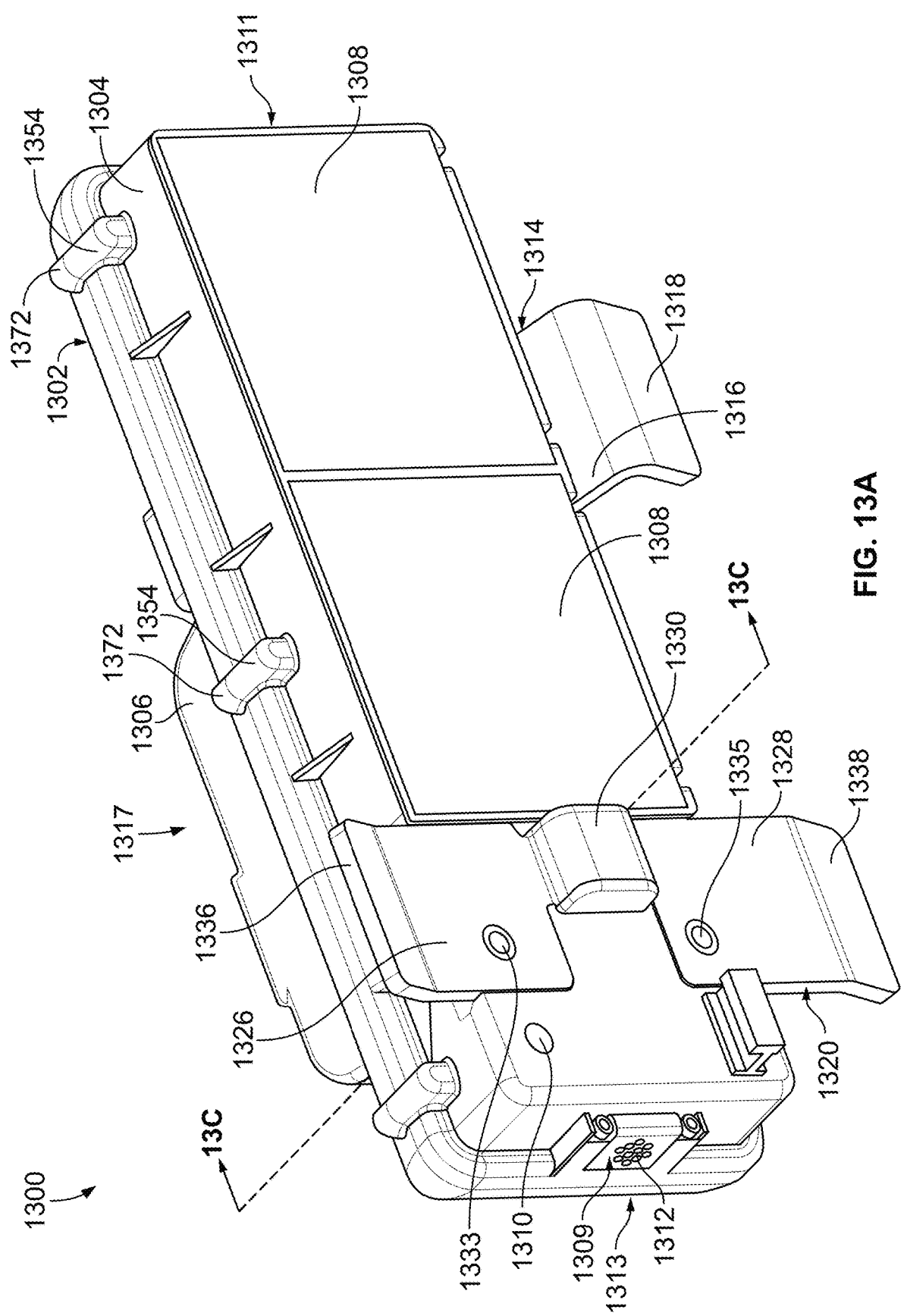
FIG. 13A is a perspective view of a bogie monitoring device according to a second embodiment for mounting to an end portion of the bolster of the bogie assembly of FIG. 3.
Figure 13B:
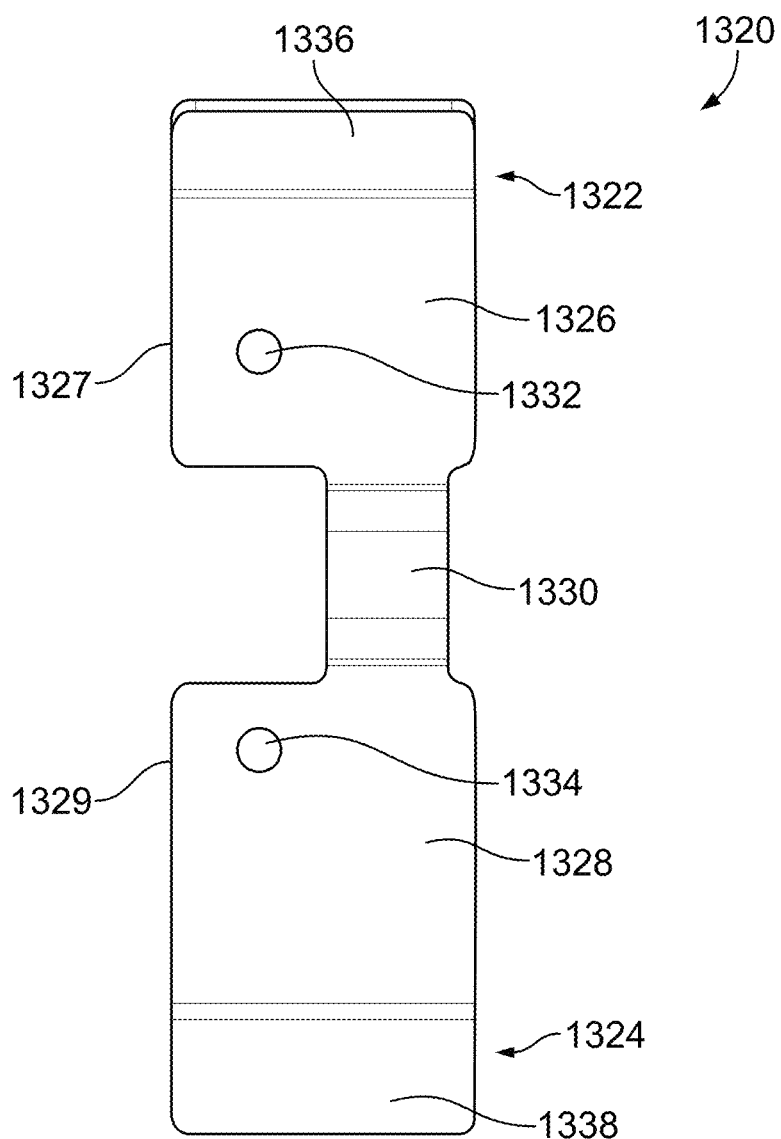
FIG. 13B is a side elevational view of a strain bracket of the bogie monitoring device of claim 13A according to a first embodiment.
Figure 13C:
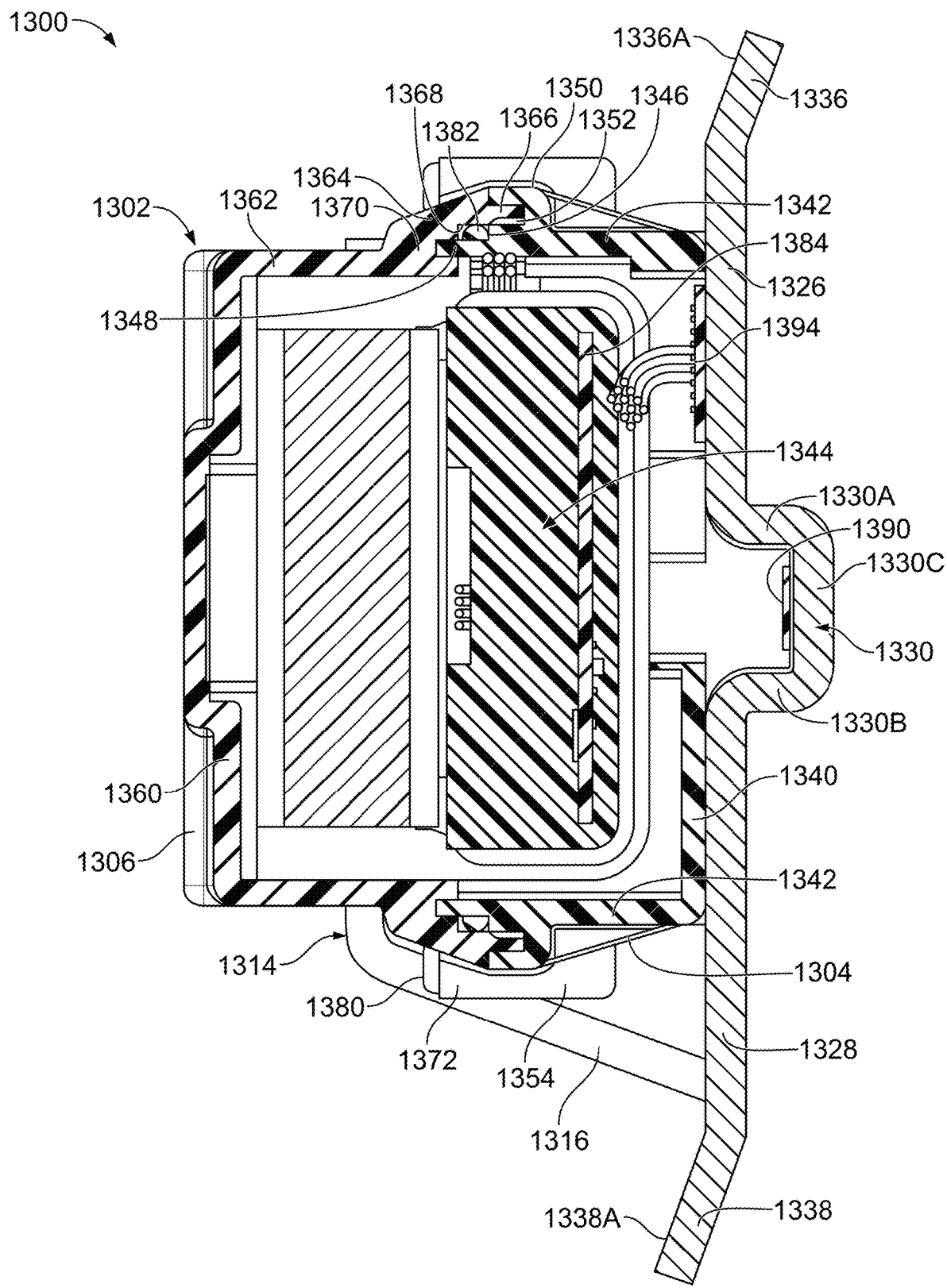
FIG. 13C is a cross-section view of the bogie monitoring device of FIG. 13A taken along line 13C-13C of FIG. 13A.

With reference to FIGS. 13A-C, a BMD 1300 is shown according to a second embodiment. The BMD 1300 is similar to the BMD 104 described above, the differences of the BMD 1300 of the second embodiment are highlighted in the following description. The BMD 1300 includes a housing 1302 formed by a first portion 1304 and a second portion 1306. When joined together, the first portion 1304 and the second portion 1306 form a cavity or compartment 1344 for housing electronics or other components. In one embodiment, the first and second portions 1304, 1306 are halves of the housing 1302. The first and second portions 1304, 1306 may be made of a rigid plastic or a composite material, as some examples.

The BMD 1300 may include various components within housing 1302 such as the components described above with regard to FIG. 7. The first and second portions 1304, 1306 of the housing 1302 may be permanently joined together, such as being joined by adhesive, or may be separable. The housing 1302 protects the components of the BMD 1300 against impacts, debris, water, and other conditions encountered in the rail environment. In one embodiment, the BMD 1300 includes solar cells 1308 mounted to the housing 1302 for charging the batteries of the BMD 1300.

The BMD 1300 includes an indicator light 1310, such as an LED, to indicate a status of the BMD 1300. The status of the BMD 1300 may include, for example, that the BMD 1300 is operating or asleep. In another form, the indicator light 1310 may indicate the charge level of the battery of the BMD 1300. In yet another form, the indicator light 1310 may indicate when the BMD 1300 detects an issue associated with the railcar 103 to which the BMD 1300 is mounted.

The BMD 1300 includes microphones 1309, 1311 within the housing 1302 at opposite sides of the housing 1302. The housing 1302 includes sound interfaces 1313 of the housing 1302 for each microphone 1309, 1311 configured to permit sound to enter the housing 1302 and be received by the microphones 1309, 1311 in the housing 1302 while limiting the ingress of water and debris into the interior of the housing 1302. In one embodiment, the sound interfaces 1313 include a plurality of through holes 1312 of the housing 1302 and a waterproof sound-permeable membrane to enable sound transmission into the housing 1302 while inhibiting water from fouling the microphones 1309, 1311. The microphones 1309, 1311 are positioned adjacent the holes 1312 to receive sound through the holes 1312 (e.g. an sounds generated by the components of the railcar 103) while limiting dampening of the sound by the housing 1302.

With regard to FIG. 13C, the connection of the first portion 1304 and the second portion 1306 of the housing 1302 is shown. The first portion 1304 includes a base 1340 and sidewalls 1342 extending from a periphery of the base 1340. The sidewalls 1342 opposite the base 1340 include a step portion 1346 that transition to a flange portion 1348 of the sidewall. The housing 1302 includes a sealing member, such as an O-ring 1382 extending about a periphery of the flange portion 1348 of the sidewall 1342 and abuts the step portion 1346. The sealing member facilitates a water-tight seal between the first and second portions 1304, 1306 of the housing 1302. The sidewalls 1342 further include a channel wall 1350 forming a portion of a channel 1352 for receiving a lip 1366 of the second portion 1306 of the housing 1302.

The second portion 1306 includes a base 1360 and sidewalls 1362 extending from a periphery of the base 1360. The end of the sidewalls 1362 opposite the base 1360 include a protrusion 1364 with the lip 1366. The protrusion 1364 includes a sealing surface 1368 for engaging the O-ring 1382 of the first portion 1304 when the end 1366 is inserted into the socket 1352 of the first portion 1304. The O-ring 1382 is sandwiched between the sealing surface 1368 and the step portion 1346 upon the first and second portions 1304, 1306 of the housing 1302 being connected which forms a fluid tight seal between the first portion 1304 and the second portion 1306.

The protrusion 1364 and the sidewall 1362 of the second portion 1306 form a channel 1370 for receiving the flange portion 1348 of the sidewall 1342 of the first portion 1304. Upon connecting of the first portion 1304 and the second portion 1306 of the housing 1302 together, the O-ring 1382 is received in a pocket formed by the projection 1364 of the first portion 1304 and the sidewall 1342 of the second portion 1306.

Regarding FIG. 13A, in one embodiment the first portion 1304 further defines a series of fastener sockets 1354 about the sidewall 1342 for receiving a fastener 1380. The fastener sockets 1354 include threading disposed on an internal surface thereof for engagement with threads of the fastener 1380. The second portion 1306 defines a series of loops 1372 of the sidewall 1362. The loops 1372 each have an opening for receiving a fastener 1380 therethrough. When the first portion 1304 and the second portion 1306 of the housing 1302 are connected as described above, a fastener 1380 may be passed through each loop 1372 of the second portion 1306 and into the fastener sockets 1354 of the first portion 1304. The fastener 1380 may be threaded into the fastener sockets 1354 to secure the first portion 1304 to the second portion 1306 of the housing 1302. The cavity 1344 formed by the connected first portion 1304 and the second portion 1306 provides a fluid tight space for components of the BMD 1300 to be contained (e.g., the components described with regard to FIG. 7).

The BMD 1300 has a body 1317 that includes the housing 1302 and a mount, such as one or more brackets to connect the housing 1302 to the bolster 316. In one embodiment, the mount includes a support bracket 1314 attached to the second portion 1306 of the housing 1302. The mounting bracket 1314 includes an arm 1316 and a tab 1318 at the end of the arm 1316. The tab 1318 may be welded to the lower portion 312 of the bolster 316 to rigidly secure the BMD 1300 to the bolster 316. In some embodiments, the mounting bracket 1314 is sufficiently rigid, such as being made of formed steel plate, so that the mounting bracket 1314 readily transmits vibrations from the bolster 316 to the housing 1302 and the accelerometers therein. Further, the mounting bracket 1314 supports the BMD 1300 in the pocket 409 formed between the upper portion 313 and the lower portion 312 of the bolster 316. The upper and lower end portions of the bolster 316 may aid to shield and protect the BMD 1300.

Regarding FIGS. 13A and 13B, the mount of the BMD 1300 further includes a bracket, such as a strain bracket 1320. The strain bracket 1320 may operate as a strain member such that a strain sensor of the BMD 1300 detects strain in the strain bracket 1320 as discussed in greater detail below. The strain bracket 1320 may also provide support to the housing 1302.

The strain bracket 1320 is mounted to the first portion 1304 of the housing 1302. The strain bracket 1320 is an elongate strip of a rigid material having a first movable portion, such as a first end portion 1322, for attachment to the upper portion 313 of the bolster 316 and a second movable portion, such as a second end portion 1324, for attachment to the lower portion 312 of the bolster 316. The strain bracket 1320 may have a unitary, one-piece construction and may be made of a metal, such as steel. In one embodiment, the strain bracket 1320 is formed by stamping sheet metal. The strain bracket 1320 includes a first plate portion 1326, joined to a second plate portion 1328, by a connecting portion such as a bridge 1330. The strain bracket 1320 may support the housing 1302 at the end opposite the arm 1316 so that the strain bracket 1320 provides both a location to detect strain and supports the housing 1302 on the bolster 316.

Once the first and second end portions 1336, 1338 have been secured to the upper and lower portions 313, 312 of the bolster 316, the strain bracket 1320 is in an initially unloaded configuration wherein the first and second plate portions 1326, 1328 are linearly aligned such that the side edges 1327, 1329 of the first and second plate portions 1326, 1328 fall along straight lines. Further, the first and second plate portions 1326, 1328 may be located in a common plane when the strain bracket 1320 is unloaded.

As shown in FIG. 13B, the first plate portion 1326 has a through hole 1332 and the second plate portion 1328 has a through hole 1334. The through holes 1332, 1334 receive pins 1333, 1335 of the first portion 1304 of the housing 1302 with the strain bracket 1320 mounted to the first portion 1304 of the housing 1302. In one embodiment, the pins 1333, 1335 are fasteners such as bolts that secure the strain bracket 1320 to the first portion 1304 of the housing 1302.

Regarding FIG. 13B, the first end portion 1322 includes a lip portion 1336 extending obliquely from the first plate portion 1326 and the second end portion 1324 includes a lip portion 1338 extending obliquely from the second plate portion 1328. The incline of the lip portions 1336, 1338 relative to the first and second plate portions 1326, 1328 presents inner surfaces 1336A, 1338A of the lip portions 1336, 1338 to the upper and lower portions 313, 312 of the bolster 316. The inner surfaces 1336A, 1338A of the lip portions 1336, 1338 may thereby be readily welded or otherwise attached to the upper and lower portions 313, 312 of the bolster 316. Thus, the lip portions 1336, 1338 of the strain bracket 1320 are rigidly attached to the bolster 316.

The bridge portion 1330 joins the first plate portion 1326 to the second plate portion 1328. The strain bracket 1320 has a longitudinal length and may be elongated therealong. In one embodiment, the bridge portion 1330 may be narrowed, e.g., have a decreased width in a lateral dimension, as compared to the first and second plate portions 1326, 1328. The narrowed width of the bridge portion 1330 reduces the resistance provided by the bridge portion 1330 to movement or deformation relative to the movement of the first and second plate portions 1326, 1328. The bridge portion 1330 is configured to elastically deform with movement of the first and second plate portions 1326, 1328 as the upper and lower plate portions 1326, 1328 move relative to one another.

Regarding FIG. 13C, the bridge portion 1330 has a C-shape including a leg portions 1330A, 1330B and an intermediate portion 1330C connecting the leg portions 1330A, 1330B. The bridge portion 1330 projects out of the plane of the first and second plate portions 1326, 1328 and operates as a stress riser in the strain bracket 1320. The narrowed width of the bridge portion 1330 and the projecting shape of the bridge portion 1330 mechanically amplify the strain in the strain bracket 1320 caused by movement of the plate portions 1326, 1328 due to movement of the bolster upper and lower portions 313, 312.

The BMD 1300 includes a strain sensor 1390 similar to the strain sensors described above in the previous embodiments to provide similar functionality (e.g., load sensing, detecting load shift, detecting movement, etc.). The strain sensor 1390 is positioned at an underside of the strain bracket 1320 and is configured to measure strain in the bridge portion 1330 of the strain bracket 1320. The bridge portion 1330 of the strain bracket 1320 shields the strain sensor 1390 from damage. When the strain bracket 1320 is rigidly secured to the upper end 313 and lower end 312 of the bolster 316, movement of the ends of the bolster 316 relative to one another will apply a strain on the bridge 1330 which the strain sensor 1390 detects. The strain sensor 1390 communicates strain data back to a processor of the BMD 1300 as described in the previous embodiments. Additionally or alternatively, the strain sensor 1390 may be mounted to the first plate 1326 and/or second plate 1328 to measure the strain on those portions of the strain bracket 1320.

The BMD 1300 further includes one or more accelerometers 1394 mounted to the underside of the strain bracket 1320, and inside of the housing 1302. The accelerometer 1394 may be a high frequency accelerometer configured to detect vibrations of the railcar 103 in the strain bracket 1320. The accelerometer 1394 may be configured to detect frequencies in the range up to 40 kHz. This high frequency accelerometer may be used to detect high frequency vibrations that may be used to determine a condition of the railcar 103 or a component of the railcar 103. For example, the accelerometer 1394 may detect vibrations indicative of a condition of a bearing or when the brakes are engaged. Mounting the accelerometer 1394 directly to the strain bracket 1320 permits the accelerometer 1394 to detect high frequency vibrations with minimal dampening, since the strain bracket 1320 is rigidly secured to the bolster 316. The strain bracket 1320 also shields the accelerometer 1394 from damage.

The BMD 1300 further may include an accelerometer inside of the cavity 1344 for detecting low frequency vibrations, for example, in the range of 0.5 to 1 kHz. This low frequency accelerometer may be on an electronics board 1384 that is attached to the housing 1302 and the board 1384 may be mechanically dampened relative to housing 1302. The mechanical damping may be accomplished with a soft polymer connection between the housing 1302 and the electronics board 1384 on which the accelerometer is mounted. Dampening the vibrations experienced by the electronics board 1384 and the accelerometer may further aid to protect the electronics board 1384 and accelerometer from damage causing vibration as well as minimize undesired vibrations that adversely affect the vibration signals desired to be detected by the low frequency accelerometer. The low frequency accelerometer may be used to detect low frequency vibrations of the railcar 103 that may be used to determine a condition of the railcar 103 or a component of the railcar 103. For example, the accelerometer may detect vibrations indicative of the bounce and/or rocking motion of the railcar 103.

Figure 14A:
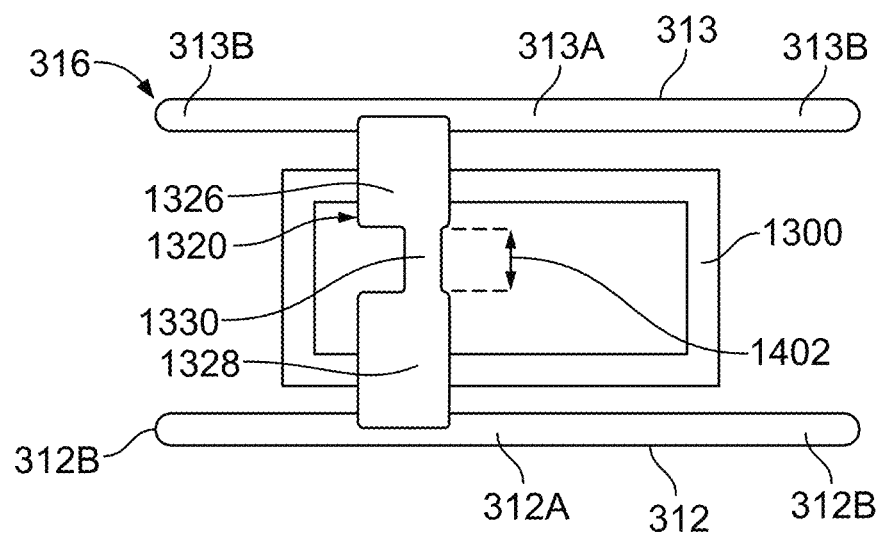
FIG. 14A is a schematic view of a side elevation view of the end of the bolster of FIG. 3 in an unloaded configuration.
Figure 14B:
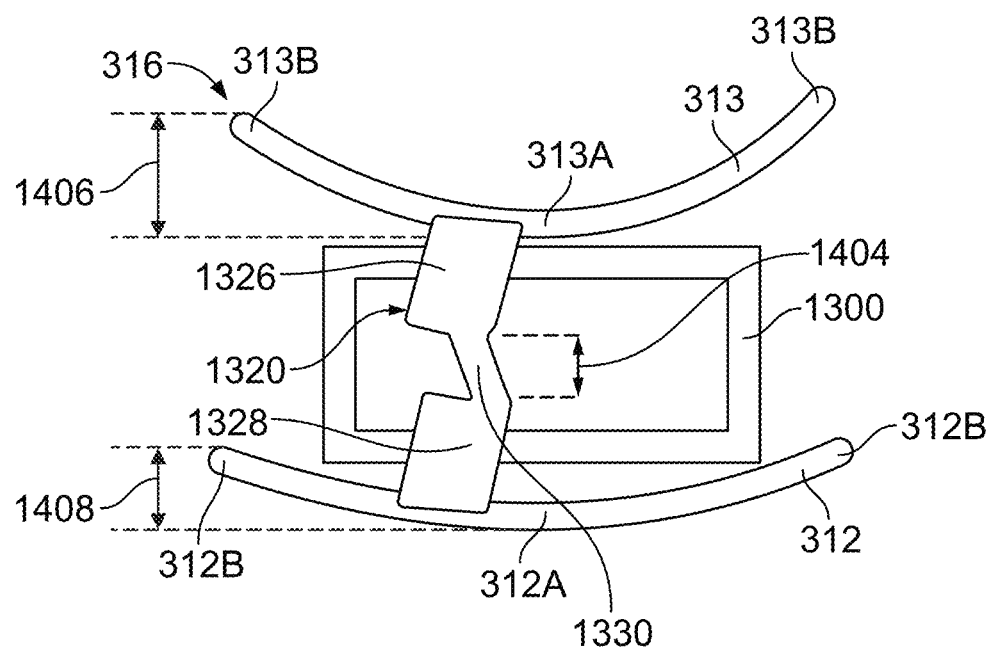
FIG. 14B is a schematic view similar to FIG. 14A showing the bolster in a loaded configuration which changes the shape of the ends of the upper and lower portions of the bolster relative to each other and produces strain in the bracket that is detected by a strain sensor of the bogie monitoring device.

With regard to FIGS. 14A-B, a schematic representation of one of the bolster end portions 318, 319 illustrating the deformation of the bolster 316 that is similar to FIGS. 6A-B, but from a side elevational view. As shown, the BMD 1300 is positioned between the upper portion 313 and lower portion 312 of the bolster 316 with the strain bracket 1320 secured to the upper and lower portions 313, 312. FIG. 14A is an example of the bolster 316 in an initial, unloaded state such as when the railcar 103 is empty similar to that shown in FIG. 6A. There, the upper portion 313 and the lower portion 312 are parallel to one another and, as a result, little or no strain is created in the strain bracket 1320. FIG. 6B is an example of the bolster 316 in a loaded state. There, the bolster 316 has deformed downward (e.g., bowed) towards the earth because the railcar 103 has been loaded. The greater the load on the bolster 316, the more significant the bending in the upper portion 313 and lower portion 312. As a result of the bowing, the upper portion 313 and the lower portion 312 of the bolster 316 both bend into an arcuate shape. In some embodiments or situations, the upper portion 313 of the bolster 316 bends into an arcuate shape while the lower portion 312 remains more straight. The upper portion 313 typically deforms to have a more pronounced curvature than the lower portion 312 due to the lower portion 312 of the bolster 316 being more rigidly supported by the surrounding steel structures. For example, a middle point 313A of the upper portion 313 may deflect downward from ends 313B a first distance 1406, and a middle point 312A of the lower portion 312 may deflect downward form ends 312B a second distance 1408 that is less than the first distance.

As shown in FIGS. 14A-B, the strain bracket 1320 is rigidly mounted to the upper portion 313 and the lower portion 312 of the bolster 316. In an unloaded state as shown in FIG. 14A, the first plate portion 1326 and the second plate portion 1328 of the strain bracket 1320 are linearly aligned and the bridge 1330 has a length indicated by length 1402. As the bolster 316 is loaded, the upper portion 313 and lower portion 312 flex as described above and strain the bracket 1320 by rotating the first plate portion 1326 and the second plate portion 1328 in opposing directions and out of alignment. By moving the first plate portion 1326 and the second plate portion 1328 out of alignment, the overall length 1404 of the bracket is increased to the length indicated by 1404. The bridge portion 1330 is designed to strain in a defined manner and elastically deform in shear as shown in FIG. 14B.

The strain sensor 1390 detects the strain experienced by the bridge 1330 of the strain bracket 1320 which is used to determine the weight of the load of the railcar 103 as described above. The BMD 1300 may use or provide the strain data to determine whether the railcar 103 is in a loaded or unloaded state. Using the location information provided by the BMD 1300, it can be determined where the railcar 103 was loaded and unloaded. Also, using the distance traveled by the railcar 103 (which may be determined using the BMD 1300) along with the strain data, the mileage of a railcar 103 in both the loaded state and unloaded state may be determined. Alternatively or additionally, the strain data may be used to determine whether the railcar 103 is rocking, bouncing, tipping, leaning, and/or traveling around a curve, for example, by monitoring the strain data over time.

In FIGS. 14A and 14B, the strain bracket 1320 is attached to the upper portion 313 and the lower portion 312 offset from their respective middle points 313A, 312A. Due to this position and the differing degrees of bending in the upper portion 313 and the lower portion 312 as the railcar 103 is loaded, the upper and lower portions 313, 312 of the bolster 316 apply bending moments to the strain bracket 1320. The bending moments cause the first plate 1326 and the second plate 1328 of the strain bracket 1320 to rotate in opposing directions across the bracket bridge 1330 to cause the bridge 1330 to be elastically deformed in shear.

FIGS. 15-19 illustrate various alternative embodiments of a strain bracket that may be used with the BMD 1300 in place of or in addition to the strain bracket 1320. For conciseness and clarity, the discussion of each embodiment will primarily highlight the differences of each of the strain brackets as compared to the strain bracket 1320 and the other embodiments discussed herein. For simplicity, the reference numerals used with regard to the strain bracket 1320 will be used to indicate features of the strain brackets of FIGS. 15-19, with the reference numerals changed to correspond to the figure number of each embodiment. For instance, features of the strain bracket 1320 of the embodiment shown in FIG. 13A-C that correspond to features of the strain bracket 1520 of second embodiment shown in FIG. 15 are shown with the prefix changed from a "13" to "15." For example, a feature shown as "1322" in the first embodiment of FIG. 13 will be shown as "1522" with regard to the second embodiment shown in FIG. 15. Features of the strain bracket 1620 of the third embodiment shown in FIG. 16 that correspond to features of the strain bracket 1320 are shown with the prefix of the reference numeral changed from "13" to "16" and so on.

In each embodiment, the strain bracket includes a first end portion 1322 that is secured to the upper portion 313 of the bolster 316 and a second end portion 1324 that is secured to the lower portion 312 of the bolster 316. The differences between the various embodiments are discussed below.

With regard to FIG. 15, a strain bracket 1520 is provided that differs from the strain bracket 1320 in the connection of the first portion plate 1526 to the second plate portion 1528 via the bridge 1530. The bridge 1530 of the strain bracket 1520 includes a first portion 1530A protruding longitudinally from the first plate portion 1526, a second portion 1530B, and a third portion 1530C protruding longitudinally from the second plate portion 1528. The strain sensor of the BMD 1300 may measure the strain in the strain bracket 1520 at the second portion 1530B.

The first portion 1530A and third portion 1530C have a narrowed width as compared to the first and second plate portions 1526, 1528, thereby defining a generally S-shape of the bridge portion 1530 with openings 1531 on either side of the second portion 1530B. The narrowed first and third portions 1530A, 1530C and the 90-degree connections to the second portion 1530B create stress risers in the strain bracket 1520 and magnify the strain in the second portion 1530B caused by the deformation of the bolster 316 connected to the strain bracket 1520. In this embodiment, the strain bracket 1520 is designed to detect strain from tension and compression in the bridge 1530 instead of shear.

Regarding FIG. 15, the second portion 1530B of the bridge has a reduced thickness compared to the first and second plate portions 1526, 1528 to further decrease the strength of the strain bracket 1520 to magnify stress in the strain bracket 1530. In some forms, the second portion 1530B does not have a reduced thickness, but instead has the same thickness as the rest of strain bracket 1520. The first plate 1526 and the second plate 1528 may have holes therethrough for attachment to the housing 1302 similar to the strain bracket 1320.

With regard to FIG. 16, a strain bracket 1620 is provided that is similar in many respects to the strain bracket 1520 such that differences will be highlighted. One difference between the strain bracket 1620 and the strain bracket 1520 is that the second portion 1630B of the bridge portion 1630 does not include a reduced thickness as compared to the first plate portion 1626 and the second plate portion 1628. This provides a more robust and strong strain bracket 1620 which may be desired in various applications.

Another difference between the strain bracket 1620 and the strain bracket 1520 is that the first end portion 1622 includes a riser portion 1636A that extends between the lip portion 1636 and the first plate portion 1626 to position the lip portion 1636 out of the plane of the first plate portion 1626. Similarly, the second end portion 1624 includes a riser portion 1638A and the lip portion 1638A. In some applications, the riser portions 1636A, 1638A provide additional clearance for the housing 1302 of the BMD 1300.

With regard to FIG. 17, a strain bracket 1720 is provided that includes a first end portion 1722 having a lip portion 1736 and a first plate portion 1726. Similar to the strain bracket 1620, a riser portion 1736A extends between the lip portion 1736 and the first plate portion 1726, spacing the first plate portion 1726 outward from the bolster 316. This provides more clearance for the housing 1302 of the BMD 1300 and also creates a known condition whereby the strain experienced by the strain bridge 1730 is always constrained to be in a bending mode, providing for only tension strain to be measured. The first plate portion 1726 extends from the riser portion 1736A away from the lip portion 1736. The strain bracket 1720 includes a second end portion 1724 and a bridge portion 1730 connecting the first and second end portions 1722, 1724. The second end portion 1724 includes a lip portion 1738 and a riser portion 1738A. The bridge portion 1730 and the riser portion 1738A extend obliquely to one another and form a bend 1739 at the juncture between the bridge portion 1730 and the riser portion 1738A. The bend 1739 may flex in response to loading of the bolster 316 and also amplifies the strain in the bridge portion 1730 that has a reduced cross section for measurement by a strain sensor of the BMD 1300.

With regard to FIG. 18, a strain bracket 1820 is provided that is similar in many respects to the strain bracket 1720. The strain bracket 1820 includes a first end portion 1822, a second end portion 1824 and a bridge portion 1830 connecting the first and second end portions 1822, 1824. The first end portion 1822 includes a first plate portion 1826 and a lip portion 1836. The second end portion 1824 includes a lip portion 1838. Unlike the strain bracket 1720, the strain bracket 1820 is generally flat. The strain bracket 1820 concentrates the strain on the bridge portion 1830 since the bridge portion 1830 has a smaller cross-section transverse to a length of the strain bracket 1820.

Figure 19:
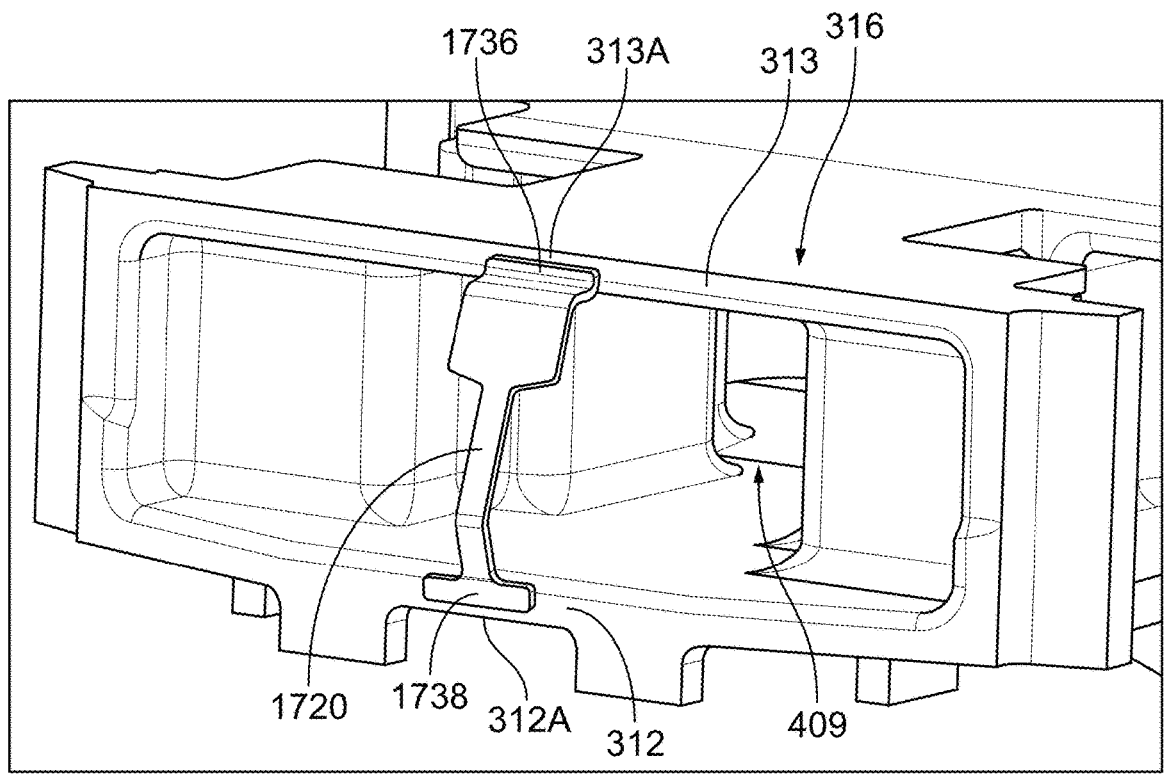
FIG. 19 is a side perspective view of the strain bracket of FIG. 17 mounted to an end portion of a bolster of a bogie assembly at a first position.

With regard to FIG. 19, the strain bracket 1720 is shown secured to the end of the bolster 316, with the lip portion 1736 of the strain bracket 1720 secured to the upper portion 313 and the lip portion 1738 secured to the lower portion 312 of the bolster 316. The strain bracket 1720 may be attached to the bolster 316 by welding for example. As shown, the strain bracket 1720 is affixed to the bolster 316 at a middle point 313A of the upper portion 313 and a middle point 312A of the lower portion 312. While the strain bracket 1720 is shown, it is shown merely as an example and any strain bracket may similarly be secured to the end of the bolster 316. The BMD associated with the strain bracket 1720 is positioned in the pocket 409 of the bolster 316 to monitor the stress in the strain bracket 1720. Strain brackets primarily configured for compression or tension in the longitudinal direction of the bracket, rather than shearing or lateral compression/tension, may be mounted at the middle points 313A, 312A of the end of the bolster 316 to reduce the twisting or shearing of the strain brackets.

Figure 20:
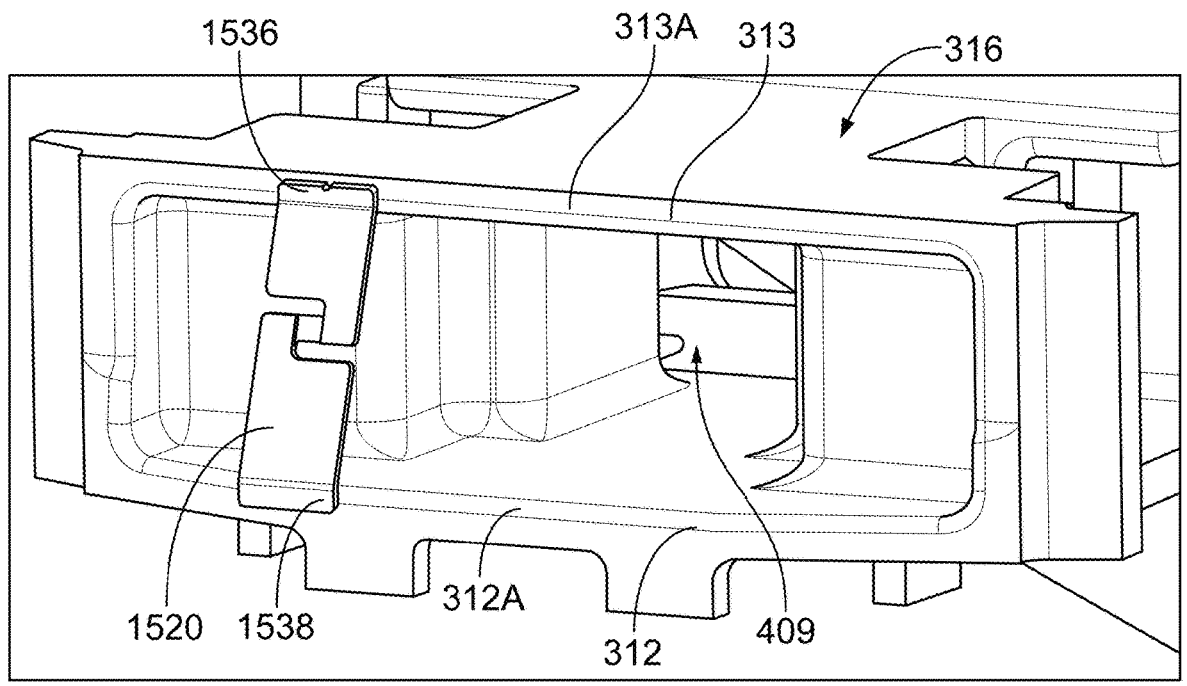
FIG. 20 is a side perspective view similar to FIG. 19 showing the strain bracket of FIG. 15 mounted to an end portion of a bolster of a bogie assembly of FIG. 3 at a second position.

In other embodiments, the strain bracket may be offset from the middle points 313A, 312A of the upper and lower portions 313, 312 of the bolster 316. With respect to FIG. 20, the end of the bolster 316 is shown with the strain bracket 1520 secured thereto. The flange portion 1536 of the strain bracket 1520 is secured to the upper portion 313 of the bolster 316 and the flange portion 1538 of the strain bracket 1520 is secured to the lower portion 312. As shown, the strain bracket 1520 is secured toward a side of the pocket 409 of the bolster 316 and offset from the middle points 313A, 312A of the upper portion 313 and lower portion 312. As described with regard to FIGS. 14A-B, when the bolster 316 is loaded, the upper portion 313 deflects or bends more than the lower portion 312. Positioning the strain bracket offset from the middle points 313A, 312A may aid to amplify the strain in the strain bracket 1520 caused by the bending moments the upper and lower portions 313, 312 apply to the strain bracket 1520 due to the different bending of the upper and lower portions 313, 312 of the bolster 316. By amplifying the strain in the strain bracket 1520, the BMD 1300 may more accurately measure the strain in the strain bracket 1520. Strain brackets configured for shearing and/or lateral compression or tension may be mounted offset from the middle points 313A, 312A of the end of the bolster 316.

The above-described example embodiments of the various strain brackets show the strain bracket rigidly attached to both the upper portion 313 and lower portion 312 of the bolster 316. In other embodiments, however, the strain bracket may be rigidly secured to one of the upper portion 313 or the lower portion 312 and rigidly secured to another portion of the railcar 103 such that, as the railcar 103 is loaded, strain is induced in the strain bracket due to the bending of the upper or lower portions 313, 312 of the bolster 316 similar to the approaches described above. In yet other embodiments, the strain in the upper portion 313 or the lower portion 312 of the bolster 316 may be measured directly. As the railcar 103 is loaded, the bolster 316 will bend creating a strain in the upper portion 313 or the lower portion 312 of the bolster 316 which a strain sensor may be mounted and configured to detect.

Automatic Equipment Identification System

Railcars in North America are required to have an Automatic Equipment Identification (AEI) tag on each end of the railcar. The AEI tag is encoded with information that is read by a automatic equipment identification system such as a wayside system including antenna on each side of the track. As the railcar passes the wayside system, the antennas transmit a radio signal that is received by an antenna of a receiver of the AEI tag and causes the charging of a transmitter of the AEI tag. The AEI tag then responds to the signal from the wayside system with a radio signal transmission that contains encoded information such as AEI data. Further information about the AEI system and conventional AEI tags can be found in Association of American Railroads (AAR) standard S-9203.

AEI tags are programmed manually, using an AEI tag writer device to encode AEI data to the memory of the AEI tag. The encoded AEI data contains the railcar name or identification (ID) including the car owner information and a number (car mark), the location of the tag on the railcar (e.g., the left side or the right side and the B-end or the A-end of the railcar), and other useful information such as the number of axles and/or the length of the railcar. The tags are applied manually with rivets or by clamping or other methods, sometimes to the wrong location or to the wrong railcar. Also, the railcar ID is sometimes changed and the new railcar ID is stenciled on the car and this would require a change to the AEI tags. After installation, maintainers, wayside system algorithm statistics or computer vision systems may determine that the A and B tags are on the incorrect ends of the railcar, that there are missing or extra AEI tags, or that the tags are programmed with the wrong information (such as a wrong length of railcar). In the event of an error, labor must be expended to fix the error. The tags are used by the railroads for tracking the railcar past specific points with AEI wayside system readers and also to interface with safety critical wayside systems such as detectors of defective bearings and defective wheels. Thus, it is important that AEI tag transmits the correct information.

Figure 21:
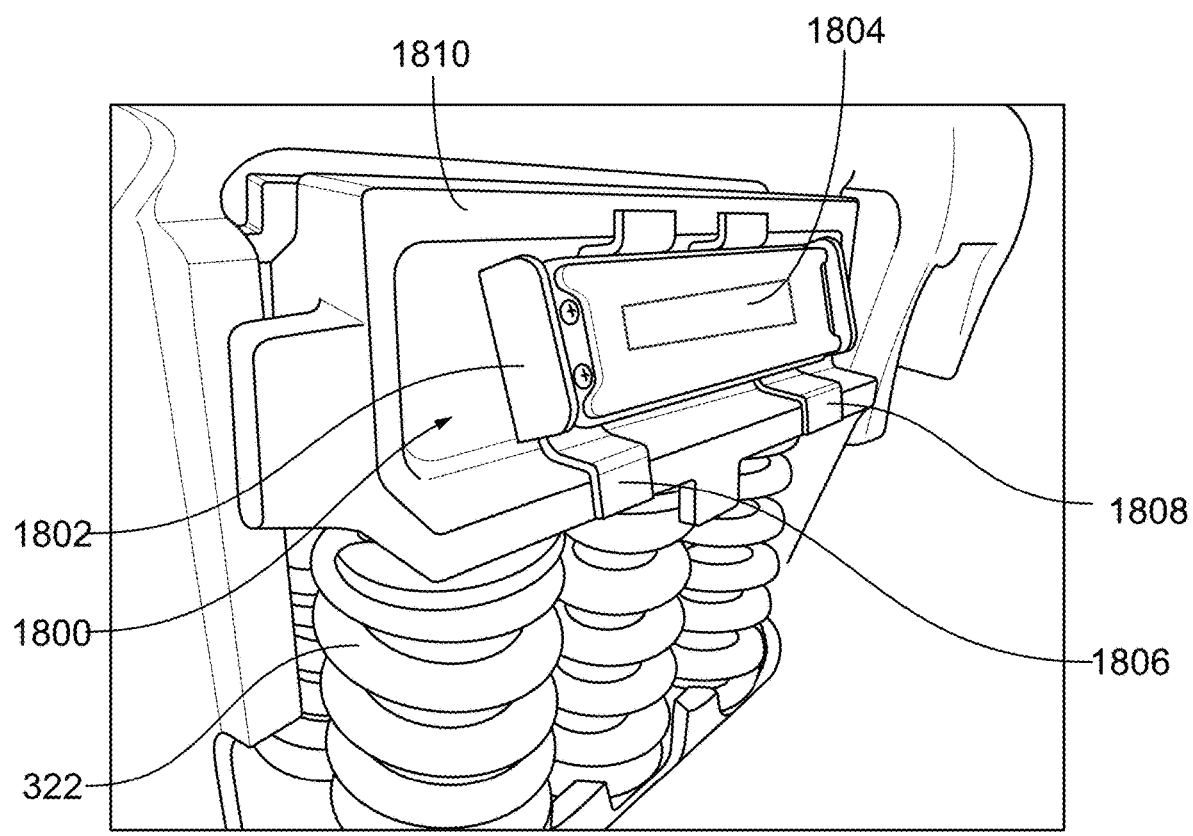
FIG. 21 is a perspective view of a mobile railway asset monitoring apparatus including a bogie monitoring device having an automatic equipment identification tag.

With reference to FIG. 21, a mobile railway asset monitoring apparatus 1800 is provided that is similar to the railway asset nodes discussed above. The mobile railway asset monitoring apparatus 1800 includes communication circuitry having an RFID tag such as an AEI tag 1804. In one embodiment, the mobile railway asset monitoring apparatus 1800 includes a bogie monitoring device (BMD) 1802 and the AEI tag 1804 is integral with the BMD 1802. In another embodiment, the mobile railway asset monitoring apparatus 1800 includes a BMD 1802 having a first AEI tag 1804 and a second AEI tag 1804 is coupled to the BMD 1800 through wireless or wired approaches. In yet another embodiment, a first AEI tag 1804 is provided on the railcar that is not integral with the BMD 1802 and is not coupled to the BMD 1802 through wired or wireless approaches. A second AEI tag 1804 is provided on the railcar that is integral with the BMD 1802 or is coupled to the BMD 1802 through wired or wireless approaches. In this embodiment, both AEI tags are operative at the same time despite not being communicatively linked. In one application, a railcar has a first mobile railway asset monitoring apparatus 1800 with the associated AEI tag(s) 1804 at the A-end of the railcar on a first side of the railcar and a second mobile railway asset monitoring apparatus 1800 with the associated AEI tag(s) 1804 at the B-end of the railcar on the other side of the railcar.

A processor of the BMD 1802 can update the AEI data that the AEI tag 1804 transmits. In addition, the communication circuitry of the BMD 1802 includes a wireless communication radio to interface with an external device such as a phone or a server using a wireless method such as Bluetooth or a wireless wide area network such as cellular, whereby the BMD 1802 can receive data to be encoded on the AEI tag 1804 and perform the encoding, thus alleviating the owner, user, or maintainer from the requirement of having a particular programming device to program or reprogram the AEI tag 1804. Instead, the AEI tag 1804 may be programmed using, for example, a cellular phone connection or a Bluetooth® connection with the BMD 1802.

The BMD 1802 includes a bracket 1806, a housing 1808, a processor, one or more sensors, and communication circuitry. The BMD 1802 is provided with the ability to automatically determine full orientation and position of the BMD 1802 on the railcar and can be used to encode the AEI tag 1804, indicate errors of the AEI tag 1804, and/or repair any incorrect information of the AEI tag 1804.

Having determined the position and orientation of the BMD 1802, one can appreciate that the AEI tag 1804 is operable as another radio transmitter of the mobile railway asset monitoring apparatus 1802 to automatically communicate information to an external AEI system. The mobile railway asset monitoring apparatus 1800 may autonomously identify incorrect information of the AEI tag 1804, such as incorrect information provided by a technician, and avoids the difficult, mostly manual conventional procedures that are used to determine mis-programmed or misapplied AEI tags. And, in addition, the mobile railway asset monitoring apparatus 1800 provides a method for repairing such errors remotely, without the need for expensive AEI/RFID programming devices conventionally used for programming passive AEI tags on unpowered railcars, thereby also eliminating the labor and cost associated with travel to and from railcars for removing and replacing conventional AEI when such errors are incurred.

In one embodiment, a mobile railway asset monitoring apparatus is located on a freight car with a processor, a power source, and one or more sensors. The processor is operable to determine the location of the mobile railway asset monitoring apparatus on the railcar with respect to the components on the railcar such as the side of the railcar and the end of the railcar. The mobile railway asset monitoring apparatus includes communications circuitry, such as radio such as a cellular radio or a Bluetooth radio, that can connect directly or indirectly to a remote server or handheld device. The processor is further operable to encode an AEI tag of the mobile railway asset monitoring apparatus such as with a serial wired connection or a Bluetooth connection. The mobile railway asset monitoring apparatus may also have GNSS circuitry to enable a method for verification of the railcar identification.

In one embodiment, the mobile railway asset monitoring apparatus 1800 includes the BMD 1802 and the AEI tag 1804. The BMD 1802 includes a processor operable to receive data from one or more sensors and determine, for example, that the position of the BMD 1802 is on the left side of the railcar near the B-end of the railcar near the hand brake. The processor of the BMD 1802 may further be operable to determine whether the AEI tag 1804 has encoded information that agrees with or disagrees with the determined position of the BMD 1802. If the BMD 1802 identifies incorrect information has been encoded in the AEI tag 1804, the BMD 1802 causes a warning to be sent to an oversight authority to verify and/or fix the error, perhaps by the BMD 1802 obtaining a security key that allows change management for the actual encoding of the AEI tag 1804. In addition, the BMD 1802 also has the capability to determine the number of axles on the railcar and the distance between each of the axles. Any such other information encoded to the tag could also trigger a check and validation of the determined information by the BMD 1802 or a remote device, such as a server computer, that receives data from the BMD 102.

In addition, AEI data such as the railcar identification (owner mark, numerical indicator, etc) could be validated automatically with an algorithm that captures such information from an external source such as a waybill containing the railcar ID and a timeframe associated with the railcar's location (e.g., Railcar ABCD123456 was loaded at location X on date Y). The GNSS circuitry of the BMD may be used to validate, for instance, statistically, the railcar ID waybill information aligns to a statistical certainty, with the GNSS information about the railcar's location at particular times.

Figure 22:
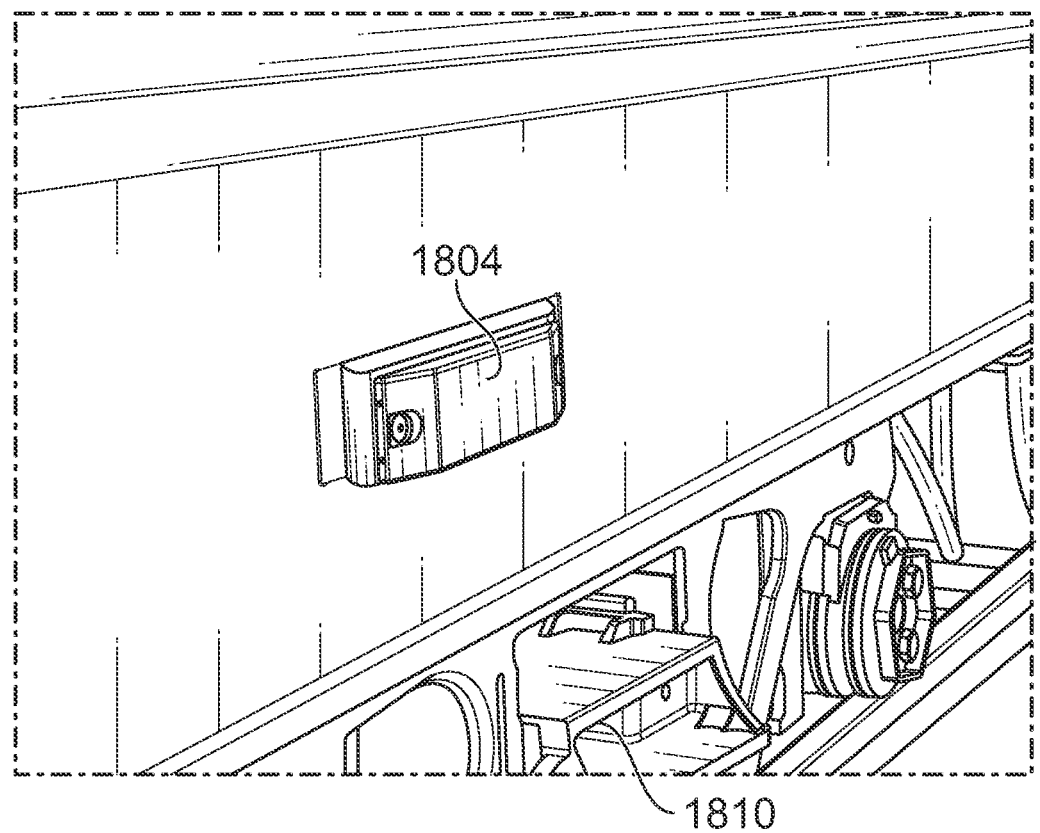
FIG. 22 is a perspective view of an automatic equipment identification tag mounted to a side of a railcar.

In one embodiment, the mobile asset monitoring apparatus 1800 includes the BMD 1802 configured to be mounted to a bolster 1810 of a railcar. The mobile railway asset monitoring apparatus 1802 includes the AEI tag 1804 such as inside of, or mounted to, a housing of the BMD 1802. In another embodiment, the BMD 1802 is connected to the AEI tag 1804 via a wired or wireless connection. For example and with reference to FIG. 22, an AEI tag 1804 is mounted to a side of a railcar in proximity to the bolster 1810 of the railcar. In yet another embodiment, the BMD 1802 is integral with the bolster 1810 and the AEI tag 1804 is mounted to the bolster 1810 or another component of the railcar and connected to the BMD 1802 via wired or wireless approaches.

Figure 23:
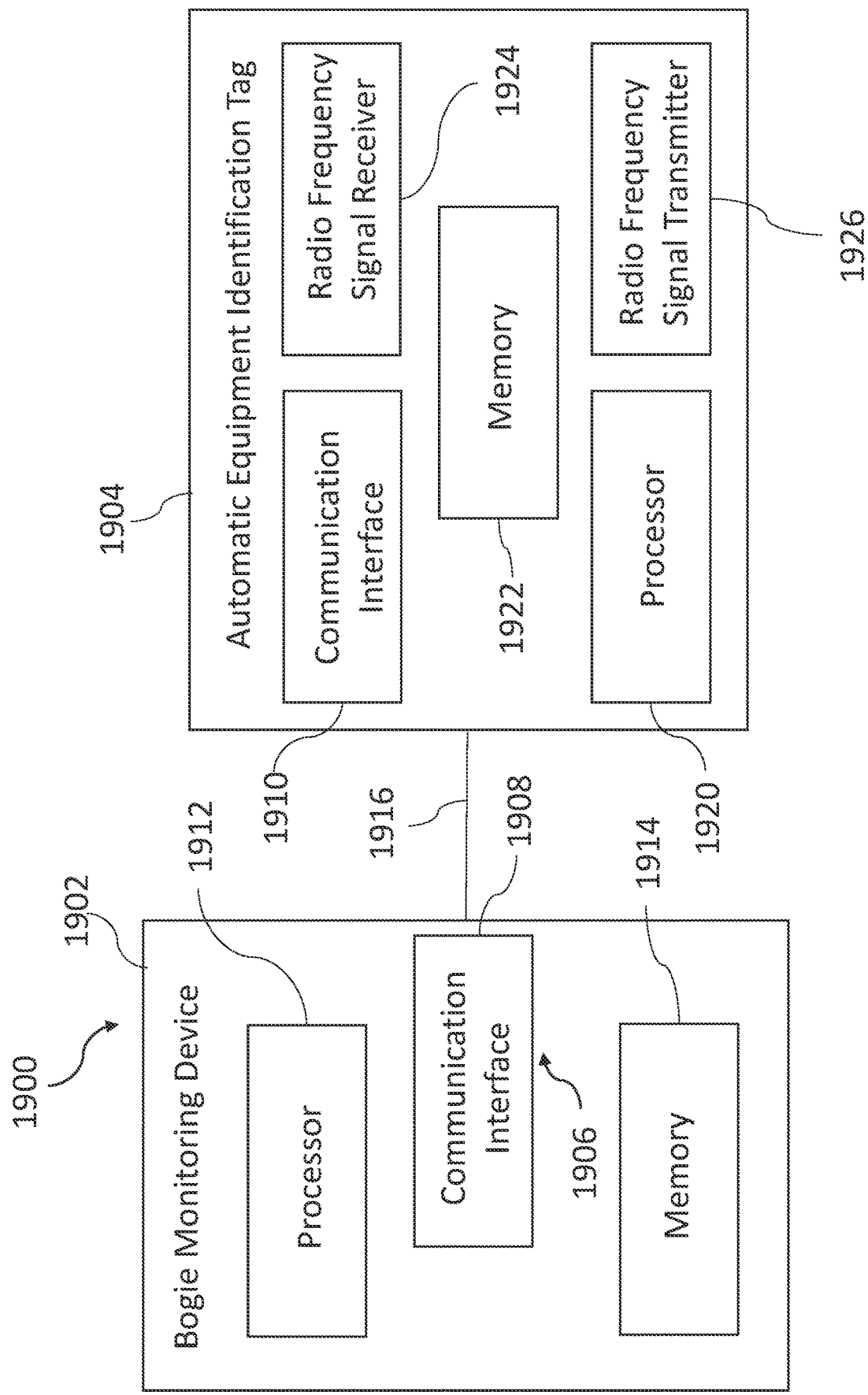
FIG. 23 is a schematic representation of a bogie monitoring device and an automatic equipment identification tag.

Regarding FIG. 23, a mobile railway asset monitoring apparatus 1900 is provided that is similar in many respects to the mobile railway asset monitoring apparatus 1800 discussed above. The mobile railway asset monitoring apparatus 1900 includes a BMD 1902 and communication circuitry 1906 including an AEI tag 1904. The AEI tags 1804 and 1904 include similar components. The communication circuitry 1906 includes a communication interface 1908 on-board the BMD 1902 and a communication interface 1910 on-board the AEI tag 1904. The communication interfaces 1908, 1910 may include, for example, antennas for communicating wirelessly and/or wired connections.

The BMD 1902 includes a processor 1912 and a memory 1914 that are operably coupled to the communication interface 1908. The communication interface 1908 may receive AEI data from a remote device, such as a smartphone via Bluetooth and/or a server computer via a train-based network, a cellular network, and the internet. The identification data may include, for example, data relating to a railcar ID, AEI tag ID, railcar owner, railcar dimension information, date information, and/or location information as some examples. The memory 1914 may store the AEI data and the processor 1912 may cause the communication interface 1908 to communicate the AEI data to the AEI tag 1904.

The communication interface 1910 of the AEI tag 1904 receives the AEI data from the BMD 1902 via a wired or wireless communication link 1916. In one embodiment, the AEI tag 1904 includes a processor 1920 and a memory 1922 that store the AEI data received from the BMD 1902. The AEI tag 1904 further includes a radio frequency signal receiver 1924 and a radio frequency signal transmitter 1926, which may be configured as separate components or as a single transceiver. The receiver 1924 is configured to receive an inquiry from an AEI system such as a trackside AEI system. In response to the inquiry from the AEI system, the processor 1920 causes the transmitter 1926 to transmit at least a portion of the AEI data stored in the memory 1920 to the AEI system. The AEI tag 1904 has a housing that contains the components of the AEI tag 1904 and is configured to be mounted to a mobile railway asset. In some embodiments, the AEI tag 1904 does not independently store the AEI data. Rather, the AEI tag 1904 operates as a relay wherein the AEI tag 1904 communicates receipt of an inquiry from the AEI system to the BMD 1902 and communicates a response from the BMD 1902 to the AEI system.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, any calculation discussed being performed by the BMD 104 may be performed by the BMD 104 or any other RAN 100, the PWG 202, a computer at the railroad operations center 220, the remote server 406, the user device 225, or a combination thereof.

What is claimed is:

1. A mobile railway asset monitoring apparatus comprising:
   a sensor configured to produce a signal indicative of a rotation of a wheelset of a mobile railway asset as the mobile railway asset moves along a track;
   a processor to receive data corresponding to a ground speed of the mobile railway asset;
   the processor operably coupled to the sensor and configured to calculate a running dimension of the wheelset, the calculated running dimension of the wheelset increasing and decreasing as tapered running surfaces of the wheelset shift laterally relative to rails of the track, the processor configured to calculate the running dimension of the wheelset based at least in part on the rotation of the wheelset and the ground speed of the mobile railway asset; and
   the processor is configured to determine at least one parameter of the mobile railway asset based at least in part on the running dimension of the wheelset.

2. The mobile railway asset monitoring apparatus of claim 1 wherein the processor is configured to calculate a frequency of rotation of the wheelset based at least in part on the sensor signal; and
   wherein the processor is configured to calculate the running dimension of the wheelset based at least in part on the frequency of rotation of the wheelset and the ground speed of the mobile railway asset.

3. The mobile railway asset monitoring apparatus of claim 1 wherein the running dimension of the wheelset includes a running diameter of the wheelset.

4. The mobile railway asset monitoring apparatus of claim 1 wherein the sensor signal includes sensor data indicative of the rotation of the wheelset; and
   wherein the processor is configured to utilize autocorrelation and the sensor data to calculate the running dimension of the wheelset.

5. The mobile railway asset monitoring apparatus of claim 1 wherein the processor is configured to receive data indicative of at least one characteristic of the track; and
   wherein the processor is configured to determine the at least one parameter of the mobile railway asset based at least in part on the running dimension of the wheelset and the at least one characteristic of the track.

6. The mobile railway asset monitoring apparatus of claim 5 wherein the at least one characteristic of the track includes at least one of:
   track curvature;
   track grade;
   track gauge; and
   one or more track anomalies.

7. The mobile railway asset monitoring apparatus of claim 1 wherein the at least one parameter of the mobile railway asset includes at least one of:
variance of wheel running diameter;
wheel wear rate;
wheel surface condition;
bearing raceway surface condition;
wheel slippage or sliding;
weight of the mobile railway asset;
center of gravity measurement of the mobile railway asset;
mobile railway asset load status; and
brake shoe engagement.

8. The mobile railway asset monitoring apparatus of claim 1 wherein the at least one parameter of the mobile railway asset includes at least one of:
a performance parameter of a bogie of the mobile railway asset;
a performance parameter of a side frame of the mobile railway asset;
a performance parameter of a bolster of the mobile railway asset;
a performance parameter of a side bearing of the mobile railway asset;
a performance parameter of a friction wedge of the mobile railway asset;
a performance parameter of suspension springs of the mobile railway asset;
a performance parameter of a control spring of the mobile railway asset;
a performance parameter of a center plate of the mobile railway asset;
a performance parameter of a bearing assembly of the mobile railway asset;
a performance parameter of an axle of the mobile railway asset;
a performance parameter of a wheel of the mobile railway asset; and
a performance parameter of the wheelset of the mobile railway asset.

9. The mobile railway asset monitoring apparatus of claim 1 further comprising global navigation satellite system (GNSS) circuitry operably coupled to the processor, the GNSS circuitry configured to receive GNSS data to facilitate a determination of the ground speed of the railway asset.

10. The mobile railway asset monitoring apparatus of claim 1 wherein the processor is configured to estimate another ground speed of the mobile railway asset based at least in part on a determination from the sensor data of the wheelset passing over a track anomaly and a second wheelset of the mobile railway asset passing over the track anomaly.

11. The mobile railway asset monitoring apparatus of claim 1 further comprising a memory to store historical wheelset running dimension data; and
wherein the processor is operably coupled to the memory, the processor configured to determine the parameter of the mobile railway asset based at least in part on the wheelset running dimension and the historical wheelset running dimension data.

12. The mobile railway asset monitoring apparatus of claim 1 wherein the sensor signal includes a plurality of sensor signals indicative of a plurality of rotations of the wheelset of the mobile railway asset;
wherein the running dimension of the wheelset includes a plurality of running dimensions associated with the sensor signals; and
wherein the processor is configured to determine the at least one parameter of the mobile railway asset based at least in part on the running dimensions of the wheelset.

13. The mobile railway asset monitoring apparatus of claim 1 wherein the processor is configured to calculate an average wheelset running dimension of the wheelset by determining the running dimension of the wheelset at different operating conditions of the mobile railway asset including at least one of a plurality of ground speeds, a plurality of track curvatures, a plurality of track gauges, and a plurality of load states.

14. The mobile railway asset monitoring apparatus of claim 13 wherein the processor is configured to calculate another ground speed of the mobile railway asset based at least in part on the average wheelset running dimension and another signal of the sensor.

15. The mobile railway asset monitoring apparatus of claim 13 wherein the processor is configured to calculate a distance traveled by the mobile railway asset based at least in part on the average wheelset running dimension and another signal of the sensor.

16. The mobile railway asset monitoring apparatus of claim 1 wherein the sensor includes at least one accelerometer.

17. The mobile railway asset monitoring apparatus of claim 1 wherein the sensor includes at least one microphone.

18. The mobile railway asset monitoring apparatus of claim 1 wherein the sensor includes at least one strain sensor.

19. The mobile railway asset monitoring apparatus of claim 1 wherein the sensor includes at least one gyroscope sensor.

20. The mobile railway asset monitoring apparatus of claim 1 further comprising communication circuitry configured to communicate wirelessly with a network; and
wherein the processor is operably coupled to the communication circuitry, the processor configured to cause the communication circuitry to communicate data to a remote computer via a network.

21. The mobile railway asset monitoring apparatus of claim 1 further comprising communication circuitry operably coupled to the sensor and a network interface operably coupled to the processor; and
wherein the communication circuitry is configured to communicate the wheelset running dimension to the processor via a network and the network interface.

22. The mobile railway asset monitoring apparatus of claim 1 further comprising a power source operable to provide electrical power to the sensor and processor; and
wherein the power source includes at least one of a battery and a solar cell.

23. The mobile railway asset monitoring apparatus of claim 1 wherein the processor is configured to predict a failure mode of a component of the wheelset based at least in part on the at least one parameter.

24. The mobile railway asset monitoring apparatus of claim 1 further comprising communication circuitry operably coupled to the processor; and
wherein the processor is configured to cause the communication circuitry to wirelessly communicate a warning signal to a remote device in response to the at least one parameter exceeding a threshold value.

25. The mobile railway asset monitoring apparatus of claim 1 wherein the processor is configured to calculate the running dimension of the wheelset in response to a mobile railway asset event.

26. The mobile railway asset monitoring apparatus of claim 1 wherein the wheelset includes an axle, a pair of wheels fixed to the axle, and a pair of bearings; and wherein the signal produced by the sensor is indicative of a rotation of at least one of the wheels of the wheelset.

27. The mobile railway asset monitoring apparatus of claim 1 wherein the wheelset includes a first bearing and a second bearing mounted to an axle; and wherein the first bearing and the second bearing each include two raceways; and wherein the signal produced by the sensor is indicative of the rotation of at least one of the raceways of the first bearing and second bearing.

28. The mobile railway asset monitoring apparatus of claim 1 wherein the wheelset includes an axle; and wherein the signal produced by the sensor is indicative of a rotation of the axle.

29. The mobile railway asset monitoring apparatus of claim 1 wherein the processor is configured to calculate the running dimension of the wheelset based at least in part upon the rotation of the wheelset and the ground speed of the mobile railway asset for a predetermined number of seconds of movement of the mobile railway asset along the track.

30. The mobile railway asset monitoring apparatus of claim 1 wherein the processor is configured to calculate the running dimension of the wheelset based at least in part upon the rotation of the wheelset and the ground speed of the mobile railway asset for five seconds of movement of the mobile railway asset along the track.

31. A mobile railway asset monitoring apparatus comprising:

a sensor configured to produce a signal indicative of a rotation of a wheelset of a mobile railway asset;

a processor to receive data corresponding to a ground speed of the mobile railway asset;

the processor operably coupled to the sensor and configured to calculate a running dimension of the wheelset based at least in part on the rotation of the wheelset and the ground speed of the mobile railway asset;

the processor is configured to determine at least one parameter of the mobile railway asset based at least in part on the running dimension of the wheelset;

a bracket to be connected to a bolster of the mobile railway asset; and wherein the sensor detects at least one of strain and acceleration of the bracket.

32. The mobile railway asset monitoring apparatus of claim 31 wherein the processor is configured to calculate a frequency of rotation of the wheelset based at least in part on the sensor signal; and wherein the processor is configured to calculate the running dimension of the wheelset based at least in part on the frequency of rotation of the wheelset and the ground speed of the mobile railway asset.

33. The mobile railway asset monitoring apparatus of claim 31 wherein the running dimension of the wheelset includes a running diameter of the wheelset.

34. The mobile railway asset monitoring apparatus of claim 31 wherein the sensor signal includes sensor data indicative of the rotation of the wheelset; and wherein the processor is configured to utilize autocorrelation and the sensor data to calculate the running dimension of the wheelset.

35. The mobile railway asset monitoring apparatus of claim 31 wherein the processor is configured to receive data indicative of at least one characteristic of a track associated with the mobile railway asset; and wherein the processor is configured to determine the at least one parameter of the mobile railway asset based at least in part on the running dimension of the wheelset and the at least one characteristic of the track associated with the mobile railway asset.

36. The mobile railway asset monitoring apparatus of claim 35 wherein the at least one characteristic of the track includes at least one of:

track curvature;
track grade;
track gauge; and
one or more track anomalies.

37. The mobile railway asset monitoring apparatus of claim 31 wherein the at least one parameter of the mobile railway asset includes at least one of:

variance of wheel running diameter;
wheel wear rate;
wheel surface condition;
bearing raceway surface condition;
wheel slippage or sliding;
weight of the mobile railway asset;
center of gravity measurement of the mobile railway asset;
mobile railway asset load status; and
brake shoe engagement.

38. The mobile railway asset monitoring apparatus of claim 31 wherein the at least one parameter of the mobile railway asset includes at least one of:

a performance parameter of a bogie of the mobile railway asset;
a performance parameter of a side frame of the mobile railway asset;
a performance parameter of a bolster of the mobile railway asset;
a performance parameter of a side bearing of the mobile railway asset;
a performance parameter of a friction wedge of the mobile railway asset;
a performance parameter of suspension springs of the mobile railway asset;
a performance parameter of a control spring of the mobile railway asset;
a performance parameter of a center plate of the mobile railway asset;
a performance parameter of a bearing assembly of the mobile railway asset;
a performance parameter of an axle of the mobile railway asset;
a performance parameter of a wheel of the mobile railway asset; and
a performance parameter of the wheelset of the mobile railway asset.

39. The mobile railway asset monitoring apparatus of claim 31 further comprising global navigation satellite system (GNSS) circuitry operably coupled to the processor, the GNSS circuitry configured to receive GNSS data to facilitate a determination of the ground speed of the railway asset.

40. The mobile railway asset monitoring apparatus of claim 31 wherein the processor is configured to estimate another ground speed of the mobile railway asset based at least in part on a determination from the sensor data of the wheelset passing over a track anomaly and a second wheelset of the mobile railway asset passing over the track anomaly.

41. The mobile railway asset monitoring apparatus of claim 31 further comprising a memory to store historical wheelset running dimension data; and wherein the processor is operably coupled to the memory, the processor configured to determine the parameter of the mobile railway asset based at least in part on the wheelset running dimension and the historical wheelset running dimension data.

42. The mobile railway asset monitoring apparatus of claim 31 wherein the sensor signal includes a plurality of sensor signals indicative of a plurality of rotations of the wheelset of the mobile railway asset;
wherein the running dimension of the wheelset includes a plurality of running dimensions associated with the sensor signals; and
wherein the processor is configured to determine the at least one parameter of the mobile railway asset based at least in part on the running dimensions of the wheelset.

43. The mobile railway asset monitoring apparatus of claim 31 wherein the processor is configured to calculate an average wheelset running dimension of the wheelset by determining the running dimension of the wheelset at different operating conditions of the mobile railway asset including at least one of a plurality of ground speeds, a plurality of track curvatures, a plurality of track gauges, and a plurality of load states.

44. The mobile railway asset monitoring apparatus of claim 43 wherein the processor is configured to calculate another ground speed of the mobile railway asset based at least in part on the average wheelset running dimension and another signal of the sensor.

45. The mobile railway asset monitoring apparatus of claim 43 wherein the processor is configured to calculate a distance traveled by the mobile railway asset based at least in part on the average wheelset running dimension and another signal of the sensor.

46. The mobile railway asset monitoring apparatus of claim 31 wherein the sensor includes at least one accelerometer.

47. The mobile railway asset monitoring apparatus of claim 31 wherein the sensor includes at least one strain sensor.

48. The mobile railway asset monitoring apparatus of claim 31 wherein the sensor includes at least one gyroscope sensor.

49. The mobile railway asset monitoring apparatus of claim 31 further comprising communication circuitry configured to communicate wirelessly with a network; and
wherein the processor is operably coupled to the communication circuitry, the processor configured to cause the communication circuitry to communicate data to a remote computer via a network.

50. The mobile railway asset monitoring apparatus of claim 31 further comprising communication circuitry operably coupled to the sensor and a network interface operably coupled to the processor; and
wherein the communication circuitry is configured to communicate the wheelset running dimension to the processor via a network and the network interface.

51. The mobile railway asset monitoring apparatus of claim 31 further comprising a power source operable to provide electrical power to the sensor and processor; and
wherein the power source includes at least one of a battery and a solar cell.

52. The mobile railway asset monitoring apparatus of claim 31 wherein the processor is configured to predict a failure mode of a component of the wheelset based at least in part on the at least one parameter.

53. The mobile railway asset monitoring apparatus of claim 31 further comprising communication circuitry operably coupled to the processor; and
wherein the processor is configured to cause the communication circuitry to wirelessly communicate a warning signal to a remote device in response to the at least one parameter exceeding a threshold value.

54. The mobile railway asset monitoring apparatus of claim 31 wherein the processor is configured to calculate the running dimension of the wheelset in response to a mobile railway asset event.

55. The mobile railway asset monitoring apparatus of claim 31 wherein the wheelset includes an axle, a pair of wheels fixed to the axle, and a pair of bearings; and
wherein the signal produced by the sensor is indicative of a rotation of at least one of the wheels of the wheelset.

56. The mobile railway asset monitoring apparatus of claim 31 wherein the wheelset includes a first bearing and a second bearing mounted to an axle; and
wherein the first bearing and the second bearing each include two raceways; and
wherein the signal produced by the sensor is indicative of the rotation of at least one of the raceways of the first bearing and second bearing.

57. The mobile railway asset monitoring apparatus of claim 31 wherein the wheelset includes an axle; and
wherein the signal produced by the sensor is indicative of a rotation of the axle.

58. A method of monitoring a mobile railway asset, the method comprising:
receiving data from a sensor of the mobile railway asset indicating a rotation of a wheelset of the mobile railway asset as the mobile railway asset moves along a track;
receiving data corresponding to a ground speed of the mobile railway asset;
calculating a running dimension of the wheelset based at least in part on the rotation of the wheelset and the ground speed of the mobile railway asset, the calculated running dimension increasing and decreasing as tapered running surfaces of the wheelset shift laterally relative to rails of the track; and
determining at least one parameter of the mobile railway asset based at least in part on the running dimension of the wheelset.

59. The method of claim 58 wherein calculating the running dimension of the wheelset includes calculating a frequency of rotation of the wheelset based at least in part on the sensor data.

60. The method of claim 58 wherein the running dimension of the wheelset includes a running diameter of the wheelset.

61. The method of claim 58 wherein calculating the running dimension of the wheelset includes utilizing autocorrelation and the sensor data.

62. The method of claim 58 further comprising receiving at least one characteristic of the track; and
wherein determining the at least one parameter of the mobile railway asset includes determining the at least one parameter of the mobile railway asset based at least in part on the running dimension of the wheelset and the at least one characteristic of the track.

63. The method of claim 62 wherein the at least one characteristic of the track includes at least one of:
track curvature;
track grade;
track gauge; and
one or more track anomalies.

64. The method of claim 58 wherein the at least one parameter of the mobile railway asset includes at least one of:
  variance of wheel running diameter;
  wheel wear rate;
  wheel surface condition;
  bearing raceway surface condition;
  wheel slipping or sliding;
  weight of the mobile railway asset;
  center of gravity measurement of the mobile railway asset;
  mobile railway asset load status; and
  brake shoe engagement.

65. The method of claim 58 wherein the at least one parameter includes at least one of:
  a performance parameter of a bogie of the mobile railway asset;
  a performance parameter of a side frame of the mobile railway asset;
  a performance parameter of a bolster of the mobile railway asset;
  a performance parameter of a side bearing of the mobile railway asset;
  a performance parameter of a friction wedge of the mobile railway asset;
  a performance parameter of suspension springs of the mobile railway asset;
  a performance parameter of a control spring of the mobile railway asset;
  a performance parameter of a bolster of center plate of the mobile railway asset;
  a performance parameter of a bearing assembly of the mobile railway asset;
  a performance parameter of an axle of the mobile railway asset;
  a performance parameter of a wheel of the mobile railway asset; and
  a performance parameter of the wheelset of the mobile railway asset.

66. The method of claim 58 wherein receiving data corresponding to the ground speed of the mobile railway asset includes at least one of:
  calculating the ground speed of the mobile railway asset based at least in part on GNSS data; and
  calculating the ground speed of the mobile railway asset based at least in part on a determination from the sensor data of a first wheelset of the mobile railway asset passing over a track anomaly and a second wheelset of the mobile railway asset passing over the track anomaly.

67. The method of claim 58 further comprising storing historical wheelset running dimension data in a memory; and
  wherein determining the at least one parameter of the mobile railway asset includes determining the at least one parameter based at least in part on the wheelset running dimension and the historical wheelset running dimension data.

68. The method of claim 58 wherein receiving data from the sensor of the mobile railway asset includes receiving data indicative of a plurality of rotations of the wheelset of the mobile railway asset;
  wherein calculating the running dimension of the wheelset includes calculating a plurality of running dimensions of the wheelset; and
  wherein determining the at least one parameter of the mobile railway asset includes determining the at least one parameter based at least in part on the running dimensions of the wheelset.

69. The method of claim 58 further comprising estimating an average wheelset running dimension of the wheelset by determining the running dimension of the wheelset at different operating conditions of the mobile railway asset including at least one of a plurality of ground speeds, a plurality of track curvatures, a plurality of track gauges, and a plurality of load states.

70. The method of claim 69 further comprising estimating a speed of the mobile railway asset based at least in part on the average wheelset running dimension and the sensor data.

71. The method of claim 69 further comprising estimating a distance traveled by the mobile railway asset based at least in part on the average wheelset running dimension and the sensor data.

72. The method of claim 58 wherein the sensor includes at least one accelerometer.

73. The method of claim 58 wherein the sensor includes at least one microphone.

74. The method of claim 58 wherein the sensor includes at least one strain sensor.

75. The method of claim 58 wherein the sensor and processor are components of a railway asset node, the method further comprising communication circuitry of the railway asset node wirelessly communicating data associated with the at least one parameter of the mobile railway asset to a remote device.

76. The method of claim 58 wherein the sensor includes a first sensor of a first bogie of the mobile railway asset and a second sensor of a second bogie of the mobile railway asset.

77. A method of monitoring a mobile railway asset, the method comprising:
  receiving data from a sensor of the mobile railway asset indicating a rotation of a wheelset of the mobile railway asset;
  receiving data corresponding to a ground speed of the mobile railway asset;
  calculating a running dimension of the wheelset based at least in part on the rotation of the wheelset and the ground speed of the mobile railway asset; and
  determining at least one parameter of the mobile railway asset based at least in part on the running dimension of the wheelset,
  wherein the sensor is mounted to a bolster of the mobile railway asset.

78. The method of claim 77 wherein calculating the running dimension of the wheelset includes calculating a frequency of rotation of the wheelset based at least in part on the sensor data.

79. The method of claim 77 wherein the running dimension of the wheelset includes a running diameter of the wheelset.

80. The method of claim 77 wherein calculating the running dimension of the wheelset includes utilizing autocorrelation and the sensor data.

81. The method of claim 77 further comprising receiving at least one characteristic of a track associated with the mobile railway asset; and
  wherein determining the at least one parameter of the mobile railway asset includes determining the at least one parameter of the mobile railway asset based at least in part on the running dimension of the wheelset and the at least one characteristic of the track.

82. The method of claim 81 wherein the at least one characteristic of the track includes at least one of:

track curvature;
track grade;
track gauge; and
one or more track anomalies.

83. The method of claim 77 wherein the at least one parameter of the mobile railway asset includes at least one of:
variance of wheel running diameter;
wheel wear rate;
wheel surface condition;
bearing raceway surface condition;
wheel slipping or sliding;
weight of the mobile railway asset;
center of gravity measurement of the mobile railway asset;
mobile railway asset load status; and
brake shoe engagement.

84. The method of claim 77 wherein the at least one parameter includes at least one of:
a performance parameter of a bogie of the mobile railway asset;
a performance parameter of a side frame of the mobile railway asset;
a performance parameter of a bolster of the mobile railway asset;
a performance parameter of a side bearing of the mobile railway asset;
a performance parameter of a friction wedge of the mobile railway asset;
a performance parameter of suspension springs of the mobile railway asset;
a performance parameter of a control spring of the mobile railway asset;
a performance parameter of a bolster of center plate of the mobile railway asset;
a performance parameter of a bearing assembly of the mobile railway asset;
a performance parameter of an axle of the mobile railway asset;
a performance parameter of a wheel of the mobile railway asset; and
a performance parameter of the wheelset of the mobile railway asset.

85. The method of claim 77 wherein receiving data corresponding to the ground speed of the mobile railway asset includes at least one of:
calculating the ground speed of the mobile railway asset based at least in part on GNSS data; and
calculating the ground speed of the mobile railway asset based at least in part on a determination from the sensor data of a first wheelset of the mobile railway asset passing over a track anomaly and a second wheelset of the mobile railway asset passing over the track anomaly.

86. The method of claim 77 further comprising storing historical wheelset running dimension data in a memory; and
wherein determining the at least one parameter of the mobile railway asset includes determining the at least one parameter based at least in part on the wheelset running dimension and the historical wheelset running dimension data.

87. The method of claim 77 wherein receiving data from the sensor of the mobile railway asset includes receiving data indicative of a plurality of rotations of the wheelset of the mobile railway asset;
wherein calculating the running dimension of the wheelset includes calculating a plurality of running dimensions of the wheelset; and
wherein determining the at least one parameter of the mobile railway asset includes determining the at least one parameter based at least in part on the running dimensions of the wheelset.

88. The method of claim 77 further comprising estimating an average wheelset running dimension of the wheelset by determining the running dimension of the wheelset at different operating conditions of the mobile railway asset including at least one of a plurality of ground speeds, a plurality of track curvatures, a plurality of track gauges, and a plurality of load states.

89. The method of claim 88 further comprising estimating a speed of the mobile railway asset based at least in part on the average wheelset running dimension and the sensor data.

90. The method of claim 88 further comprising estimating a distance traveled by the mobile railway asset based at least in part on the average wheelset running dimension and the sensor data.

91. The method of claim 77 wherein the sensor includes at least one accelerometer.

92. The method of claim 77 wherein the sensor includes at least one microphone.

93. The method of claim 77 wherein the sensor includes at least one strain sensor.

94. The method of claim 77 wherein the sensor and processor are components of a railway asset node, the method further comprising communication circuitry of the railway asset node wirelessly communicating data associated with the at least one parameter of the mobile railway asset to a remote device.

95. The method of claim 77 wherein the sensor includes a first sensor of a first bogie of the mobile railway asset and a second sensor of a second bogie of the mobile railway asset.

* * * * *